United States Patent

Kohno et al.

[11] Patent Number: 6,130,006
[45] Date of Patent: Oct. 10, 2000

[54] HYDROGEN-ABSORBING ALLOY

[75] Inventors: Tatsuoki Kohno, Kawasaki; Isao Sakai, Yokohama; Masaaki Yamamoto, Inzai; Motoya Kanda; Hideki Yoshida, both of Yokohama; Fumiyuki Kawashima, Matsudo; Takao Sawa, Yokohama; Takamichi Inaba, Yokohama; Shusuke Inada, Yokohama; Hirotaka Hayashida; Hiroshi Kitayama, both of Fujisawa, all of Japan

[73] Assignee: Kabushiki Kaisha Toshiba, Kawasaki, Japan

[21] Appl. No.: 09/097,817

[22] Filed: Jun. 16, 1998

[30] Foreign Application Priority Data

| Jun. 17, 1997 | [JP] | Japan | 9-160276 |
| Sep. 18, 1997 | [JP] | Japan | 9-253872 |
| Nov. 28, 1997 | [JP] | Japan | 9-344436 |
| Jan. 9, 1998 | [JP] | Japan | 10-002994 |
| Mar. 16, 1998 | [JP] | Japan | 10-065349 |

[51] Int. Cl.$^7$ .................................................. H01M 4/32
[52] U.S. Cl. .......................... 429/223; 420/441; 420/443; 420/455; 420/900; 148/426; 148/427; 148/428; 148/429; 219/1; 219/38
[58] Field of Search ..................... 148/426–429; 420/441, 443, 455, 900; 429/223; 219/1, 38

[56] References Cited

U.S. PATENT DOCUMENTS

| 5,242,656 | 9/1993 | Zhang et al. .............................. 420/517 |
| 5,354,576 | 10/1994 | Zhang et al. .............................. 429/59 |
| 5,616,432 | 4/1997 | Ovshinsky et al. ........................ 429/59 |

FOREIGN PATENT DOCUMENTS

| 62-271348 | 11/1987 | Japan . |
| 62-271349 | 11/1987 | Japan . |
| 7-56803 | 6/1995 | Japan . |
| 10-1731 | 1/1998 | Japan . |
| WO 96/36083 | 11/1995 | WIPO . |
| WO 95/34918 | 12/1995 | WIPO . |
| WO 97/03213 | 1/1997 | WIPO . |

OTHER PUBLICATIONS

K. Kadir et al., Abstracts of the Japan Institute of Metals, p. 289, "Synthesis and Structure Determination of a New Series of Hydrogen Storage Alloys; RMg$_2$Ni$_9$ (R=La, Ce, Pr, Nd, Sm and Gd) Built from MgNi$_2$ Laves–Type Layers Alternating with AB$_5$ Layers", Mar. 26 to 28, 1997.

*Primary Examiner*—John Sheehan
*Attorney, Agent, or Firm*—Oblon, Spivak, McClelland, Maier & Neustadt, P.C.

[57] ABSTRACT

There is provided a hydrogen-absorbing alloy which contains an alloy ingot manufactured by means of a casting or sintering method or a pulverized product of the alloy ingot, and the alloy ingot being represented by the following general formula (1), $$(Mg_{1-a-b}R1_aM1_b)Ni_z \quad (1)$$

wherein R1 is at least one element selected from rare earth elements (including Y), M1 is at least one element selected from elements having a larger electronegativity than that of Mg (excluding the elements of R1, Cr, Mn, Fe, Co, Cu, Zn and Ni), and a, b and z are respectively a number satisfying conditions $0.1 \leq a \leq 0.8$, $0 < b \leq 0.9$, $1-a-b>0$, and $3 \leq z \leq 3.8$.

64 Claims, 3 Drawing Sheets

HYDROGEN-ABSORBING ALLOY

BACKGROUND OF THE INVENTION

This invention relates to a hydrogen-absorbing alloy and to a secondary battery comprising a negative electrode comprising the hydrogen-absorbing alloy.

Hydrogen-absorbing alloy has been noticed as being capable of safely and easily storing hydrogen as an energy source, and also as being useful as an energy exchange material or an energy storage material. Therefore, there have being proposed various applications of hydrogen-absorbing alloy as a new functional raw material. For example, hydrogen-absorbing alloy has been proposed to employ for the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, and a temperature sensor.

Recently, a nickel-hydrogen secondary battery where a hydrogen-absorbing alloy is employed as a negative electrode material has been attracting many attentions as a public-use battery of next generation, because the battery is advantageous in various aspects, e.g. it is high in capacity, highly resistive to over charging and over discharging, capable of performing a high rate charge/discharge, free from environmental pollution, and interchangeable with a nickel-cadmium battery. Accordingly, many attempts have been intensively made at present for the application and actual use of the nickel-hydrogen battery.

As evident from these facts, the hydrogen-absorbing alloy has many possibilities for various applications in view of its physical and chemical characteristics, so that the hydrogen-absorbing alloy is now considered as being one of important raw materials in future industries.

The metal capable of absorbing hydrogen may be in the form of single substance which reacts exothermically with hydrogen, i.e., a metal element capable of forming a stable compound together with hydrogen (for example, Pd, Ti, Zr, V, rare earth elements and alkaline earth elements); or in the form of an alloy comprising an above-mentioned metal alloyed with other kinds of metal.

One of the advantages of the alloying is that the bonding strength between a metal and hydrogen can be suitably weakened so that not only the absorption reaction but also the desorption (releasing) reaction can be performed comparatively easily. Second advantage of the alloying is that the absorption and desorption characteristics of the alloy such as the magnitude of hydrogen gas pressure required for the reaction (equilibrium pressure; plateau pressure), the extent of equilibrium region (plateau region), the change (flatness) of equilibrium pressure during the process of absorbing hydrogen, etc. can be improved. Third advantage of the alloying is the improvement in chemical and physical stability of the alloy.

The composition of the conventional hydrogen-absorbing alloy may be classified into the following types;

(1) a rare earth element type (for example, $LaNi_5$, $MmNi_5$, etc.);

(2) a Laves type (for example, $ZrV_2$, $ZrMn_2$, etc.);

(3) a titanium type (for example, TiNi, TiFe, etc.);

(4) a magnesium type (for example, $Mg_2Ni$, $MgNi_2$, etc.); and (5) other types (for example, cluster, etc.).

Among them, the rare earth element type hydrogen-absorbing alloy represented by the aforementioned type (1) is now put to practical use as an electrode material. However, the discharge capacity of the alkaline battery comprising this electrode material now reaches to as high as 80% or more of the theoretical capacity, so that any further increase in discharge capacity would be difficult.

By the way, the rare earth element-Ni based intermetallic compound represented by the aforementioned type (1) includes many number of compounds other than an $AB_5$ type compound (A=a metal element which is capable of exothermically reacting with hydrogen, and B=another kind of metal). For example, Mat. Res. Bull., 11, (1976) 1241 describes that an intermetallic compound containing a larger quantity of rare earth element as compared with the $AB_5$ type compound is capable of absorbing a larger quantity of hydrogen in the vicinity of normal temperature as compared with the $AB_5$ type compound. It is also reported that a magnesium-rare earth element based alloy, which is a magnesium-substituted rare earth-Ni based alloy, is capable of absorbing a large quantity of hydrogen gas (Y. Ohsumi, "Soda and Chlorine", 34, 447 (1983)).

It is pointed out by H. Oesterreicher et al in J. Lee-Common Met, 73,339 (1980) that $La_{1-x}Mg_xNi_2$ type alloys for example among the alloys having such compositions are accompanied with a problem that the hydrogen-releasing rate thereof is very low due to the high stability thereof to hydrogen.

There is also a report on a $PuNi_3$ type hydrogen-absorbing alloy having a composition of $Mg_2LaNi_9$, which was made by K. Kadir et al as described in a summary of lecture in the 120th Spring Meeting of Japan Metallic Society, p.289 (1997).

However, the magnesium-rare earth element based alloys having the aforementioned compositions are accompanied with a problem that even though the quantity of hydrogen absorption in a gaseous phase is large, the electrode comprising this alloy scarcely works in an alkaline electrolyte at normal temperature.

Japanese Patent Unexamined Publication S/62-271348 discloses a hydrogen absorption electrode comprising a hydrogen-absorbing alloy represented by a general formula $Mm_{1-x}A_xNi_aCo_bM_c$, while Japanese Patent Unexamined Publication S/62-271349 discloses a hydrogen absorption electrode comprising a hydrogen-absorbing alloy represented by a general formula $La_{1-x}A_xNi_aCo_bM_c$.

However, a metal oxide-hydrogen secondary battery comprising any of these hydrogen absorption electrodes is low in discharge capacity and short in charge/discharge cycle life.

Further, PCT Re-Publication No. WO97/03213 discloses a hydrogen absorption electrode containing a hydrogen-absorbing alloy having a composition represented by a general formula (i); $(R_{1-x}L_x)(Ni_{1-y}M_y)_z$, a specific antiphase boundary and a $LaNi_5$ crystal structure. This hydrogen-absorbing alloy is manufactured by allowing a melt of the alloy represented by the general formula (i) to drop on the surface of a roll, whereby cooling and solidifying the melt under cooling conditions: 50 to 500° C. in supercooling temperature and 1,000 to 10,000° C./sec. in cooling rate, thus obtaining flakes having a thickness of 0.1 to 2.0 mm, which is then heat-treated. This publication also mentions that if the aforementioned manufacturing conditions are not met, the resultant alloy may have two phases, i.e. a $LaNi_5$ type crystal phase and a $Ce_2Ni_7$ type crystal phase, and hence it is impossible to obtain an alloy constituted by the $LaNi_5$ type crystal phase.

However, a metal oxide-hydrogen secondary battery, which comprises a negative electrode containing this hydrogen-absorbing alloy having a composition represented by the general formula (i), a specific antiphase boundary and a LaNi$_5$ crystal structure, is accompanied with a problem that not only the discharge capacity but also the cycle life thereof are not satisfiable.

BRIEF SUMMARY OF THE INVENTION

Accordingly, an object of the present invention is to overcome the problem that the aforementioned magnesium-rare earth element type hydrogen-absorbing alloy is too high in stability to hydrogen to release hydrogen, and hence to provide a hydrogen-absorbing alloy which is capable of easily realizing a hydrogen absorption electrode having a large discharge capacity.

A further object of this invention is to provide a secondary battery which is high in capacity and excellent in charge/discharge cycle life.

Namely, according to the present invention, there is provided a hydrogen-absorbing alloy which contains an alloy ingot manufactured by means of a casting or sintering method or a pulverized product of the alloy ingot, and the alloy ingot being represented by the following general formula (1);

$$(Mg_{1-a-b}R1_aM1_b)Ni_z \qquad (1)$$

wherein R1 is at least one element selected from rare earth elements (including Y); M1 is at least one element selected from elements having a larger electronegativity than that of Mg (excluding the elements of R1, Cr, Mn, Fe, Co, Cu, Zn and Ni); and a, b and z are respectively a number satisfying conditions: $0.1 \leq a \leq 0.8$, $0 < b \leq 0.9$, $1-a-b > 0$, and $3 \leq z \leq 3.8$.

According to the present invention, there is further provided a hydrogen-absorbing alloy which contains an alloy ingot manufactured by means of a casting or sintering method or a pulverized product of the alloy ingot, and the alloy ingot being represented by the following general formula (2);

$$Mg_{1-a}R1_a(Ni_{1-x}M2_x)_z \qquad (2)$$

wherein R1 is at least one element selected from rare earth elements (including Y); M2 is at least one element selected from the group consisting of Cr, Mn, Fe, Co, Cu and Zn; and a, x and z are respectively a number satisfying conditions: $0.1 \leq a \leq 0.8$, $0 \leq x \leq 0.9$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (3);

$$Mg_{1-a-b}R1_aM1_b(Ni_{1-x}M2_x)_z \qquad (3)$$

wherein R1 is at least one element selected from rare earth elements (including Y); M2 is at least one element selected from the group consisting of Cr, Mn, Fe, Co, Cu and Zn; M1 is at least one element selected from elements having a larger electronegativity than that of Mg (excluding the elements of R1, the elements of M1 and Ni); and a, b, x and z are respectively a number satisfying conditions: $0.1 \leq a \leq 0.8$, $0 < b \leq 0.9$, $1-a-b > 0$, $0 < x \leq 0.9$, and $3 \leq z \leq 3.8$.

According to the present invention, there is further provided a hydrogen-absorbing alloy which contains an alloy ingot manufactured by means of a casting or sintering method or a pulverized product of the alloy ingot, and the alloy ingot being represented by the following general formula (4);

$$Mg_{1-a}R1_a(Ni_{1-x}M3_x)_z \qquad (4)$$

wherein R1 is at least one element selected from rare earth elements (including Y); M3 is at least one element selected from the group consisting of Co, Mn, Fe, Al, Ga, Zn, Sn, Cu, Si and B; and a, x and z are respectively a number satisfying conditions: $0.65 \leq a \leq 0.8$, $0 < x \leq 0.6$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (5);

$$Mg_{1-a-b}R1_aT1_b(Ni_{1-x}M3_x)_z \qquad (5)$$

wherein R1 is at least one element selected from rare earth elements (including Y); T1 is at least one element selected from the group consisting of Ca, Ti, Zr and Hf; M3 is at least one element selected from the group consisting of Co, Mn, Fe, Al, Ga, Zn, Sn, Cu, Si and B; and a, b, x and z are respectively a number satisfying conditions: $0.65 \leq a < 0.8$, $0 < b \leq 0.3$, $0.65 < (a+b) \leq 0.8$, $0 < x \leq 0.6$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (6);

$$Mg_aR1_{1-a}(Ni_{1-x-y}Co_xM4_y)_z \qquad (6)$$

wherein R1 is at least one element selected from rare earth elements (including Y); M4 is at least one element selected from the group consisting of Mn, Fe, V, Cr, Nb, Al, Ga, Zn, Sn, Cu, Si, P and B; and a, x, y and z are respectively a number satisfying conditions: $0.2 \leq a \leq 0.35$, $0 < x \leq 0.5$, $0 \leq y \leq 0.2$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (7);

$$Mg_aR1_{1-a-b}T2_b(Ni_{1-x-y}Co_xM4_y)_z \qquad (7)$$

wherein R1 is at least one element selected from rare earth elements (including Y); T2 is at least one element selected from the group consisting of Ca, Ti and Zr; M4 is at least one element selected from the group consisting of Mn, Fe, V, Cr, Nb, Al, Ga, Zn, Sn, Cu, Si, P and B; and a, b, x, y and z are respectively a number satisfying conditions: $0.2 \leq a \leq 0.35$, $0 < b \leq 0.3$, $0 < x \leq 0.5$, $0 \leq y \leq 0.2$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (8);

$$Mg_a(La_{1-b}R1_b)_{1-a}Ni_z \qquad (8)$$

wherein R1 is at least one element selected from rare earth elements (including Y) but is not La; and a, b and z are respectively a number satisfying conditions: $0.2 \leq a \leq 0.35$, $0.01 \leq b < 0.5$, and $3 \leq z \leq 3.8$.

Further, according to the present invention, there is also provided a hydrogen-absorbing alloy which contains an alloy ingot manufactured by means of a casting or sintering method or a pulverized product of the alloy ingot, and the alloy ingot being represented by the following general formula (9);

$$Mg_a(La_{1-b}R1_b)_{1-a}(Ni_{1-x}M3_x)_z \qquad (9)$$

wherein R1 is at least one element selected from rare earth elements (including Y) but is not La; M3 is at least one element selected from the group consisting of Co, Mn, Fe, Al, Ga, Zn, Sn, Cu, Si and B; and a, b, x and z are respectively a number satisfying conditions: $0.2 \leq a \leq 0.35$, $0.01 \leq b < 0.5$, $0.1 \leq x \leq 0.6$, and $3 \leq z \leq 3.8$.

Further, according to the present invention, there is also provided a hydrogen-absorbing alloy containing an alloy represented by the following general formula (10);

$$Mg_a R2_{1-a-b} T1_b (Ni_{1-x} M3_x)_z \qquad (10)$$

wherein R2 is two or more kinds of element selected from rare earth elements (including Y), the content of Ce constituting the R2 being less than 20% by weight; T1 is at least one element selected from the group consisting of Ca, Ti, Zr and Hf; M3 is at least one element selected from the group consisting of Mn, Fe, Co, Al, Ga, Zn, Sn, Cu, Si and B; and a, b, x and z are respectively a number satisfying conditions: $0 < a \leq 0.5$, $0 \leq b \leq 0.3$, $0 \leq x \leq 0.9$, and $3 \leq z < 4$.

Further, according to the present invention, there is also provided a hydrogen-absorbing alloy containing an alloy represented by the following general formula (11);

$$Mg_a R3_{1-a-b} T1_b (Ni_{1-x-y} M5_x Co_y)_z \qquad (11)$$

wherein R3 is two or more kinds of element selected from rare earth elements (including Y); T1 is at least one element selected from the group consisting of Ca, Ti, Zr and Hf; M5 is at least one element selected from the group consisting of Mn, Fe, Al, Ga, Zn, Sn, Cu, Si and B; a, b, x, y and z are respectively a number satisfying conditions: $0 < a \leq 0.5$, $0 \leq b \leq 0.3$, $0 \leq x \leq 0.9$, $0 < y \leq 0.4$, $x+y \leq 0.9$, and $3 \leq z < 4$, the content of Ce constituting the R3 being less than m % by weight where m is represented by the following formula (I);

$$m = 125y + 20 \qquad (I)$$

wherein y is a quantity of Co in the aforementioned general formula (11).

Further, according to the present invention, there is also provided a hydrogen-absorbing alloy comprising an alloy represented by the following general formula (12), the alloy containing a principal phase having a composition where the a and z in the general formula (12) meet the following formula (II), and the alloy having a plane defect in the principal phase which is not more than 20 in number per 100 nm;

$$Mg_a R1_{1-a-b} T1_b (Ni_{1-x} M6_x)_z \qquad (12)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions: $0.2 \leq a \leq 0.35$, $0 \leq b \leq 0.3$, $0 < x \leq 0.6$, and $3 \leq z \leq 3.8$;

$$z = -6 \times a + \delta \qquad (II)$$

wherein $\delta$ is: $5 - 0.2 \leq \delta \leq 5 + 0.2$.

Further, according to the present invention, there is also provided a hydrogen-absorbing alloy comprising an alloy represented by the following general formula (13), the alloy containing more than 70% by volume of crystal grain having a plane defect of not more than 20 in number per 100 nm and a principal phase having a composition where the a and z in the general formula (13) meet the following formula (II);

$$Mg_a R1_{1-a-b} T1_b (Ni_{1-x} M6_x)_z \qquad (13)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, \, 0 \leq b \leq 0.3, \, 0 < x \leq 0.6, \text{ and} \qquad (II)$$
$$3 \leq z \leq 3.8;$$
$$z = -6 \times a + \delta$$

wherein $\delta$ is: $5 - 0.2 \leq \delta \leq 5 + 0.2$.

Further, according to the present invention, there is also provided a hydrogen-absorbing alloy comprising an alloy represented by the following general formula (14), the alloy containing a principal phase having a composition where the a and z in the general formula (14) meet the following formula (II), not more than 20% by volume of a phase having a $CaCu_5$ type crystal structure and not more than 10% by volume of a phase having a $MgCu_2$ type crystal structure;

$$Mg_a R1_{1-a-b} T1_b (Ni_{1-x} M6_x)_z \qquad (14)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, \, 0 \leq b \leq 0.3, \, 0 < x \leq 0.6, \text{ and} \qquad (II)$$
$$3 \leq z \leq 3.8;$$
$$z = -6 \times a + \delta$$

wherein $\delta$ is: $5 - 0.2 \leq \delta \leq 5 + 0.2$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (1);

$$(Mg_{1-a-b}R1_aM1_b)Ni_z \qquad (1)$$

wherein R1 is at least one element selected from rare earth elements (including Y); M1 is at least one element selected from elements having a larger electronegativity than that of Mg (excluding the elements of R1, Cr, Mn, Fe, Co, Cu, Zn and Ni); and a, b and z are respectively a number satisfying conditions: $0.1 \leq a \leq 0.8$, $0 < b \leq 0.9$, $1-a-b > 0$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (2);

$$Mg_{1-a}R1_a(Ni_{1-x}M2_x)_z \qquad (2)$$

wherein R1 is at least one element selected from rare earth elements (including Y); M2 is at least one element selected from the group consisting of Cr, Mn, Fe, Co, Cu and Zn; and a, x and z are respectively a number satisfying conditions: $0.1 \leq a \leq 0.8$, $0 < x \leq 0.9$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (3);

$$Mg_{1-a-b}R1_aM1_b(Ni_{1-x}M2_x)_z \qquad (3)$$

wherein R1 is at least one element selected from rare earth elements (including Y); M2 is at least one element selected from the group consisting of Cr, Mn, Fe, Co, Cu and Zn; M1 is at least one element selected from elements having a larger electronegativity than that of Mg (excluding the elements of R1, the elements of M1 and Ni); and a, b, x and z are respectively a number satisfying conditions: $0.1 \leq a \leq 0.8$, $0 < b \leq 0.9$, $1-a-b > 0$, $0 < x \leq 0.9$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (4);

$$Mg_{1-a}R1_a(Ni_{1-x}M3_x)_z \qquad (4)$$

wherein R1 is at least one element selected from rare earth elements (including Y); M3 is at least one element selected from the group consisting of Co, Mn, Fe, Al, Ga, Zn, Sn, Cu, Si and B; and a, x and z are respectively a number satisfying conditions: $0.65 \leq a \leq 0.8$, $0 < x \leq 0.6$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (5);

$$Mg_{1-a-b}R1_aT1_b(Ni_{1-x}M3_x)_z \qquad (5)$$

wherein R1 is at least one element selected from rare earth elements (including Y); T1 is at least one element selected from the group consisting of Ca, Ti, Zr and Hf; M3 is at least one element selected from the group consisting of Co, Mn, Fe, Al, Ga, Zn, Sn, Cu, Si and B; and a, b, x and z are respectively a number satisfying conditions: $0.65 \leq a < 0.8$, $0 < b \leq 0.3$, $0.65 < (a+b) \leq 0.8$, $0 < x \leq 0.6$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (6);

$$Mg_aR1_{1-a}(Ni_{1-x-y}Co_xM4_y)_z \qquad (6)$$

wherein R1 is at least one element selected from rare earth elements (including Y); M4 is at least one element selected from the group consisting of Mn, Fe, V, Cr, Nb, Al, Ga, Zn, Sn, Cu, Si, P and B; and a, x, y and z are respectively a number satisfying conditions: $0.2 \leq a \leq 0.35$, $0 < x \leq 0.5$, $0 \leq y \leq 0.2$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (7);

$$Mg_aR1_{1-a-b}T2_b(Ni_{1-x-y}Co_xM4_y)_z \qquad (7)$$

wherein R1 is at least one element selected from rare earth elements (including Y); T2 is at least one element selected from the group consisting of Ca, Ti and Zr; M4 is at least one element selected from the group consisting of Mn, Fe, V, Cr, Nb, Al, Ga, Zn, Sn, Cu, Si, P and B; and a, b, x, y and z are respectively a number satisfying conditions: $0.2 \leq a \leq 0.35$, $0 < b \leq 0.3$, $0 < x \leq 0.5$, $0 \leq y \leq 0.2$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (8);

$$Mg_a(La_{1-b}R1_b)_{1-a}Ni_z \qquad (8)$$

wherein R1 is at least one element selected from rare earth elements (including Y) but is not La; and a, b and z are respectively a number satisfying conditions: $0.2 \leq a \leq 0.35$, $0.01 \leq b < 0.5$, and $3 \leq z \leq 3.8$.

Further, according to the present invention, there is also provided a secondary battery comprising a negative electrode containing hydrogen-absorbing alloy particles comprising a pulverized product of an alloy ingot manufactured by means of a casting or sintering method and the alloy ingot being represented by the following general formula (9);

$$Mg_a(La_{1-b}R1_b)_{1-a}(Ni_{1-x}M3_x)_z \qquad (9)$$

wherein R1 is at least one element selected from rare earth elements (including Y) but is not La; M3 is at least one element selected from the group consisting of Co, Mn, Fe, Al, Ga, Zn, Sn, Cu, Si and B; and a, b, x and z are respectively a number satisfying conditions: $0.2 \leq a \leq 0.35$, $0.01 \leq b < 0.5$, $0.1 \leq x \leq 0.6$, and $3 \leq z \leq 3.8$.

Further, according to the present invention, there is also provided a secondary battery comprising a negative electrode containing a hydrogen-absorbing alloy comprising an alloy represented by the following general formula (10);

$$Mg_aR2_{1-a-b}T1_b(Ni_{1-x}M3_x)_z \tag{10}$$

wherein R2 is two or more kinds of element selected from rare earth elements (including Y), the content of Ce constituting the R2 being less than 20% by weight; T1 is at least one element selected from the group consisting of Ca, Ti, Zr and Hf; M3 is at least one element selected from the group consisting of Mn, Fe, Co, Al, Ga, Zn, Sn, Cu, Si and B; and a, b, x and z are respectively a number satisfying conditions: $0 < a \leq 0.5$, $0 \leq b \leq 0.3$, $0 \leq x \leq 0.9$, and $3 \leq z < 4$.

Further, according to the present invention, there is also provided a secondary battery comprising a negative electrode containing a hydrogen-absorbing alloy comprising an alloy represented by the following general formula (11);

$$Mg_aR3_{1-a-b}T1_b(Ni_{1-x-y}M5_xCo_y)_z \tag{11}$$

wherein R3 is two or more kinds of element selected from rare earth elements (including Y); T1 is at least one element selected from the group consisting of Ca, Ti, Zr and Hf; M5 is at least one element selected from the group consisting of Mn, Fe, Al, Ga, Zn, Sn, Cu, Si and B; a, b, x, y and z are respectively a number satisfying conditions: $0 < a \leq 0.5$, $0 \leq b \leq 0.3$, $0 \leq x \leq 0.9$, $0 < y \leq 0.4$, $x+y \leq 0.9$, and $3 \leq z < 4$, the content of Ce constituting the R3 being less than m % by weight where m is represented by the following formula (I);

$$m = 125y + 20 \tag{I}$$

wherein y is a quantity of Co in the aforementioned general formula (11).

Further, according to the present invention, there is also provided a secondary battery comprising a negative electrode containing a hydrogen-absorbing alloy comprising an alloy represented by the following general formula (12), the alloy containing a principal phase having a composition where the a and z in the general formula (12) meet the formula (II), and the alloy having a plane defect in the principal phase which is not more than 20 in number per 100 nm;

$$Mg_aR1_{1-a-b}T1_b(Ni_{1-x}M6_x)_z \tag{12}$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \tag{II}$$

$$3 \leq z \leq 3.8;$$

$$z = -6 \times a + \delta$$

wherein $\delta$ is: $5 - 0.2 \leq \delta \leq 5 + 0.2$.

Further, according to the present invention, there is also provided a secondary battery comprising a negative electrode containing a hydrogen-absorbing alloy comprising an alloy represented by the following general formula (13), the alloy containing more than 70% by volume of crystal grain having a plane defect of not more than 20 in number per 100 nm and a principal phase having a composition where the a and z in the general formula (13) meet the following formula (II);

$$Mg_aR1_{1-a-b}T1_b(Ni_{1-x}M6_x)_z \tag{13}$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \tag{II}$$

$$3 \leq z \leq 3.8;$$

$$z = -6 \times a + \delta$$

wherein $\delta$ is: $5 - 0.2 \leq \delta \leq 5 + 0.2$.

Further, according to the present invention, there is also provided a secondary battery comprising a negative electrode containing a hydrogen-absorbing alloy comprising an alloy represented by the following general formula (14), the alloy containing a principal phase having a composition where the a and z in the general formula (14) meet the following formula (II), not more than 20% by volume of a phase having a $CaCu_5$ type crystal structure and not more than 10% by volume of a phase having a $MgCu_2$ type crystal structure;

$$Mg_aR1_{1-a-b}T1_b(Ni_{1-x}M6_x)_z \tag{14}$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \tag{II}$$

$$3 \leq z \leq 3.8;$$

$$z = -6 \times a + \delta$$

wherein $\delta$ is: $5 - 0.2 \leq \delta \leq 5 + 0.2$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
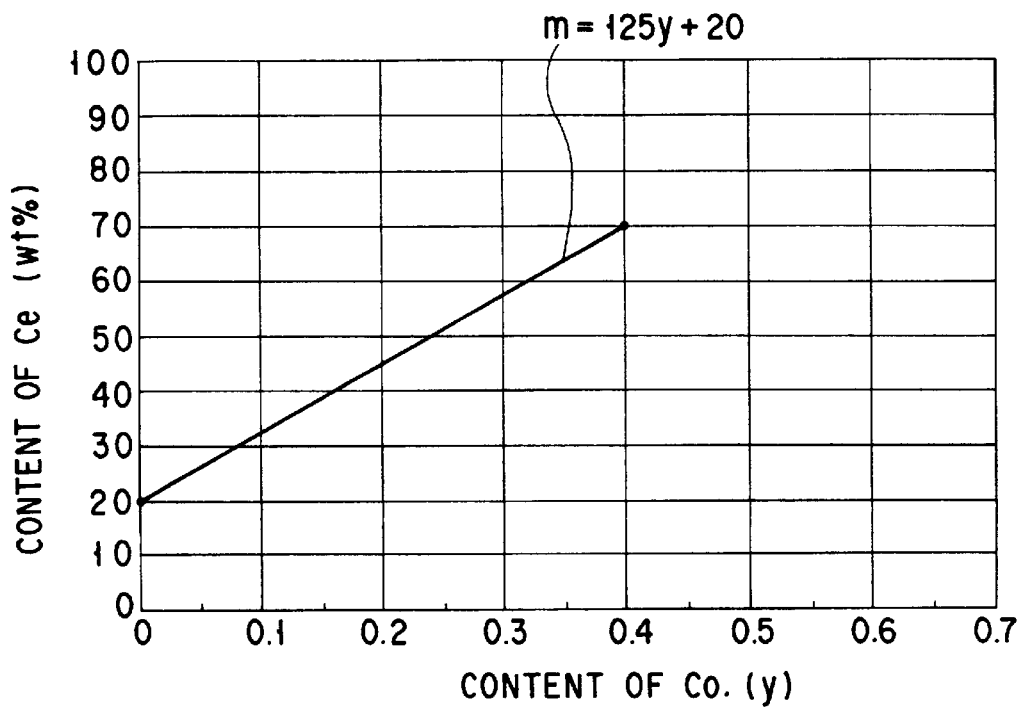
FIG. 1 is a graph showing a relationship between the content of Ce and the content of Co in R3 in a hydrogen-absorbing alloy according to this invention.

Next, fourteen kinds of hydrogen-absorbing alloy according to this invention will be explained in detail as follows.

(A) A First Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (1);

$$(Mg_{1-a-b}R1_a M1_b)Ni_z \qquad (1)$$

wherein R1 is at least one element selected from rare earth elements (including Y); M1 is at least one element selected from elements having a larger electronegativity than that of Mg (excluding the elements of R1, Cr, Mn, Fe, Co, Cu, Zn and Ni); and a, b and z are respectively a number satisfying conditions: $0.1 \leq a \leq 0.8$, $0 < b \leq 0.9$, $1-a-b>0$, and $3 \leq z \leq 3.8$.

In view of saving the manufacturing cost of a hydrogen-absorbing alloy, the aforementioned element R1 should preferably be at least one kind of element selected from the group consisting of La, Ce, Pr, Nd and Y. Among them, it is preferable to employ a misch metal which is mixture of rare earth elements. This misch metal should preferably be an alloy where the content of La, Ce, Pr and Nd accounts for 99 wt % or more. Specific examples of such a misch metal are a Ce-rich misch metal (Mm) containing 50 wt % or more of Ce and not more than 30 wt % of La, or a La-rich misch metal (Lm) where the content of La is larger than that of the aforementioned Mm.

The reason for limiting the range of (a) is as follows. Namely, if the value of (a) is less than 0.1, it may become difficult to enhance the hydrogen absorption rate of the alloy. on the other hand, if the value of (a) exceeds over 0.8, it may become difficult to improve the rechargeable hydrogen storage capacity of the alloy, so that the properties inherent to the Mg-based alloy may be vanished. A more preferable range of the (a) is $0.35 \leq a \leq 0.8$.

The aforementioned M1 may be Al:1.5, Ta:1.5, V:1.6, Nb:1.6, Ga:1.6, In:1.7, Ge:1.8, Pb:1.8, Mo:1.8, Sn:1.8, Si:1.8, Re:1.9, Ag:1.9, B:2.0, C:2.5, P:2.1, Ir:2.2, Rh:2.2, Ru:2.2, Os:2.2, Pt:2.2, Au:2.4, Se:2.4 and S:2.5. This M1 can be one or more than one kinds of these elements. The numerical value following the symbol ":" in each element denotes an electronegativity of a metal as the value of polling is employed. By the way, the electronegativity of Mg as the value of polling is employed is 1.2.

It is possible to increase the hydrogen equilibrium pressure of the alloy by substituting the M1 for a portion of Mg by the aforementioned quantity ($0<b \leq 0.9$). As a result of this substitution, it is possible to enhance the working voltage of the alkaline secondary battery comprising a negative electrode containing the aforementioned alloy, whereby the discharge capacity and charge/discharge cycle life of the battery can be improved.

Further, the alloy having such a composition is capable of improving the hydrogen absorption/desorption rate assumably due to the following mechanism. Namely, there is a correlation in many of hydride of simple metal that the larger the difference in electro-negativity between a metal and hydrogen is, the larger is the bonding force between a metal and hydrogen. When the change in bonding force between the alloy and hydrogen by substituting another element for a portion of Mg is examined from the viewpoint of electro-negativity, it is assumed that the larger the difference in electronegativity between a metal and hydrogen is, the larger the ionic bond becomes between the metal and hydrogen, thus enhancing the bond between the metal and hydrogen, and increasingly stabilizing the hydrogen absorbed therein.

Therefore, when the aforementioned M1 is selected from those having a larger electronegativity than that of Mg, the difference in electronegativity between the hydrogen-absorbing alloy and hydrogen can be minimized, and hence the hydrogen inside the crystal lattice of the alloy is assumed to be made unstable, thus resulting in an improvement in hydrogen absorption/desorption property of the hydrogen-absorbing alloy.

Especially, when Al or Ag, or both are employed as the M1, the crystal lattice of the hydrogen-absorbing alloy can be expanded, thus improving the hydrogen absorption/desorption property of the hydrogen-absorbing alloy.

Further, when the value of "b" exceeds over 0.9, the crystal structure of the hydrogen-absorbing alloy may be prominently altered, thus deteriorating the properties inherent to the Mg-based alloy. Additionally, the hydrogen-absorbing alloy of this composition would be sharply deteriorated in catalytic activity at the moment of hydrogen absorption. More preferable range of the "b" is $0.1 \leq b \leq 0.8$.

The reason for limiting the range of (z) is as follows. Namely, if the value of (z) is less than 3.0, the hydrogen inside the alloy is highly stabilized, thus minimizing the desorption of hydrogen from the alloy. On the other hand, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This first hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This first hydrogen-absorbing alloy can be manufactured by means of a casting or sintering method as explained below.

(Casting method)

(a) Each element was weighed to obtain a predetermined mixture, which was then melted by means of an induction furnace in an argon atmosphere for instance, and cast in a mold to obtain an alloy ingot having an aimed composition.

(b) Mother alloys such as an $RNi_5$-type alloy, an $R_2Ni_7$-type alloy, an $RNi_3$-type alloy, an $RNi_2$-type alloy, an Mg$_2$Ni-type alloy, and an MgNi$_2$-type alloy were prepared by means of an induction furnace. Then, each mother alloy was weighed to obtain a predetermined mixture and then melted by means of an induction furnace, the resultant melt being cast in a mold to obtain an alloy ingot having an aimed composition.

(Sintering method)

(a) Each element was weighed to obtain a predetermined mixture, which was then sintered in an argon atmosphere for instance, the resultant sintered product being subsequently heat-treated at around the melting point thereof to obtain an alloy ingot having an aimed composition.

(b) Mother alloys having a relatively high melting point, such as an RNi$_5$-type alloy, an R$_2$Ni$_7$-type alloy, an RNi$_3$-type alloy, an RNi$_2$-type alloy, and an RNi-type alloy were prepared by means of an induction furnace. At the same time, another kind of mother alloy such as an Mg$_2$Ni-type alloy and an MgNi$_2$-type alloy were prepared by means of an induction furnace. Then, each powder of mother alloy was weighed and mixed to obtain a predetermined composition, which was then heat-treated at around the melting point thereof to obtain an alloy ingot having an aimed composition.

The alloy ingot thus obtained is then preferably heat-treated in vacuum or in an inert atmosphere at a temperature ranging from 300° C. to less than melting point thereof for a time period ranging from 0.1 to 500 hours. It is possible through this heat treatment to alleviate the distortion in lattice of the alloy, so that the hydrogen absorption/desorption characteristics such as the hydrogen absorption/desorption rate of the alloy can be improved. The heat treatment temperature should preferably be in the range from 750 to 1,050° C., more preferably in the range from 800 to 1,000° C. Further, the heat treatment period should preferably be in the range from 0.5 to 100 hours, more preferably in the range from 1 to 20 hours.

(B) A Second Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (2);

$$Mg_{1-a}R1_a(Ni_{1-x}M2_x)_z \quad (2)$$

wherein R1 is at least one element selected from rare earth elements (including Y); M2 is at least one element selected from the group consisting of Cr, Mn, Fe, Co, Cu and Zn; and a, x and z are respectively a number satisfying conditions:
0.1≦a≦0.8, 0<x≦0.9, and 3≦z≦3.8.

Specific examples of the element R1 may be the same as explained with reference to the aforementioned first alloy.

The reason for limiting the range of (a) is as follows. Namely, if the value of (a) is less than 0.1, it may become difficult to improve the hydrogen desorption property of the alloy. On the other hand, if the value of (a) exceeds over 0.8, it may become difficult to improve the rechargeable hydrogen storage capacity of the alloy, so that the properties inherent to the Mg-based alloy may be vanished. A more preferable range of (a) is 0.65≦a≦0.80.

It is possible to improve the hydrogen absorption/desorption rate of the alloy by substituting the M2 for a portion of Ni by the aforementioned quantity (0<x≦0.9). This may be attributed to the fact that the M2 is an element which is incapable of thermally reacting with hydrogen, i.e. an element which is hardly capable of spontaneously producing a hydride, so that the hydrogen absorption and desorption of the hydrogen-absorbing alloy can be facilitated by the addition of the M2.

Further, an alkaline secondary battery comprising a negative electrode containing this alloy enables the charge/discharge cycle property thereof to be remarkably improved. It is preferably that this M2 is Co or Mn, or both of Co and Mn.

Further, when the value of "x" exceeds over 0.9, the crystal structure of the hydrogen-absorbing alloy may be prominently altered, thus deteriorating the properties inherent to the Mg-based alloy. More preferable range of the "x" is 0.1≦x≦0.8.

The reason for limiting the range of (z) is as follows. Namely, if the value of (z) is less than 3.0, the hydrogen inside the alloy is highly stabilized, thus minimizing the desorption of hydrogen from the alloy. On the other hand, if the value of (z) exceeds over 3.8, the hydrogen site in the alloy would be reduced, thus possibly decreasing the quantity of hydrogen absorption. A more preferable range of the content (z) is 3.0≦z≦3.6.

This second hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This second hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(C) A Third Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (3);

$$Mg_{1-a-b}R1_aM1_b(Ni_{1-x}M2_x)_z \quad (3)$$

wherein R1 is at least one element selected from rare earth elements (including Y); M2 is at least one element selected from the group consisting of Cr, Mn, Fe, Co, Cu and Zn; M1 is at least one element selected from elements having a larger electronegativity than that of Mg (excluding the elements of R1, the elements of M1 and Ni); and a, b, x and z are respectively a number satisfying conditions: 0.1≦a≦0.8, 0<b≦0.9, 1−a−b>0, 0<x≦0.9, and 3≦z≦3.8.

Specific examples of the element R1 may be the same as explained with reference to the aforementioned first alloy.

The reason for limiting the range of (a) is as follows. Namely, if the value of (a) is less than 0.1, it may become difficult to enhance the hydrogen absorption rate of the alloy. On the other hand, if the value of (a) exceeds over 0.8, it may become difficult to improve the rechargeable hydrogen storage capacity of the alloy, so that the properties inherent to the Mg-based alloy may be vanished. A more preferable range of the (a) is 0.35≦a≦0.8.

As for the element M1 of this alloy, the same kinds of element as explained with reference to the aforementioned first alloy can be employed. Especially, it is preferable to employ Al or Ag, or both as the M1. Because, a hydrogen-absorbing alloy containing such an M1 is capable of expanding the crystal lattice of the hydrogen-absorbing alloy, thus further improving the hydrogen absorption/desorption property thereof.

It is possible to increase the hydrogen equilibrium pressure of the alloy by limiting the range of (b) to the aforementioned range. As a result, it is possible to enhance the working voltage of the alkaline secondary battery comprising a negative electrode containing the aforementioned alloy, whereby the discharge capacity and charge/discharge cycle life of the battery can be improved.

Further, when the value of "b" exceeds over 0.9, the crystal structure of the hydrogen-absorbing alloy may be prominently altered, thus deteriorating the properties inherent to the Mg-based alloy. More preferable range of "b" is $0.1 \leq b \leq 0.8$.

It is possible to improve the hydrogen absorption/desorption rate of the alloy by substituting the M2 for a portion of Ni by the aforementioned quantity ($0<x \leq 0.9$). Further, an alkaline secondary battery comprising a negative electrode containing this alloy enables the charge/discharge cycle property thereof to be remarkably improved.

Further, when the value of "x" exceeds over 0.9, the crystal structure of the hydrogen-absorbing alloy may be prominently altered, thus deteriorating the properties inherent to the Mg-based alloy. It is preferably that this M2 is Co or Mn, or both of Co and Mn. More preferable range of "x" is $0.1 \leq x \leq 0.8$.

The reason for limiting the range of (z) is as follows. Namely, if the value of (z) is less than 3.0, the hydrogen inside the alloy is highly stabilized, thus minimizing the desorption of hydrogen from the alloy. On the other hand, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This third hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This third hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(D) A Fourth Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (4);

$$Mg_{1-a}R1_a(Ni_{1-x}M3_x)_z \qquad (4)$$

wherein R1 is at least one element selected from rare earth elements (including Y); M3 is at least one element selected from the group consisting of Co, Mn, Fe, Al, Ga, Zn, Sn, Cu, Si and B; and a, x and z are respectively a number satisfying conditions: $0.65 \leq a \leq 0.8$, $0<x \leq 0.6$, and $3 \leq z \leq 3.8$.

Specific examples of the element R1 in the general formula (4) may be the same as explained with reference to the aforementioned first alloy.

The reason for limiting the range of "a" is as follows. Namely, if the value of "a" is less than 0.65, the crystal structure of the alloy may be altered, so that the quantity of hydrogen absorption may be decreased. On the other hand, if the value of "a" exceeds over 0.8, it may become difficult to improve the hydrogen desorption property of the alloy.

It is possible to improve the hydrogen absorption/desorption property such as the hydrogen absorption/desorption rate of the alloy by selecting at least one kind of element selected from the group consisting of Co, Mn, Fe, Al, Ga, Zn, Sn, Cu, Si and B as the element M3 in the general formula (4). This may be attributed to the fact that the M3 is an element which is incapable of thermally reacting with hydrogen, i.e. an element which is hardly capable of spontaneously producing a hydride, so that the hydrogen absorption and desorption of the hydrogen-absorbing alloy can be facilitated by substituting the M3 for a portion of Ni. Further, a metal oxide-hydrogen secondary battery comprising a negative electrode containing this alloy enables the charge/discharge cycle property thereof to be remarkably improved.

When the value of (x) exceeds over 0.6, the discharge capacity of a metal oxide-hydrogen secondary battery comprising a negative electrode containing this alloy would be lowered. A more preferable range of the (x) is $0.01 \leq x \leq 0.5$.

The reason for limiting the range of (z) is as follows. Namely, if the value of (z) is less than 3.0, the hydrogen inside the alloy is highly stabilized, thus minimizing the desorption of hydrogen from the alloy. When the value of (z) is made not less than 3, the hydrogen absorption/desorption property such as the hydrogen absorption/desorption rate of the alloy can be sufficiently improved, thus making it possible to realize a metal oxide-hydrogen secondary battery improved in discharge capacity and in charge/discharge cycle property. However, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This fourth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This fourth hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(E) A Fifth Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (5);

$$Mg_{1-a-b}R1_aT1_b(Ni_{1-x}M3_x)_z \qquad (5)$$

wherein R1 is at least one element selected from rare earth elements (including Y); T1 is at least one element selected from the group consisting of Ca, Ti, Zr and Hf; M3 is at least one element selected from the group consisting of Co, Mn, Fe, Al, Ga, Zn, Sn, Cu, Si and B; and a, b, x and z are respectively a number satisfying conditions: $0.65 \leq a < 0.8$, $0<b \leq 0.3$, $0.65<(a+b) \leq 0.8$, $0<x \leq 0.6$, and $3 \leq z \leq 3.8$.

Specific examples of the element R1 in the general formula (5) may be the same as explained with reference to the aforementioned first alloy.

The reason for limiting the range of "a" is as follows. Namely, if the value of "a" is less than 0.65, the crystal structure of the alloy may be altered, so that the quantity of hydrogen absorption may be decreased. On the other hand, if the value of "a" is 0.8 or more, it may become difficult to improve the hydrogen desorption property of the alloy.

It is possible to improve the property of the alloy such as the hydrogen absorption/desorption rate without greatly decreasing the hydrogen absorption quantity of the alloy by selecting at least one kind of element selected from the group consisting of Ca, Ti, Zr and Hf as the T1. At the same time, the pulverization of the alloy resulting from the absorption and desorption of hydrogen can be suppressed.

When the value of (b) exceeds over 0.3, the aforementioned effects, i.e. the improvement of desorption property and the suppression of pulverization cannot be realized, thus deteriorating the discharge capacity and charge/discharge cycle life of the secondary battery. There is a tendency that the smaller the value of (b) is, the longer would be the charge/discharge cycle life. In view of ensuring a long cycle life, the value of (b) should preferably be 0.2 or less.

The reason for limiting the total (a+b) of the (a) and (b) to the aforementioned range is as follows. Namely, if the total (a+b) is not more than 0.65, the crystal structure of the alloy may be altered, so that the quantity of hydrogen absorption may be decreased. On the other hand, if the total (a+b) exceeds over 0.8, it may become difficult to improve the hydrogen desorption property of the alloy.

It is possible to improve the hydrogen absorption/desorption property such as the hydrogen absorption/desorption rate of the alloy by selecting at least one kind of element selected from the group consisting of Co, Mn, Fe, Al, Ga, Zn, Sn, Cu, Si and B as the element M3. This may be attributed to the fact that the M3 is an element which is incapable of thermally reacting with hydrogen, i.e. an element which is hardly capable of spontaneously producing a hydride, so that the hydrogen absorption and desorption of the hydrogen-absorbing alloy can be facilitated by substituting the M3 for a portion of Ni. Further, a metal oxide-hydrogen secondary battery comprising a negative electrode containing this alloy enables the charge/discharge cycle property thereof to be remarkably improved.

When the value of (x) exceeds over 0.6, the discharge capacity of a metal oxide-hydrogen secondary battery comprising a negative electrode containing this alloy would be lowered. A more preferable range of the (x) is $0.01 \leq x \leq 0.5$.

The reason for limiting the range of (z) is as follows. Namely, if the value of (z) is less than 3.0, the hydrogen inside the alloy is highly stabilized, thus minimizing the desorption of hydrogen from the alloy. When the value of (z) is made not less than 3, the hydrogen absorption/desorption property such as the hydrogen absorption/desorption rate of the alloy can be sufficiently improved, thus making it possible to realize a metal oxide-hydrogen secondary battery improved in discharge capacity and in charge/discharge cycle property. However, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This fifth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This fifth hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(F) A Sixth Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (6);

$$Mg_a R1_{1-a}(Ni_{1-x-y}Co_x M4_y)_z \qquad (6)$$

wherein R1 is at least one element selected from rare earth elements (including Y); M4 is at least one element selected from the group consisting of Mn, Fe, V, Cr, Nb, Al, Ga, Zn, Sn, Cu, Si, P and B; and a, x, y and z are respectively a number satisfying conditions: $0.2 \leq a \leq 0.35$, $0 < x \leq 0.5$, $0 \leq y \leq 0.2$, and $3 \leq z \leq 3.8$.

Specific examples of the element R1 in the general formula (6) may be the same as explained with reference to the aforementioned first alloy.

The reason for limiting the range of (a) is as follows. Namely, if the value of (a) is less than 0.2, it may become difficult to improve the hydrogen desorption property of the alloy. On the other hand, if the value of (a) exceeds over 0.35, the crystal structure of the alloy may be altered, so that the quantity of hydrogen absorption may be decreased.

When the quantity of Co is limited to the aforementioned range, the reversibility in the absorption-desorption of hydrogen can be improved, thus extremely improving the charge/discharge cycle property of a secondary battery. Further, this alloy is small in plateau slope, and moreover, is capable of minimizing the hysteresis and improving the static hydrogen absorption property thereof. However, if the quantity of Co (x) is more than 0.5, it may lead to a lowering in quantity of hydrogen absorption, and at the same time, the oxidation and reduction reaction of Co would be caused to generate if a secondary battery is fabricated using a negative electrode containing this alloy, thus making it difficult to expect a large discharge capacity. A more preferably range of the quantity of Co (x) is $0.03 \leq x \leq 0.35$.

It is possible to improve the hydrogen absorption/desorption property of the alloy such as the hydrogen absorption/desorption rate by selecting at least one kind of element selected from the group consisting of Mn, Fe, V, Cr, Nb, Al, Ga, Zn, Sn, Cu, Si, P and B as the M4. This may be attributed to the facts that the diffusion of hydrogen penetrated into the alloy as well as the absorption/desorption of hydrogen can be facilitated by the substituting the M4 for a portion of Ni. Further, it is possible, when a metal oxide-hydrogen secondary battery is fabricated using a negative electrode containing this alloy, to prominently improve the charge/discharge cycle property of the battery.

If the value of (y) is more than 0.2, it will lead to a deterioration of discharge capacity in a metal oxide-hydrogen secondary battery which is fabricated using a negative electrode containing this alloy. A more preferable range of the (y) is $0.01 \leq y \leq 0.15$.

The reason for limiting the range of (z) is as follows. Namely, if the value of (z) is less than 3.0, the hydrogen inside the alloy is highly stabilized, thus minimizing the desorption of hydrogen from the alloy. When the value of (z) is made not less than 3, the hydrogen absorption/desorption property such as the hydrogen absorption/desorption rate of the alloy can be sufficiently improved, thus making it possible to realize a metal oxide-hydrogen secondary battery improved in discharge capacity and in charge/discharge cycle property. However, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This sixth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This sixth hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(G) A Seventh Hydrogen-Absorbing Alloy

This hydrogen-absorbing alloy contains an alloy ingot manufactured by means of a casting or sintering method or contains a pulverized product of said alloy ingot. The alloy ingot has a composition represented by the following general formula (7);

$$Mg_a R1_{1-a-b} T2_b (Ni_{1-x-y} Co_x M4_y)_z \quad (7)$$

wherein R1 is at least one element selected from rare earth elements (including Y); T2 is at least one element selected from the group consisting of Ca, Ti and Zr; M4 is at least one element selected from the group consisting of Mn, Fe, V, Cr, Nb, Al, Ga, Zn, Sn, Cu, Si, P and B; and a, b, x, y and z are respectively a number satisfying conditions: $0.2 \leq a \leq 0.35$, $0 < b \leq 0.3$, $0 < x \leq 0.5$, $0 \leq y \leq 0.2$, and $3 \leq z \leq 3.8$.

Specific examples of the element R1 in the general formula (7) may be the same as explained with reference to the aforementioned first alloy.

The reason for limiting the range of (a) is as follows. Namely, if the value of (a) is less than 0.2, it may become difficult to improve the hydrogen desorption property of the alloy. On the other hand, if the value of (a) exceeds over 0.35, the crystal structure of the alloy may be altered, so that the quantity of hydrogen absorption may be decreased.

It is possible to improve the property of the alloy such as the hydrogen desorption rate without greatly decreasing the hydrogen absorption quantity of the alloy by limiting the range of (b), and at the same time, the pulverization of the alloy resulting from the absorption and desorption of hydrogen can be suppressed.

When the value of (b) exceeds over 0.3, the aforementioned effects, i.e. the improvement of desorption property and the suppression of pulverization cannot be realized, thus deteriorating the discharge capacity and charge/discharge cycle life of the secondary battery. There is a tendency that the smaller the value of (b) is, the longer would be the charge/discharge cycle life. In view of ensuring a long cycle life, the value of (b) should preferably be 0.2 or less.

When the quantity of Co is limited to the aforementioned range, the reversibility in the absorption-desorption of hydrogen can be improved, thus extremely improving the charge/discharge cycle property of a secondary battery. Further, this alloy is small in plateau slope, and moreover, is capable of minimizing the hysteresis and improving the static hydrogen absorption property thereof. However, if the quantity of Co (x) is more than 0.5, it may lead to a lowering in quantity of hydrogen absorption, and at the same time, the oxidation and reduction reaction of Co would be caused to generate if a secondary battery is fabricated using a negative electrode containing this alloy, thus making it difficult to expect a large discharge capacity A more preferably range of the quantity of Co (x) is $0.03 \leq x \leq 0.35$.

It is possible to improve the hydrogen absorption/desorption property of the alloy such as the hydrogen absorption/desorption rate by limiting the range of (y). This may be attributed to the facts that the diffusion of hydrogen penetrated into the alloy as well as the absorption/desorption of hydrogen can be facilitated by the substituting the M4 for a portion of Ni. Further, it is possible, when a metal oxide-hydrogen secondary battery is fabricated using a negative electrode containing this alloy, to prominently improve the charge/discharge cycle property of the battery.

If the value of (y) is more than 0.2, it will lead to a deterioration of discharge capacity in a metal oxide-hydrogen secondary battery which is fabricated using a negative electrode containing this alloy. A more preferable range of the (y) is $0.01 \leq y \leq 0.15$.

The reason for limiting the range of (z) is as follows. Namely, if the value of (z) is less than 3.0, the hydrogen inside the alloy is highly stabilized, thus minimizing the desorption of hydrogen from the alloy. When the value of (z) is made not less than 3, the hydrogen absorption/desorption property such as the hydrogen absorption/desorption rate of the alloy can be sufficiently improved, thus making it possible to realize a metal oxide-hydrogen secondary battery improved in discharge capacity and in charge/discharge cycle property. However, if the value of (z) exceeds over 3.8, the hydrogen site in the alloy would be reduced, thus possibly decreasing the quantity of hydrogen absorption. A more preferable range of the (z) is $3.0 \leq z \leq 3.6$.

This seventh hydrogen-absorbing alloy may contain an element such as C, N, O or F as a n impurity as far as the content of such an element is within a range which does not hinder the property of the alloy.

However, it is pre ferable that the content of these impurities should be not more than 1 wt % respectively.

This seventh hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(H) A Eighth Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (8);

$$Mg_a (La_{1-b} R1_b)_{1-a} Ni_z \quad (8)$$

wherein R1 is at least one element selected from rare earth elements (including Y) but is not La; and a, b and z are respectively a number satisfying conditions: $0.2 \leq a \leq 0.35$, $0.01 \leq b < 0.5$, and $3 \leq z \leq 3.8$.

Specific examples of the element R1 in the general formula (8) may be the same as explained with reference to the aforementioned first alloy.

The reason for limiting the range of (a) is as follows. Namely, if the value of (a) is less than 0.2, it may become difficult to improve the hydrogen desorption property of the alloy. On the other hand, if the value of (a) exceeds over 0.35, the crystal structure of the alloy may be altered, so that the quantity of hydrogen absorption may be decreased.

The reason for limiting the range of (b) is as follows. Namely, if the value of (b) is less than 0.01, it may become difficult to enhance the hydrogen equilibrium pressure of the alloy and the working voltage of the secondary battery. Although it is possible to enhance the hydrogen equilibrium pressure of the alloy by increasing the value of (b), the quantity of hydrogen absorption may be decreased if the value of the (b) becomes 0.5 or more.

The reason for limiting the range of (z) is as follows. Namely, if the value of (z) is less than 3, the hydrogen that has been adsorbed becomes very stable, thus making it difficult to desorb the hydrogen. Therefore, a secondary battery comprising a negative electrode containing this alloy would be deteriorated in its discharge capacity. On the other hand, if the value of (z) exceeds over 3.8, the site for allowing hydrogen to enter therein in the hydrogen-absorbing alloy may be decreased. A more preferable range of the (z) is therefore $3.0 \leq z \leq 3.6$.

This alloy should desirably be less than 700 (kgf/mm$^2$) in Vickers hardness (Hv). Because, if the Vickers hardness (Hv) of the alloy is 700 or more, the charge/discharge cycle life of a secondary battery comprising a negative electrode containing this alloy would prominently deteriorated. This may be attributed to the facts that, if the Vickers hardness (Hv) of a hydrogen-absorbing alloy is 700 or more, the fracture toughness ($K_{IC}$) thereof becomes smaller, thus making it brittle, so that the crack of the alloy is accelerated by the absorption and desorption of hydrogen, and hence the current-collecting efficiency of the negative electrode would be deteriorated. Therefore, a preferable range of Vickers hardness (Hv) of the alloy is less than 650 (kgf/mm$^2$), more preferably less than 600 (kgf/mm$^2$).

This eighth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This eighth hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(I) A Ninth Hydrogen-Absorbing Alloy

This hydrogen-absorbing alloy contains an alloy ingot manufactured by means of a casting or sintering method or contains a pulverized product of the alloy ingot. The alloy ingot has a composition represented by the following general formula (9);

$$Mg_a(La_{1-b}R1_b)_{1-a}(Ni_{1-x}M3_x)_z \tag{9}$$

wherein R1 is at least one element selected from rare earth elements (including Y) but is not La; M3 is at least one element selected from the group consisting of Co, Mn, Fe, Al, Ga, Zn, Sn, Cu, Si and B; and a, b, x and z are respectively a number satisfying conditions: $0.2 \leq a \leq 0.35$, $0.01 \leq b < 0.5$, $0.1 \leq x \leq 0.6$, and $3 \leq z \leq 3.8$.

Specific examples of the element R1 in the general formula (8) may be the same as explained with reference to the aforementioned first alloy.

The reason for limiting the range of (a) is as follows. Namely, if the value of (a) is less than 0.2, it may become difficult to improve the hydrogen desorption property of the alloy. On the other hand, if the value of (a) exceeds over 0.35, the crystal structure of the alloy may be altered, so that the quantity of hydrogen absorption may be decreased.

The reason for limiting the value (b) in this alloy to the aforementioned range is as follows. Namely, if the value of (b) is less than 0.01, it may become difficult to enhance the hydrogen equilibrium pressure of the alloy and the working voltage of the secondary battery. Although it is possible to enhance the hydrogen equilibrium pressure of the alloy by increasing the value of (b), the quantity of hydrogen absorption may be decreased if the value of the (b) becomes 0.5 or more.

When the value of (x) in the alloy is confined to the aforementioned range, the absorption and desorption of hydrogen can be facilitated, thus making it possible to improve the discharge capacity of the secondary battery. At the same time, the corrosion resistance of the alloy would be enhanced, thus improving the charge/discharge cycle life thereof. A more preferable range of the (x) is $0.1 \leq x \leq 0.5$.

The reason for limiting the value of (z) in the alloy to the aforementioned range is as follows. Namely, if the value of (z) is less than 3, the hydrogen that has been adsorbed becomes very stable, thus making it difficult to desorb the hydrogen. Therefore, a secondary battery comprising a negative electrode containing this alloy would be deteriorated in its discharge capacity. On the other hand, if the value of (z) exceeds over 3.8, the site for allowing hydrogen to enter therein in the hydrogen-absorbing alloy may be decreased. A more preferable range of the (z) is therefore $3.0 \leq z \leq 3.6$.

This alloy should desirably be less than 700 (kgf/mm$^2$) in Vickers hardness (Hv) for the same reasons as explained with reference to the aforementioned eighth alloy. Therefore, a preferable range of Vickers hardness (Hv) of the alloy is less than 650 (kgf/mm$^2$), more preferably less than 600 (kgf/mm$^2$).

This ninth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This ninth hydrogen-absorbing alloy can be manufactured by means of a casting or sintering method as explained above.

The alloy ingot thus obtained is then preferably heat-treated in the same manner as explained with reference to the aforementioned first hydrogen-absorbing alloy.

(K) A Tenth Hydrogen-Absorbing Alloy

This tenth hydrogen-absorbing alloy contains an alloy having a composition represented by the following general formula (10);

$$Mg_a R2_{1-a-b} T1_b (Ni_{1-x}M3_x)_z \tag{10}$$

wherein R2 is two or more kinds of element selected from rare earth elements (including Y), the content of Ce constituting said R2 being less than 20% by weight; T1 is at least one element selected from the group consisting of Ca, Ti, Zr and Hf; M3 is at least one element selected from the group consisting of Mn, Fe, Co, Al, Ga, Zn, Sn, Cu, Si and B; and a, b, x and z are respectively a number satisfying conditions: $0 < a \leq 0.5$, $0 \leq b \leq 0.3$, $0 \leq x \leq 0.9$, and $3 \leq z < 4$.

The reason for limiting the value of (a) to the aforementioned range is as follows. Namely, if the value of (a) exceeds over 0.5, the crystal structure of the alloy may be altered, so that the quantity of hydrogen absorption may be decreased. Therefore, a secondary battery comprising a negative electrode containing this alloy would be deteriorated in its discharge capacity. A more preferable range of the (a) is $0.1 \leq a \leq 0.4$, most preferably in the range of $0.2 \leq a \leq 0.35$.

The corrosion resistance of the alloy may be improved by the inclusion of Ce in the alloy. However, if the content of Ce in the R2 is 20 wt % or more, the high temperature property of the alloy may be deteriorated due to the presence in large quantity of a phase having a different crystal structure other than the aimed crystal structure. Furthermore, a secondary battery comprising a negative electrode containing this alloy may be deteriorated in its charge/discharge property under a high temperature environment. There is a tendency that the high temperature property of the alloy and the charge/discharge property of the secondary battery in a high temperature condition can be improved by decreasing the content of Ce in the R2. A more preferable range of Ce content in R2 is less than 18 wt %, most preferably less than 16 wt %.

It is preferable that the aforementioned R2 contains La. However, if the R2 is constituted exclusively by La, the corrosion resistance of the alloy may be deteriorated thereby lowering the charge/discharge cycle life of the secondary battery though the discharge capacity of the secondary battery may be improved. Preferably, the content of La in the R2 should be more than 70 wt %. When the content of La is controlled within the aforementioned range in an R2 where the content of Ce is less than 20 wt %, the discharge capacity of the battery can be improved without deteriorating the corrosion resistance of the hydrogen-absorbing alloy.

It is preferable in view of lowering the manufacturing cost of a hydrogen-absorbing alloy and of hydrogen-absorbing electrode that the R2 is constituted by La, Ce, Pr and Nd.

The T1 functions to suppress the progress of pulverization of hydrogen-absorbing alloy without excessively lowering the discharge capacity of the secondary battery. Preferably, the T1 should be Ca and Zr.

The reason for limiting the range of (b) is as follows. Namely, if the value of (b) is more than 0.3, the discharge capacity of the secondary battery may be lowered and at the same time, the effect of suppressing the pulverization may be weakened. A more preferable range of the (b) is $0 \leq b \leq 0.2$, most preferably $0 \leq b \leq 0.1$.

Although the M3 is at least one element selected from the group consisting of Mn, Fe, Co, Al, Ga, Zn, Sn, Cu, Si and B, it is more preferable that the M3 is selected from Mn, Co and Al. When the value of (x) is limited to the aforementioned range, the hydrogen absorption-desorption rate of hydrogen-absorbing alloy can be improved, and at the same time, the discharge capacity of the battery can be improved since the absorption-desorption of hydrogen can be facilitated. Additionally, due to an improvement of the corrosion resistance of the hydrogen-absorbing alloy, the charge/discharge cycle property of the battery can be improved. A more preferable range of the (x) is $0.01 \leq x \leq 0.6$, most preferably $0.01 \leq x \leq 0.5$.

The reason for limiting the value of (z) in the alloy to the aforementioned range is as follows. Namely, if the value of (z) is less than 3, the hydrogen that has been adsorbed becomes very stable, thus making it difficult to desorb the hydrogen. Therefore, a secondary battery comprising a negative electrode containing this alloy would be deteriorated in its discharge capacity. On the other hand, if the value of (z) exceeds over 4, the site for allowing hydrogen to enter therein in the hydrogen-absorbing alloy may be decreased. A more preferable range of the (z) is therefore in the range of $3.0 \leq z \leq 3.8$, most preferably $3.0 \leq z \leq 3.6$.

This tenth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This tenth hydrogen-absorbing alloy can be manufactured by means of a casting method, a sintering method, a melt-quenching method such as a single roll method or a double roll method, an ultra-quenching method such as a gas-atomizing method. The alloy thus obtained is then preferably heat-treated in the same manner as explained with reference to the aforementioned first hydrogen-absorbing alloy.

The reason for enabling a secondary battery having an excellent charge/discharge property to be obtained even if this tenth hydrogen-absorbing alloy is manufactured by means of the aforementioned melt-quenching method or ultra-quenching method can be assumedly attributed to the fact that the tenth hydrogen-absorbing alloy manufactured by means of the aforementioned melt-quenching method or ultra-quenching method is minimal in plane defect.

(L) A Eleventh Hydrogen-Absorbing Alloy

This eleventh hydrogen-absorbing alloy contains an alloy having a composition represented by the following general formula (11);

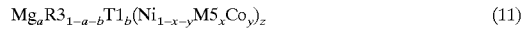

$$Mg_a R3_{1-a-b} T1_b (Ni_{1-x-y} M5_x Co_y)_z \qquad (11)$$

wherein R3 is two or more kinds of element selected from rare earth elements (including Y); T1 is at least one element selected from the group consisting of Ca, Ti, Zr and Hf; M5 is at least one element selected from the group consisting of Mn, Fe, Al, Ga, Zn, Sn, Cu, Si and B; a, b, x, y and z are respectively a number satisfying conditions: $0<a \leq 0.5$, $0 \leq b \leq 0.3$, $0 \leq x \leq 0.9$, $0<y \leq 0.4$, $x+y \leq 0.9$, and $3 \leq z<4$, the content of Ce constituting the R3 being less than m % by weight where m is represented by the following formula (I);

$$m = 125y + 20 \qquad (I)$$

wherein y is a quantity of Co in the aforementioned general formula (11).

The reason for limiting the value of (a) in this alloy to the aforementioned range is as follows. Namely, if the value of (a) exceeds over 0.5, the crystal structure of the alloy may be altered, so that the quantity of hydrogen absorption may be decreased. Therefore, a secondary battery comprising a negative electrode containing this alloy would be deteriorated in its discharge capacity. A more preferable range of the (a) is $0.1 \leq a \leq 0.4$, most preferably in the range of $0.2 \leq a \leq 0.35$.

The reason for limiting the content of Ce in R3 to the range as defined by the above formula (I) is as follows. This formula (I) has been created by the present inventors. Namely, it has been found by the present inventors after repeated experiments that there is correlation between the Co content and Ce content in the hydrogen-absorbing alloy. Specifically, the corrosion resistance of the hydrogen-absorbing alloy (particularly, the alloy containing La) may be improved by the inclusion of Ce in the alloy. However, if the content of Ce in the R3 is increased, a phase having a different crystal structure other than the aimed crystal structure is increased. However, when Co is added to this alloy, the generation of a phase having a different crystal structure other than the aimed crystal structure can be suppressed. Accordingly, it is possible, by suitably changing the Ce content in R3 in conformity with the Co content in the alloy, to obtain a hydrogen-absorbing alloy having an improved corrosion resistance while maintaining a preferable crystal structure. More specifically, as shown in FIG. 1, when the Ce content in the R3 is made equal to or larger than the value calculated from the aforementioned formula (I): $m = 125y + 20$, the crystal structure of the hydrogen-absorbing alloy would become different from the aimed crystal structure, so that the high temperature characteristic of the alloy as well as the charge/discharge property of the secondary battery in a high temperature environment would be deteriorated.

However, when the Ce content in the R3 is made smaller than the value calculated from the aforementioned formula (I) as suggested by this invention, it is possible to maintain a preferable crystal structure of the hydrogen-absorbing alloy, and to improve, in particular, the high temperature characteristic of the alloy as well as the charge/discharge property of the secondary battery in a high temperature environment.

It is preferable that the aforementioned R3 further contains La. It is more preferable in view of lowering the manufacturing cost of a hydrogen-absorbing alloy and of hydrogen-absorbing electrode that the R3 is constituted by La, Ce, Pr and Nd.

The T1 functions to suppress the progress of pulverization of hydrogen-absorbing alloy without excessively lowering the discharge capacity of the secondary battery. Preferably, the T1 should be constituted by Ca and Zr.

The reason for limiting the value of (b) to the aforementioned range is as follows. Namely, if the value of (b) is more than 0.3, the discharge capacity of the secondary battery may be lowered and at the same time, the effect of suppressing the pulverization may be weakened. A more preferable range of the (b) is $0 \leq b \leq 0.2$, most preferably $0 \leq b \leq 0.1$.

Although the M5 is at least one element selected from the group consisting of Mn, Fe, Al, Ga, Zn, Sn, Cu, Si and B, it is more preferable that the M5 is selected from Mn, Co and Al. When the value of (x) is limited to the aforementioned range, the hydrogen absorption-desorption rate of hydrogen-absorbing alloy can be improved, and at the same time, the discharge capacity of the battery can be improved since the absorption-desorption of hydrogen can be facilitated. Additionally, due to an improvement of the corrosion resistance of the hydrogen-absorbing alloy, the charge/discharge cycle property of the battery can be improved. A more preferable range of the (x) is $0.01 \leq x \leq 0.6$, most preferably $0.01 \leq x \leq 0.5$.

The reason for limiting the Co content (y) in the alloy to the aforementioned range is as follows. Namely, if the Co content (y) is more than 0.4, the quantity of hydrogen absorption of the alloy may be lowered, so that the discharge capacity of the secondary battery may be lowered. This may be attributed to the fact that as the Co content (y) is increased, the tolerance in Ce content in the R3, which is calculated from the aforementioned formula (I), becomes higher. A more preferable quantity of the Co content (y) is in the range of $0 < y < 0.35$.

By limiting the value of (x+y) of this alloy to the aforementioned range, the charge/discharge cycle life of the battery can be improved. A more preferable range of the (x+y) is $0 < x+y \leq 0.6$.

The reason for limiting the value of (z) in the alloy to the aforementioned range is as follows. Namely, if the value of (z) is less than 3, the hydrogen that has been adsorbed becomes very stable, thus making it difficult to desorb the hydrogen. Therefore, a secondary battery comprising a negative electrode containing this alloy would be deteriorated in its discharge capacity. On the other hand, if the value of (z) exceeds over 4, the site for allowing hydrogen to enter therein in the hydrogen-absorbing alloy may be decreased. A more preferable range of the (z) is therefore in the range of $3.0 \leq z \leq 3.8$, most preferably $3.0 \leq z \leq 3.6$.

This eleventh hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This eleventh hydrogen-absorbing alloy can be manufactured by means of a casting method, a sintering method, a melt-quenching method such as a single roll method or a double roll method, an ultra-quenching method such as a gas-atomizing method. The alloy thus obtained is then preferably heat-treated in the same manner as explained with reference to the aforementioned first hydrogen-absorbing alloy.

The reason for enabling a secondary battery having an excellent charge/discharge property to be obtained even if this eleventh hydrogen-absorbing alloy is manufactured by means of the aforementioned melt-quenching method or ultra-quenching method can be assumedly attributed to the fact that the eleventh hydrogen-absorbing alloy manufactured by means of the aforementioned melt-quenching method or ultra-quenching method is minimal in plane defect.

(M) A Twelfth Hydrogen-Absorbing Alloy

This twelfth hydrogen-absorbing alloy contains an alloy represented by the following general formula (12). The alloy contains as a principal phase a crystal phase having a composition where the a and z in the general formula (12) meet the following formula (II), and has a plane defect in the principal phase which is not more than 20 in number per 100 nm.

$$Mg_a R1_{1-a-b} T1_b (Ni_{1-x} M6_x)_z \qquad (12)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \qquad (II)$$

$$3 \leq z \leq 3.8.$$

$$z = -6 \times a + \delta$$

wherein $\delta$ is $5 \pm 0.2$.

The term "principal phase" noted above denotes a crystal phase in the alloy which is highest in existing ratio.

The $\delta$ is desirably 5 and should fall within a range of between 4.8 and 5.2.

The component analysis of each crystal phase of the alloy can be performed using an EDX analyzer (Energy Dispersive X-ray Spectrometer) of transmission electron microscope and setting the diameter of the beam to 4 nm. The plane defect in crystal phase of alloy is a linear defect which can be observed by taking a picture of the transmission electron microscopic image of crystal grains constituting the crystal phase. The measurement of the plane defect in crystal phase of alloy can be performed by the following method (a) or (b).

(a) A picture of transmission electron microscopic image of crystal grains, magnified by 10,000 to 100,000 times, is taken using a transmission electron microscope, and the number of plane defect per unit length is counted.

(b) Through an observation of (1,0,0) plane of the crystal grain of the alloy, the number of plane defect existing perpendicular to the C-axis of the crystal grain is counted.

An alloy containing, as a principal phase, a crystal phase where values of "a" and "z" in the general formula (12) do not meet the aforementioned formula (II) is poor in hydrogen absorption/desorption characteristics. The reason for limiting the number of plane defect in the principal phase of the hydrogen-absorbing alloy to the aforementioned range is as follows. Namely, if the number of the plane defect in the principal phase exceeds over 20 per 100 nm, it may become difficult to improve the hydrogen desorption property and the cycle characteristics of the alloy, so that it may become difficult to realize a secondary battery having a large discharge capacity and exhibiting an excellent charge/discharge cycle life. When the number of the plane defect in the principal phase can be limited within 10 per 100 nm, it would become possible to further improve the hydrogen absorption-desorption characteristic of the alloy and in particular the cycle characteristic of the alloy, and hence it is possible to realize a metal oxide-hydrogen secondary battery having an improved discharge capacity and an improved charge/discharge cycle life.

Specific examples of the element R1 in the general formula (12) may be the same as explained with reference to the aforementioned first alloy.

It is possible, by substituting T1 for a portion of the R1, to improve the property of the alloy such as the hydrogen desorption rate without greatly decreasing the hydrogen absorption quantity of the alloy, and at the same time, to suppress the pulverization of the alloy resulting from the absorption and desorption of hydrogen.

However, when the value of (b) exceeds over 0.3, the aforementioned effects, i.e. the improvement of desorption property and the suppression of pulverization cannot be realized, thus deteriorating the discharge capacity of the secondary battery. There is a tendency that the smaller the value of (b) is, the longer the charge/discharge cycle life would become. In view of ensuring a long cycle life therefore, the value of (b) should preferably be 0.2 or less.

It is possible to improve the hydrogen absorption/desorption property of the alloy such as the hydrogen absorption/desorption rate by substituting M6 for a portion of the Ni. This may be attributed to the facts that the diffusion of hydrogen penetrated into the alloy as well as the absorption/desorption of hydrogen can be facilitated by the substitution of the M6 for a portion of the Ni. Further, it is possible, when a metal oxide-hydrogen secondary battery is fabricated using a negative electrode containing this alloy, to prominently improve the charge/discharge cycle life of the battery.

However, if the value of (x) is more than 0.6, it will lead to a deterioration of discharge capacity in the secondary battery, so that the range of (x) should preferably be $0 \leq x \leq 0.6$. A more preferable range of the (x) is $0.01 \leq y \leq 0.5$.

The reason for limiting the range of (a) and the range of (z) in the aforementioned general formula (12) is as explained below. If the value of (a) falls outside the range of $0.2 \leq a \leq 0.35$ and at the same time, the value of (z) falls outside the range of $3 \leq z \leq 3.8$, the number of the plane defect in the principal phase of the alloy may exceed over 20 per 100 nm. More preferable range of the (z) is $3 \leq z \leq 3.6$.

This twelfth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This twelfth hydrogen-absorbing alloy can be manufactured by means of a casting method, a sintering method, a melt-quenching method such as a single roll method or a double roll method, an ultra-quenching method such as a gas-atomizing method. The alloy thus obtained is then preferably heat-treated in the same manner as explained with reference to the aforementioned first hydrogen-absorbing alloy.

If the hydrogen-absorbing alloy according to this invention is to be manufactured by means of the melt-quenching method or the ultra-quenching method, the R1 should preferably contain less than 20 wt % of Ce. If the content of Ce in the R1 is 20 wt % or more, the number of plane defect in the principal phase may exceed over 20 per 100 nm. The alloy composition which can be manufactured by means of the melt-quenching method or the ultra-quenching method, i.e. the allowable range of Ce content in the R1 would be influenced depending on the kind and quantity of substituting element to be included in the Ni site. For example, when Co is included as a substituting element in the Ni site, the acceptable limit of Ce content in the R1 is likely to be expanded with an increase in Co content. Specifically, when the Co content (x) is 0.2, the Ce content in the R1 can be less than 45 wt %.

(N) A Thirteenth Hydrogen-Absorbing Alloy

This thirteenth hydrogen-absorbing alloy comprises an alloy represented by the following general formula (13). The alloy contains as a principal phase a crystal phase having a composition where the a and z in the general formula (13) meet the following formula (II), and further contains more than 70% by volume of crystal grain having a plane defect of not more than 20 in number per 100 nm.

$$Mg_a R1_{1-a-b} T1_b (Ni_{1-x} M6_x)_z \qquad (13)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35,\ 0 \leq b \leq 0.3,\ 0 < x \leq 0.6,\ \text{and} \qquad (II)$$

$$3 \leq z \leq 3.8.$$

wherein $\delta$ is $5 \pm 0.2$.

The term "principal phase" noted above denotes a crystal phase in the alloy which is highest in existing ratio.

The $\delta$ is desirably 5 and should fall within a range of between 4.8 and 5.2.

The component analysis of each crystal phase of the alloy and the plane defect in the crystal grain can be performed in the same manner as explained with reference to the aforementioned twelfth hydrogen-absorbing alloy.

An alloy containing, as a principal phase, a crystal phase where values of "a" and "z" in the general formula (13) do not meet the aforementioned formula (II) is poor in hydrogen absorption/desorption characteristics. The reason for limiting the volume ratio of the crystal phase where the plane defect of the crystal grain is not more than 20 in number per 100 nm in this hydrogen-absorbing alloy is as follows. Namely, if the ratio of the crystal phase is not more than 70 wt %, it may become difficult to improve the hydrogen desorption property and the cycle characteristics of the alloy, so that it may become difficult to realize a secondary battery having a large discharge capacity and exhibiting an excellent charge/discharge cycle life. When the alloy contains more than 70% by volume of a crystal phase where the number of the plane defect in crystal grain is 10 or less per 100 nm, it would become possible to further improve the hydrogen absorption-desorption characteristic of the alloy and to prominently improve the charge/discharge cycle characteristic in particular, and hence it is possible to realize a metal oxide-hydrogen secondary battery having an improved discharge capacity and an improved charge/discharge cycle life.

Specific examples of the element R1 in the general formula (13) may be the same as explained with reference to the aforementioned first alloy. When the R1 contains La, the content of La in the R1 should preferably be 50 wt % or more.

It is possible, by substituting T1 for a portion of the R1, to improve the property of the alloy such as the hydrogen desorption rate without greatly decreasing the hydrogen absorption quantity of the alloy, and at the same time, to suppress the pulverization of the alloy resulting from the absorption and desorption of hydrogen.

However, when the value of (b) exceeds over 0.3, the aforementioned effects, i.e. the improvement of desorption property and the suppression of pulverization cannot be realized, thus deteriorating the discharge capacity of the secondary battery. There is a tendency that the smaller the value of (b) is, the longer the charge/discharge cycle life would become. In view of ensuring a long cycle life therefore, the value of (b) should preferably be 0.2 or less.

It is possible to improve the hydrogen absorption/desorption property of the alloy such as the hydrogen absorption/desorption rate by substituting M6 for a portion of the Ni. This may be attributed to the facts that the diffusion of hydrogen penetrated into the alloy as well as the absorption/desorption of hydrogen can be facilitated by the substitution of the M6 for a portion of the Ni. Further, it is possible, when a metal oxide-hydrogen secondary battery is fabricated using a negative electrode containing this alloy, to prominently improve the charge/discharge cycle life of the battery.

However, if the value of (x) is more than 0.6, it will lead to a deterioration of discharge capacity in the secondary battery, so that the range of (x) should preferably be $0 \leq x \leq 0.6$. A more preferable range of the (x) is $0.01 \leq y \leq 0.5$.

The reason for limiting the range of (a) and the range of (z) in the aforementioned general formula (13) is as explained below. If the value of (a) falls outside the range of $0.2 \leq a \leq 0.35$ and at the same time, the value of (z) falls outside the range of $3 \leq z \leq 3.8$, the quantity of crystal grains where the number of the plane defect therein is more than 20 per 100 nm may not less than 30% by volume. More preferable ranges of the (z) is $3 \leq z \leq 3.6$.

This thirteenth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This thirteenth hydrogen-absorbing alloy can be manufactured by means of a casting method, a sintering method, a melt-quenching method such as a single roll method or a double roll method, an ultra-quenching method such as a gas-atomizing method. The alloy thus obtained is then preferably heat-treated in the same manner as explained with reference to the aforementioned first hydrogen-absorbing alloy.

If the hydrogen-absorbing alloy according to this invention is to be manufactured by means of the melt-quenching method or the ultra-quenching method, the R1 should preferably contain less than 20 wt % of Ce. If the content of Ce in the R1 is 20 wt % or more, the quantity of crystal grains where the number of the plane defect therein is not more than 20 per 100 nm may not exceed over 70% by volume. The alloy composition which can be manufactured by means of the melt-quenching method or the ultra-quenching method, i.e. the allowable range of Ce content in the R1 would be influenced depending on the kind and quantity of substituting element to be included in the Ni site. For example, when Co is included as a substituting element in the Ni site, the acceptable limit of Ce content in the R1 is likely to be expanded with an increase in Co content. Specifically, when the Co content (x) is 0.2, the Ce content in the R1 can be less than 45 wt %.

(O) A Fourteenth Hydrogen-Absorbing Alloy

This fourteenth hydrogen-absorbing alloy comprises an alloy represented by the following general formula (14). The alloy contains as a principal phase a crystal phase having a composition where the a and z in the general formula (14) meet the following formula (II), and further contains not more than 20% by volume of a crystal phase having a $CaCu_5$ type crystal structure and not more than 10% by volume of a crystal phase having a $MgCu_2$ type crystal structure.

$$Mg_aR1_{1-a-b}T1_b(Ni_{1-x}M6_x)_z \qquad (14)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \qquad (II)$$

$$3 \leq z \leq 3.8.$$

$$z = -6 \times a + \delta$$

wherein $\delta$ is $5 \pm 0.2$.

The term "principal phase" noted above denotes a crystal phase in the alloy which is highest in existing ratio.

The $\delta$ is desirably 5 and should fall within a range of between 4.8 and 5.2.

The determination in quantity of the principal phase, a crystal phase having a $CaCu_5$ type crystal structure, and a crystal phase having a $MgCu_2$ type crystal structure can be performed by taking the pictures of the secondary electronic image and the back scattered electronic image by making use of a scanning electronic microscope (SEM), and then by performing the component analysis of each phase by making use of an EDX analyzer (Energy Dispersive X-ray Spectrometer) of transmission electron microscope. By further performing an X-ray analysis of the alloy, the crystal type of each phase can be further confirmed.

The reason for limiting the quantity of each crystal phase is as explained below. Namely, an alloy containing, as a principal phase, a crystal phase where values of "a" and "z" in the general formula (14) do not meet the aforementioned formula (II) is poor in hydrogen absorption/desorption characteristics. Further, it contains a crystal phase where the values of "a" and "z" in the general formula (14) meet the aforementioned formula (II), the alloy will be poor in hydrogen absorption quantity if containing more than 20% by volume of a crystal phase having a $CaCu_5$ type crystal structure. On the other hand, it contains a crystal phase where the values of "a" and "z" in the general formula (14) meet the aforementioned formula (II), the alloy will be poor in hydrogen desorption property if containing more than 10% by volume of a crystal phase having a $MgCu_2$ type crystal structure. More preferably, the content of the crystal phase having a $CaCu_5$ type crystal structure in the alloy should be not more than 10% by volume. On the other hand, the content of the crystal phase having a $MgCu_2$ type crystal structure in the alloy should more preferably be not more than 5% by volume.

Specific examples of the element R1 in the general formula (12) may be the same as explained with reference to the aforementioned first alloy. When the R1 contains La, the content of La in the R1 should preferably be 50 wt % or more.

It is possible, by substituting T1 for a portion of the R1, to improve the property of the alloy such as the hydrogen desorption rate without greatly decreasing the hydrogen absorption quantity of the alloy, and at the same time, to suppress the pulverization of the alloy resulting from the absorption and desorption of hydrogen.

However, when the value of (b) exceeds over 0.3, the aforementioned effects, i.e. the improvement of desorption property and the suppression of pulverization cannot be realized, thus deteriorating the discharge capacity of the secondary battery. There is a tendency that the smaller the value of (b) is, the longer the charge/discharge cycle life would become. In view of ensuring a long cycle life therefore, the value of (b) should preferably be 0.2 or less.

It is possible to improve the hydrogen absorption/desorption property of the alloy such as the hydrogen absorption/desorption rate by substituting M6 for a portion of the Ni. This may be attributed to the facts that the diffusion of hydrogen penetrated into the alloy as well as the absorption/desorption of hydrogen can be facilitated by the substitution of the M6 for a portion of the Ni. Further, it is possible, when a metal oxide-hydrogen secondary battery is fabricated using a negative electrode containing this alloy, to prominently improve the charge/discharge cycle life of the battery.

However, if the value of (x) is more than 0.6, it will lead to a deterioration of discharge capacity in the secondary battery, so that the range of (x) should preferably be $0 \leq x \leq 0.6$. A more preferable range of the (x) is $0.01 \leq y \leq 0.5$.

This fourteenth hydrogen-absorbing alloy may contain an element such as C, N, O or F as an impurity as far as the content of such an element is within a range which does not hinder the property of the alloy. However, it is preferable that the content of these impurities should be not more than 1 wt % respectively.

This fourteenth hydrogen-absorbing alloy can be manufactured by means of a casting method, a sintering method, a melt-quenching method such as a single roll method or a double roll method, an ultra-quenching method such as a gas-atomizing method. The alloy thus obtained is then preferably heat-treated in the same manner as explained with reference to the aforementioned first hydrogen-absorbing alloy.

If the hydrogen-absorbing alloy according to this invention is to be manufactured by means of the melt-quenching method or the ultra-quenching method, the R1 should preferably contain less than 20 wt % of Ce. Because, if the content of Ce in the R1 is 20 wt % or more, either the quantity of the crystal phase having a $CaCu_5$ type crystal structure in the alloy may become higher than 20% by volume, or the quantity of the crystal phase having a $MgCu_2$ type crystal structure in the alloy may become higher than 10% by volume.

The alloy composition which can be manufactured by means of the melt-quenching method or the ultra-quenching method, i.e. the allowable range of Ce content in the R1 would be influenced depending on the kind and quantity of substituting element to be included in the Ni site. For example, when Co is included as a substituting element in the Ni site, the acceptable limit of Ce content in the R1 is likely to be expanded with an increase in Co content. Specifically, when the Co content (x) is 0.2, the Ce content in the R1 can be less than 45 wt %.

Figure 2:
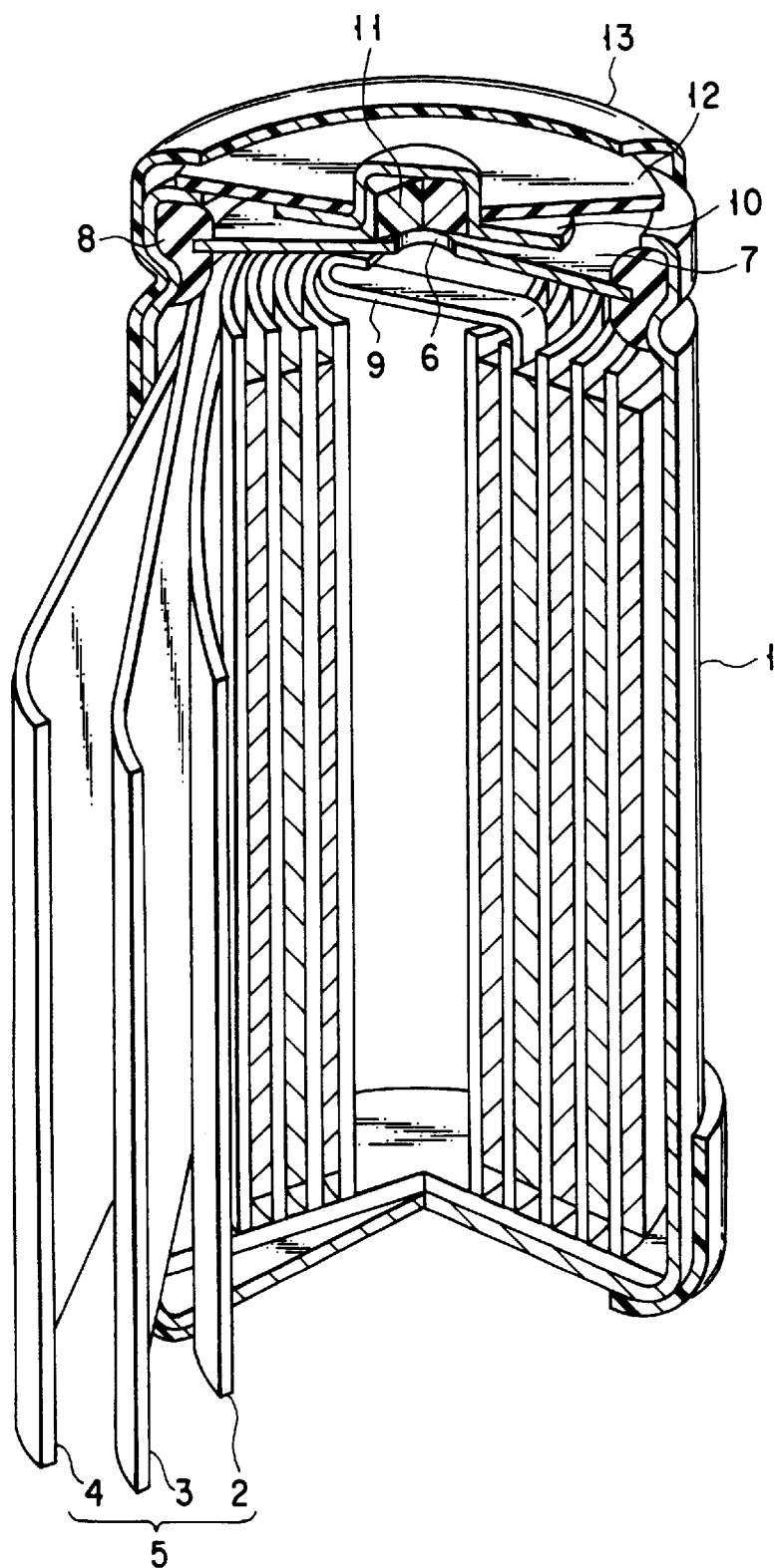
FIG. 2 is a partially sectioned perspective view showing a cylindrical nickel-hydrogen secondary battery representing one embodiment of an alkaline secondary battery of this invention.

This invention will be explained further with reference to FIG. 2 showing a cylindrical metal oxide-hydrogen secondary battery embodying a secondary battery of this invention.

Referring to FIG. 2, a bottomed cylindrical case 1 is accommodated therein with an electrode group 5 which has been manufactured by stacking a positive electrode 2, a separator 3 and a negative electrode 4, and then by spirally winding the stacked body. The negative electrode 4 is disposed at the outermost periphery of the electrode group 5 so as to electrically contact with the cylindrical case 1. The cylindrical case 1 contains an alkaline electrolyte. A first sealing plate 7 formed of a disk having an opening 6 at the center is disposed on the upper opening of the cylindrical case 1. An insulating gasket 8 having a ring-like shape is interposed between the periphery of the first sealing plate 7 and the upper inner wall surface of the opening of the cylindrical case 1. The peripheral fringe portion of the opening of the cylindrical case 1 is caulked inward so that the first sealing plate 7 is hermetically fixed via the gasket 8 to cylindrical case 1. The positive electrode lead 9 is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A rubber safety valve 11 is disposed in a space surrounded by the first sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The Positive Electrode 2

This positive electrode 2 can be manufactured by adding a conductive material to an active material, i.e. nickel hydroxide powder, and the resultant mixture is kneaded together with a polymeric binder and water to prepare a paste, which is then stuffed into an electroconductive substrate and, after being dried, molded into a predetermined shape.

The nickel hydroxide powder may contain at least one oxide or hydroxide of metal selected from the group consisting of zinc and cobalt.

As for the conductive material, cobalt oxide, cobalt hydroxide, metallic cobalt, metallic nickel and carbon can be used.

Examples of binder are carboxymethyl cellulose, methyl cellulose, sodium polyacrylate, polytetrafluoroethylene and polyvinyl alcohol (PVA).

The electroconductive substrate may be formed of a mesh-like, sponge-like, fibrous or felt-like metallic porous body which is made of a metal such as nickel, stainless steel or a nickel-plated metal.

(2) The Negative Electrode 4

This negative electrode 4 can be manufactured by the following methods (1) and (2).

(1) A conductive material is added at first to a hydrogen-absorbing alloy powder and then kneaded together with a binder and water to prepare a paste, which is then stuffed into an electroconductive substrate and, after being dried, molded into a predetermined shape, thereby forming the negative electrode.

(2) A conductive material is added at first to a hydrogen-absorbing alloy powder and then kneaded together with a binder to prepare a mixed material, which is then stuffed into an electroconductive substrate and, after being dried, molded into a predetermined shape, thereby forming the negative electrode.

As for the hydrogen-absorbing alloy, at least one of the aforementioned first to fourteenth hydrogen-absorbing alloys can be employed. As for the pulverizing method of the hydrogen-absorbing alloy, a mechanical pulverizing method such as a ball mill, a pulverizer, a jet mill, etc. or a method of allowing the alloy to absorb and desorb a high pressure hydrogen, whereby effecting an expansion of volume in the alloy, thus pulverizing the alloy may be employed.

The particle distribution of this hydrogen-absorbing alloy powder should preferably be such that particles having a particle diameter of 100 $\mu$m or more is less than 10 wt %, and particles having a particle diameter of 10 $\mu$m or less is less than 15 wt %, and an average diameter thereof is 35 to 55 $\mu$m. It is possible with a hydrogen-absorbing alloy powder having such a particle distribution to perform the activation thereof within a short period of time and at the same time, to realize a metal oxide-hydrogen secondary battery having a long charge/discharge cycle life.

As for the binder, the same materials as employed for the positive electrode 2 can be used. By the way, if this negative electrode is to be manufactured by making use of the aforementioned item (2), it is preferable to employ a binder containing polytetrafluoroethylene (PTFE).

As for the conductive material, carbon black for example can be used.

The electroconductive substrate may be formed from a two-dimensional substrate such as a punched metal, an expanded metal and a nickel net; or a three-dimensional substrate such as a felt-like metallic porous body or a sponge-like metallic substrate.

(3) The Separator 3

The separator 3 may be formed of a nonwoven fabric such as a polypropylene nonwoven fabric, a nylon nonwoven fabric or a nonwoven fabric comprising polypropylene fiber and nylon fiber. In particular, a polypropylene nonwoven fabric treated to have a hydrophilic surface is preferable as a separator.

(4) Alkaline Electrolyte

Examples of the alkaline electrolyte which are useful in this invention include an aqueous solution of sodium hydroxide (NaOH), an aqueous solution of lithium hydroxide (LiOH), an aqueous solution of potassium hydroxide (KOH), a mixed solution of sodium hydroxide (NaOH) and lithium hydroxide (LiOH), a mixed solution of potassium hydroxide (KOH) and lithium hydroxide (LiOH), and a mixed solution of NaOH, KOH and LiOH.

Although this invention has been explained about a cylindrical alkaline secondary battery, it is also possible according to this invention to apply it to a rectangular alkaline secondary battery, wherein a closed-end rectangular case is accommodated therein with an electrode group consisting of a laminated body comprising positive electrodes and negative electrodes which are alternately superimposed one upon another with a separator being interposed therebetween, and with an alkali electrolyte.

The first hydrogen-absorbing alloy according to this invention contains an alloy ingot manufactured by means of a casting or sintering method or a pulverized product of the alloy ingot and the alloy ingot is represented by the general formula (1). It is possible with this hydrogen-absorbing alloy to increase the hydrogen equilibrium pressure of the alloy, and at the same time, to improve the hydrogen absorption/desorption rate.

Accordingly, a secondary battery which comprises a negative electrode comprising hydrogen-absorbing alloy particles containing a pulverized product of the alloy ingot is capable of enhancing the working voltage thereof, whereby the discharge capacity thereof can be remarkably enhanced and the charge/discharge cycle life thereof can be improved. Furthermore, the discharge characteristic at high temperatures of the secondary battery can also be improved.

The second hydrogen-absorbing alloy according to this invention contains an alloy ingot manufactured by means of a casting or sintering method or a pulverized product of the alloy ingot and the alloy ingot is represented by the general formula (2). It is possible with this hydrogen-absorbing alloy to improve the hydrogen absorption/desorption rate.

Accordingly, a secondary battery which comprises a negative electrode comprising hydrogen-absorbing alloy particles containing a pulverized product of the alloy ingot is capable of prominently enhancing the charge/discharge cycle life thereof. Furthermore, the discharge characteristic at high temperatures of the secondary battery can also be improved.

The third hydrogen-absorbing alloy according to this invention contains an alloy ingot manufactured by means of a casting or sintering method or a pulverized product of the alloy ingot and the alloy ingot is represented by the general formula (3). It is possible with this hydrogen-absorbing alloy to prominently improve the hydrogen absorption/desorption rate, and at the same time, to increase the hydrogen equilibrium pressure of the alloy.

Accordingly, a secondary battery which comprises a negative electrode comprising hydrogen-absorbing alloy particles containing a pulverized product of the alloy ingot is capable of prominently enhancing both of the discharge capacity and the charge/discharge cycle life. At the same time, the discharge characteristic at high temperatures of the secondary battery can also be improved.

The fourth hydrogen-absorbing alloy according to this invention contains an alloy ingot manufactured by means of a casting or sintering method or a pulverized product of the alloy ingot and the alloy ingot is represented by the general formula (4). It is possible with this hydrogen-absorbing alloy to improve the hydrogen absorption/desorption property thereof, and in particular, to prominently improve the hydrogen absorption/desorption rate of the alloy.

Accordingly, a secondary battery which comprises a negative electrode comprising hydrogen-absorbing alloy particles containing a pulverized product of the alloy ingot is large in discharge capacity and is capable of improving the charge/discharge cycle life.

The fifth hydrogen-absorbing alloy according to this invention contains an alloy ingot manufactured by means of a casting or sintering method or a pulverized product of the alloy ingot and the alloy ingot is represented by the general formula (5). It is possible with this hydrogen-absorbing alloy to improve the hydrogen absorption/desorption property thereof, and in particular, to prominently improve the hydrogen absorption/desorption rate of the alloy.

Accordingly, a secondary battery which comprises a negative electrode comprising hydrogen-absorbing alloy particles containing a pulverized product of the alloy ingot is capable of prominently improving the discharge capacity and the charge/discharge cycle life.

The sixth hydrogen-absorbing alloy according to this invention contains an alloy ingot manufactured by means of a casting or sintering method or a pulverized product of the alloy ingot and the alloy ingot is represented by the general formula (6). Since a portion of nickel component is substituted by Co in this hydrogen-absorbing alloy, it is possible to prominently improve the hydrogen absorption/desorption property such as the hydrogen absorption/desorption rate of the alloy. At the same time, the quantity of hydrogen absorption in the plateau region can be stabilized.

Accordingly, a secondary battery which comprises a negative electrode comprising hydrogen-absorbing alloy particles containing a pulverized product of the alloy ingot is capable of stabilizing the voltage at the discharging, thus making it possible to realize a large discharge capacity and an improved charge/discharge cycle life of the battery.

The seventh hydrogen-absorbing alloy according to this invention contains an alloy ingot manufactured by means of a casting or sintering method or a pulverized product of the alloy ingot and the alloy ingot is represented by the general formula (7). According to this hydrogen-absorbing alloy, it is possible to prominently improve the hydrogen absorption/desorption property such as the hydrogen absorption/desorption rate of the alloy. At the same time, the quantity of hydrogen absorption in the plateau region can be stabilized.

Accordingly, a secondary battery which comprises a negative electrode comprising hydrogen-absorbing alloy particles containing a pulverized product of the alloy ingot is capable of stabilizing the voltage at the discharging, thus making it possible to realize a large discharge capacity and an improved charge/discharge cycle life of the battery.

The eighth hydrogen-absorbing alloy according to this invention contains an alloy ingot manufactured by means of a casting or sintering method or a pulverized product of the alloy ingot and the alloy ingot is represented by the general formula (8). Since a portion of Mg component is substituted by La in this hydrogen-absorbing alloy, it is possible to enhance the hydrogen equilibrium pressure to a desired value and at the same time, to prominently improve the hydrogen absorption/desorption property of the alloy. At the same time, the quantity of hydrogen absorption in the plateau region can be stabilized.

Accordingly, a secondary battery which comprises a negative electrode comprising hydrogen-absorbing alloy particles containing a pulverized product of the alloy ingot is capable of improving the working voltage, so that it is possible to improve the discharge capacity and charge/discharge cycle life of the battery.

The ninth hydrogen-absorbing alloy according to this invention contains an alloy ingot manufactured by means of a casting or sintering method or a pulverized product of the alloy ingot and the alloy ingot is represented by the general formula (9). Since a predetermined quantity of rare earth element component R1 is substituted by La and at the same time, a predetermined quantity of Ni component is substituted by M3 in this hydrogen-absorbing alloy, it is possible to improve all of the hydrogen equilibrium pressure, the hydrogen absorption/desorption property and the corrosion resistance of the alloy.

Accordingly, a secondary battery which comprises a negative electrode comprising hydrogen-absorbing alloy particles containing a pulverized product of the alloy ingot is capable of prominently improving the charge/discharge cycle life owing to the synergistic effects by the rare earth element component R1 containing La and by the Ni component containing M3.

The tenth hydrogen-absorbing alloy according to this invention contains an alloy represented by the general formula (10). Since the Ce content in the R2 is less than 20 wt %, it is possible to improve the corrosion resistance thereof while ensuring an excellent crystal structure, and at the same time, to maintain an excellent hydrogen absorption/desorption property even in a high temperature environment.

Accordingly, it is possible, with a secondary battery comprising a negative electrode containing this hydrogen-absorbing alloy, to realize a high capacity and long life even in a high temperature environment.

Further, when La is included as the R2 in this tenth hydrogen-absorbing alloy and the La content in the R2 is larger than 70 wt %, the hydrogen absorption/desorption quantity can be improved without sacrificing the corrosion resistance of the alloy.

Accordingly, a secondary battery comprising a negative electrode containing this alloy is capable of prominently improving the discharge capacity and charge/discharge cycle life.

The eleventh hydrogen-absorbing alloy according to this invention contains an alloy represented by the general formula (11). According to this hydrogen-absorbing alloy, since the upper limit of the Ce content is limited depending on the Co content according to the aforementioned formula (I), it is possible to improve the corrosion resistance of the alloy while maintaining a preferable crystal structure, and to assure an excellent hydrogen absorption/ desorption property even in a high temperature environment.

Accordingly, it is possible, with a secondary battery comprising a negative electrode containing this hydrogen-absorbing alloy, to realize a high capacity and long life even in a high temperature environment.

The twelfth hydrogen-absorbing alloy according to this invention comprises an alloy represented by the general formula (12). The alloy contains a principal phase having a composition where the a and z in the general formula (12) meet the formula (II), and have a plane defect in the principal phase which is not more than 20 in number per 100 nm. Accordingly, it is possible to ensure a high hydrogen absorption quantity and at the same time, to overcome the problem that hydrogen is hardly desorbed. As a result, it is possible to prominently improve the hydrogen absorption/desorption property such as the hydrogen absorption/desorption rate.

Accordingly, it is possible, with a secondary battery comprising a negative electrode containing this hydrogen-absorbing alloy, to realize a high capacity and an improved charge/discharge cycle property thereof.

The thirteenth hydrogen-absorbing alloy according to this invention comprises an alloy represented by the general formula (13). The alloy contains a principal phase having a composition where the a and z in the general formula (13) meet the formula (II), and more than 70% by volume of crystal grains where the number of the plane defect therein is not more than 20 per 100 nm. Accordingly, it is possible to ensure a high hydrogen absorption quantity and at the same time, to overcome the problem that hydrogen is hardly desorbed. As a result, it is possible to prominently improve the hydrogen absorption/desorption property such as the hydrogen absorption/desorption rate.

Accordingly, it is possible, with a secondary battery comprising a negative electrode containing this hydrogen-absorbing alloy, to realize a high capacity and an improved charge/discharge cycle property.

The fourteenth hydrogen-absorbing alloy according to this invention comprises an alloy represented by the general formula (14). The alloy contains a principal phase having a composition where the a and z in the general formula (14) meet the formula (II), not more than 20% by volume of a crystal phase having a $CaCu_5$ type crystal structure and not more than 10% by volume of a crystal phase having a $MgCu_2$ type crystal structure. Accordingly, this hydrogen-absorbing alloy can improve the hydrogen absorption/desorption property such as the hydrogen absorption/desorption rate.

Accordingly, it is possible, with a secondary battery comprising a negative electrode containing this hydrogen-absorbing alloy, to realize a high capacity and an improved charge/discharge cycle property.

Furthermore, when the content of the crystal phase having a $CaCu_5$ type crystal structure is not more than 10% by volume, and at the same time, the content of the crystal phase having a $MgCu_2$ type crystal structure is not more than 5% by volume in this fourteenth hydrogen-absorbing alloy, the hydrogen absorption/desorption characteristic of the alloy can be prominently improved, in particular, the cycle characteristic of the alloy can be prominently improved. Accordingly, it is possible to realize a metal oxide-hydrogen secondary battery which is prominently improved in both discharge capacity and charge/discharge cycle life.

Followings are preferred embodiments of this invention.

Figure 3:
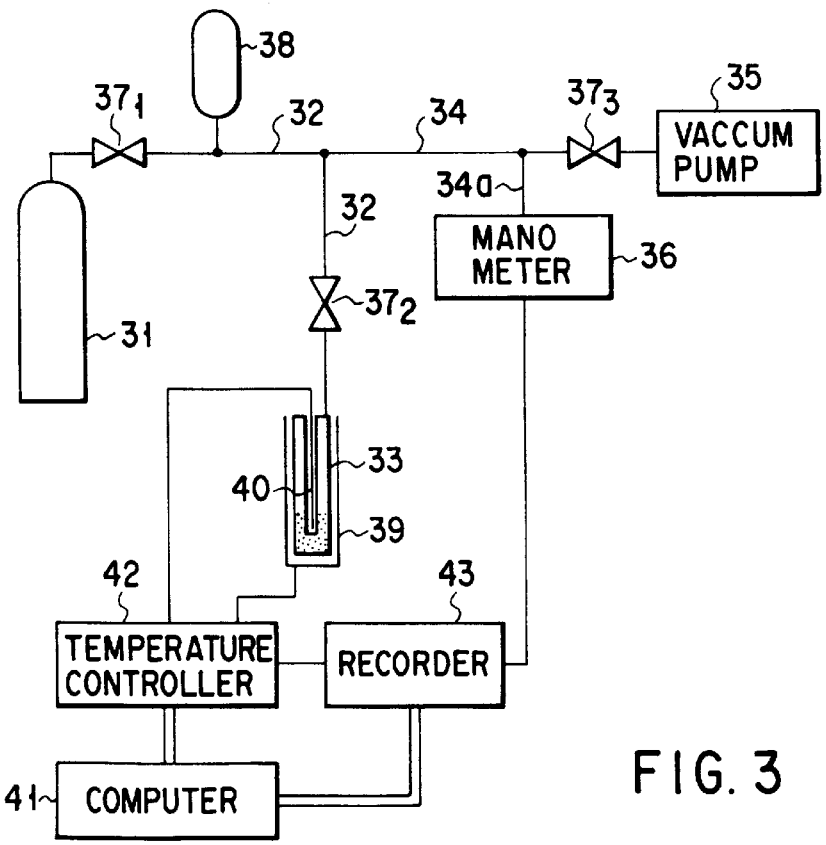
FIG. 3 is a schematic view of a temperature-scanning type hydrogen absorption/desorption property-evaluating apparatus to be employed in an example of this invention.

FIG. 3 is a schematic view illustrating a temperature scanning type hydrogen absorption/desorption property-evaluating apparatus employed in the evaluation of hydrogen-absorbing alloys obtained in the following Examples and Comparative Examples. Referring to FIG. 3, a hydrogen gas cylinder 31 is connected via a pipe 32 to a test sample vessel 33. The middle portion of the pipe 32 is branched, and a distal end of the branched pipe 34 is connected to a vacuum pump 35. A manometer 36 is mounted on a pipe portion 34a branched from the branched pipe 34. On the pipe 32 interposed between the hydrogen gas cylinder 31 and the test sample vessel 33, there are mounted a first valve $37_1$ and a second valve $37_2$ in the mentioned order starting from the hydrogen gas cylinder 31. A pressure accumulator 38 is attached to a portion of the pipe 32 which is located between the first valve $37_1$ and the second valve $37_2$. Further, the vacuum pump 35 is connected via a third valve $37_3$ with the branched pipe 34a.

The test sample vessel 33 is provided with a heater 39. A thermocouple 40 is disposed inside the test sample vessel 33. A temperature controller 42 to be controlled by a computer 41 is connected to the thermocouple 40 as well as to the heater 39 so as to control the temperature of the heater 39 on the basis of a temperature detected from the thermocouple 40. A recorder 43 to be controlled by the computer 41 is connected to the manometer 36 as well as to the temperature controller 42.

Examples 1–8 and Comparative Examples 1–2

Each element was weighed so as to obtain the compositions shown in Table 1 shown below, and the resultant compositions were melted in an induction furnace filled with an argon gas atmosphere, thereby preparing various kinds of hydrogen-absorbing alloy ingot. These alloy ingots were respectively pulverized to prepare hydrogen absorbing alloy powder having a particle diameter of 125 μm or less.

Comparative Example 3

Each element was weighed so as to obtain the composition shown in Table 1 shown below, and the resultant composition was melted in an induction furnace filled with an argon gas atmosphere, thereby preparing an alloy ingot. Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 125 μm or less.

Then, each of these hydrogen-absorbing alloys according to Examples 1–8 and Comparative Examples 1–3 was charged into the test sample vessel 33 (ambient temperature: 80° C.) shown in FIG. 3. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34 and the pressure accumulator 38. Then, after the second valve $37_2$ and the third valve $37_3$ are closed, the first valve $37_1$ was opened to supply hydrogen from the hydrogen gas cylinder 31 to each of the pipe 32, the branched pipe 34 and the pressure accumulator 38 thereby carrying out a hydrogen displacement of them. Subsequently, the first valve $37_1$ was closed and at the same time, the quantity of hydrogen introduced was calculated from the pressures of the system indicated by the manometer 36. Thereafter, the second valve $37_2$ was opened thereby feeding hydrogen to the test sample vessel 33, and the temperature thereof was monitored with the thermocouple 40. Then, the temperature of the test sample vessel 33 was kept constant by controlling the computer 41 and the temperature controller 42. At the same time, a change in pressure if any within the test sample vessel 33 was detected by means of the manometer 36 and recorded in the recorder 43.

The quantity of hydrogen (H/M) that was absorbed in each of the hydrogen-absorbing alloys during a time period of one hour after the introduction of a fixed amount of hydrogen into the test sample vessel 33 was measured by detecting the pressure change inside the test sample vessel 33, the results being shown as a hydrogen absorption rate $(H/M \cdot h^{-1})$ in the following Table 1.

TABLE 1

|  | Hydrogen absorbing alloy | Hydrogen absorption rate $(H/M \cdot h^{-1})$ |
|---|---|---|
| Comparative Example 1 | $Mg_{0.5}La_{0.5}Ni_2$ | 0.3 |
| Comparative Example 2 | $Mg_{0.03}La_{0.02}Al_{0.95}Ni_2$ | 0.01 |
| Comparative Example 3 | $Mg_{0.35}La_{0.3}Ce_{0.3}Ta_{0.05}Ni_3$ | 0.42 |
| Example 1 | $Mg_4La_{0.55}Al_{0.05}Ni_{3.02}$ | 1.15 |
| Example 2 | $Mg_3La_{0.6}Ag_{0.1}Ni_{3.4}$ | 1.08 |
| Example 3 | $Mg_{0.27}La_{0.6}Y_{0.03}V_{0.05}Mo_{0.05}Ni_{3.15}$ | 0.95 |
| Example 4 | $Mg_{0.34}Lm_{0.56}Nb_{0.03}Sn_{0.07}Ni_{3.38}$ | 1.05 |
| Example 5 | $Mg_{0.25}Lm_{0.65}Si_{0.02}Ga_{0.08}Ni_{3.21}$ | 1.06 |

TABLE 1-continued

|  | Hydrogen absorbing alloy | Hydrogen absorption rate (H/M · h$^{-1}$) |
|---|---|---|
| Example 6 | $Mg_{0.23}Lm_{0.76}V_{0.01}Ni_{3.6}$ | 1.05 |
| Example 7 | $Mg_{0.23}Lm_{0.76}V_{0.01}Ni_{3.8}$ | 0.92 |
| Example 8 | $Mg_{0.35}La_{0.3}Ce_{0.3}Ta_{0.05}Ni_3$ | 0.85 |

As apparent from Table 1, the hydrogen-absorbing alloys according to Examples 1 to 8 which were manufactured by means of a casting method and represented by the general formula (1) indicated a higher hydrogen absorption rate at a temperature of 80° C. as compared with the hydrogen-absorbing alloys according to Comparative Examples 1 to 3.

The reason for the low hydrogen absorption rate which was indicated by the hydrogen-absorbing alloy according to Comparative Example 1 can be attributed to the fact that the hydrogen-absorbing alloy according to Comparative Example 1 was $La_{1-x}Mg_xNi_2$ type alloy. On the other hand, although the hydrogen-absorbing alloy according to Comparative Example 3 had a composition which was similar to those of Example 8, the hydrogen-absorption rate thereof was lower as compared with those of Example 8, because the hydrogen-absorbing alloy according to Comparative Example 3 was manufactured by means of a melt-quenching method.

(Examples 9–15 and Comparative Example 4)

Each element was weighed so as to obtain the compositions shown in Table 2 shown below, and the resultant compositions were melted in an induction furnace filled with an argon gas atmosphere, thereby preparing various kinds of hydrogen-absorbing alloy ingot. These alloy ingots were respectively pulverized to prepare hydrogen absorbing alloy powder having a particle diameter of 125 μm or less.

Comparative Example 5

Each element was weighed so as to obtain the composition shown in Table 2 shown below, and the resultant composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 125 μm or less.

The hydrogen absorption rate (H/M·h$^{-1}$) at a temperature of 80° C. of these hydrogen Examples 9–15 and Comparative Examples 4 and 5 was measured in the same manner as described above, the results being shown in the following Table 2.

TABLE 2

|  | Hydrogen absorbing alloy | Hydrogen absorption rate (H/M · h$^{-1}$) |
|---|---|---|
| Comparative Example 4 | $Mg_{0.95}La_{0.05}(Ni_{0.98}Mn_{0.02})_2$ | 0.06 |
| Comparative Example 5 | $Mg_{0.35}Mm_{0.65}(Ni_{0.88}Cu_{0.1}Zn_{0.02})_{3.42}$ | 0.42 |
| Example 9 | $Mg_{0.25}La_{0.65}Ce_{0.1}(Ni_{0.9}Cr_{0.1})_{3.54}$ | 0.95 |
| Example 10 | $Mg_{0.3}Lm_{0.7}(Ni_{0.9}Cr_{0.05}Cu_{0.05})_{3.15}$ | 0.97 |
| Example 11 | $Mg_{0.28}Lm_{0.72}(Ni_{0.94}Cr_{0.05}Fe_{0.01})_{3.32}$ | 0.91 |
| Example 12 | $Mg_{0.31}Lm_{0.69}(Ni_{0.76}Co_{0.2}Mn_{0.04})_{3.02}$ | 0.90 |
| Example 13 | $Mg_{0.35}Mm_{0.65}(Ni_{0.88}Cu_{0.1}Zn_{0.02})_{3.42}$ | 0.93 |
| Example 14 | $Mg_{0.24}La_{0.56}Pr_{0.2}(Ni_{0.85}Mn_{0.1}Fe_{0.05})_{3.6}$ | 0.90 |
| Example 15 | $Mg_{0.24}La_{0.56}Pr_{0.2}(Ni_{0.85}Mn_{0.1}Fe_{0.05})_{3.8}$ | 0.78 |

As apparent from Table 2, the hydrogen-absorbing alloys according to Examples 9 to 15 which were manufactured by means of a casting method and represented by the general formula (2) indicated a higher hydrogen absorption rate at a temperature of 80° C. as compared with the hydrogen-absorbing alloys according to Comparative Examples 4 and 5.

Although the hydrogen-absorbing alloy according to Comparative Example 5 had a composition which was similar to those of Example 13, the hydrogen-absorption rate thereof was lower as compared with those of Example 13, because the hydrogen-absorbing alloy according to Comparative Example 5 was manufactured by means of a melt-quenching method.

Examples 16–22 and Comparative Examples 6–8

Each element was weighed so as to obtain the compositions shown in Table 3 shown below, and the resultant compositions were sintered in an argon gas atmosphere and then heat-treated at a temperature close to the melting point thereof, thereby preparing various kinds of hydrogen-absorbing alloy ingot. These alloy ingots were respectively pulverized to prepare hydrogen absorbing alloy powder having a particle diameter of 75 μm or less.

Comparative Example 9

Each element was weighed so as to obtain the composition shown in Table 3 shown below, and the resultant composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 75 μm or less.

The hydrogen absorption rate (H/M·h$^{-1}$) at a temperature of 80° C. of these hydrogen Examples 16–22 and Comparative Examples 6 to 9 was measured in the same manner as described above, the results being shown in the following Table 3.

TABLE 3

| | Hydrogen absorbing alloy | Hydrogen absorption rate (H/M · h$^{-1}$) |
|---|---|---|
| Comparative Example 6 | $Mg_{0.67}La_{0.33}Ni_3$ | 0.5 |
| Comparative Example 7 | $Mg_{0.02}La_{0.02}Si_{0.96}Ni_{2.6}Cu_{0.4}$ | 0.1 |
| Comparative Example 8 | $Mg_{0.65}La_{0.25}Si_{0.1}Ni_{0.1}Cr_{2.9}$ | 0.1 |
| Comparative Example 9 | $Mg_{0.4}Ce_{0.3}In_{0.2}P_{0.1}Ni_{1.9}Cu_{1.1}Zn_{0.3}$ | 0.3 |
| Example 16 | $Mg_{0.67}La_{0.23}Al_{0.1}Ni_{2.5}Co_{0.5}$ | 1.2 |
| Example 17 | $Mg_{0.57}Lm_{0.33}Ag_{0.2}Ni_{2.2}Mn_{0.8}$ (Lm; La: 84 at %, Ce: 10 at %, Pr: 1 at %, Nd: 5 at %) | 1.1 |
| Example 18 | $Mg_{0.5}Sm_{0.3}Pb_{0.15}C_{0.05}Ni_{2.5}Cr_{0.8}$ | 0.8 |
| Example 19 | $Mg_{0.4}Nd_{0.4}Ta_{0.1}Ge_{0.07}B_{0.03}Ni_{2.3}Fe_{1.1}$ | 1.0 |
| Example 20 | $Mg_{0.4}Ce_{0.3}In_{0.2}P_{0.1}Ni_{1.9}Cu_{1.1}Zn_{0.3}$ | 0.9 |
| Example 21 | $Mg_{0.25}La_{0.63}Nd_{0.1}Al_{0.02}Ni_{3.5}Cr_{0.1}$ | 1.1 |
| Example 22 | $Mg_{0.25}La_{0.63}Nd_{0.1}Al_{0.02}Ni_{3.7}Cr_{0.1}$ | 0.8 |

As apparent from Table 3, the hydrogen-absorbing alloys according to Examples 16 to 22 which were manufactured by means of a sintering method and represented by the general formula (3) indicated a higher hydrogen absorption rate at a temperature of 80° C. as compared with the hydrogen-absorbing alloys according to Comparative Examples 6 to 9.

The reason for the low hydrogen absorption rate which was indicated by the hydrogen-absorbing alloy according to Comparative Example 6 can be attributed to the fact that the hydrogen-absorbing alloy according to Comparative Example 6 was $La_{1-x}Mg_xNi_3$ type alloy. On the other hand, although the hydrogen-absorbing alloy according to Comparative Example 9 had a composition which was similar to those of Example 20, the hydrogen-absorption rate thereof was lower as compared with those of Example 20, because the hydrogen-absorbing alloy according to Comparative Example 9 was manufactured by means of a melt-quenching method.

Examples 23–44 and Comparative Examples 10–13, 15, 17–18

Various kinds of mother alloys, i.e. an RNi$_5$-type alloy, an RNi$_3$-type alloy, an RNi$_2$-type alloy and an RNi-type alloy which are relatively high in melting point, and an MgNi$_2$-type alloy were prepared by making use of an induction furnace (an argon gas atmosphere). Then, each mother alloy was weighed to obtain a predetermined composition as shown in Tables 4 to 6 and then sintered in an argon atmosphere at high temperatures to obtain various alloy ingots, which were respectively pulverized to a particle diameter of 75 μm or less.

Comparative Examples 14, 16 and 19

Each element was weighed so as to obtain the composition shown in the following Tables 4 to 6, and the resultant composition was melted in an induction furnace filled with an argon gas atmosphere, thereby preparing various kinds of alloy ingot.

Then, each alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 75 μm or less.

Electrodes were prepared according to the following procedures by making use of the hydrogen-absorbing alloy powders of Examples 23 to 44 and Comparative Examples 10 to 19. First of all, each hydrogen-absorbing alloy powder and electrolytic copper powder were mixed together at a ratio of 1:1. Then, 1 g of this mixture was press-molded for 5 minutes under a pressure of 10,000 kg by making use of a tablet molding machine (inner diameter: 10 mm) to produce a pellet. The resultant pellet was sandwiched between a pair of nickel meshes to form a composite, the periphery of which was then spot-welded. Thereafter, a nickel lead wire was further spot-welded thereby attaching it to the composite to produce an alloy electrode (a negative electrode).

Each of the negative electrodes thus obtained was immersed together with a sintered nickel electrode constituting a counter electrode in a 8N aqueous solution of potassium hydroxide whereby constituting a negative electrode capacity-controlled battery, and a charge/discharge cycle test was performed at a temperature of 250° C. so as to measure the maximum discharge capacity and the cycle life (the number of cycle when the discharge capacity was lowered to 80% of the maximum discharge capacity). The charge/discharge conditions in this test were as follows. Namely, the secondary battery was subjected at first to a charging for 10 hours with a current of 100 mA per 1 g of the hydrogen-absorbing alloy, and, after 10 minute cessation, discharged with a current of 20 mA per 1 g of the hydrogen-absorbing alloy until the battery voltage (with respect to a mercury oxide electrode) was decreased down to –0.5V. This charge/discharge cycle was repeated. The results of this test are shown in the following Tables 4 to 6.

TABLE 4

| | Hydrogen absorbing alloy | Maximum discharge capacity (mAh/g) | Cycle life |
|---|---|---|---|
| Comparative Example 10 | $Mg_{0.5}La_{0.05}Ni_2$ | 45 | 10 |
| Comparative Example 11 | $Mg_{0.67}La_{0.33}Ni_3$ | 100 | 15 |
| Comparative Example 12 | $Mg_{0.5}La_{0.5}Ni_{3.5}$ | 150 | 20 |
| Comparative Example 13 | $Mg_{0.03}La_{0.01}Ge_{0.96}Ni_2$ | 20 | 5 |
| Comparative Example 14 | $Mg_{0.27}Mm_{0.53}Nb_{0.08}Sn_{0.12}Ni_{3.25}$ (Mm; La: 37.5 at %, Ce: 50.3 at %, Pr: 5.5 at %, Nd: 6.5 at %, Sm: 0.2 at %) | 180 | 75 |
| Example 23 | $Mg_{0.33}La_{0.6}Al_{0.07}Ni_{3.02}$ | 360 | 295 |
| Example 24 | $Mg_3La_{0.5}Nd_{0.1}V_{0.07}Mo_{0.03}Ni_{3.4}$ | 365 | 320 |
| Example 25 | $Mg_{0.27}Mm_{0.53}Nb_{0.08}Sn_{0.12}Ni_{3.25}$ (Mm; La: 37.5 at %, Ce: 50.3 at %, Pr: 5.5 at %, Nd: 6.5 at %, Sm: 0.2 at %) | 360 | 335 |
| Example 26 | $Mg_{0.4}La_{0.4}Ag_{0.2}Ni_{3.3}$ | 305 | 240 |
| Example 27 | $Mg_{0.25}La_{0.65}Ce_{0.1}Al_{0.02}Ni_{3.6}$ | 355 | 305 |
| Example 28 | $Mg_{0.25}La_{0.65}Ce_{0.1}Al_{0.02}Ni_{3.8}$ | 300 | 250 |

TABLE 5

| | Hydrogen absorbing alloy | Maximum discharge capacity (mAh/g) | Cycle life |
|---|---|---|---|
| Comparative Example 15 | $Mg_{0.95}La_{0.05}(Ni_{0.98}Mn_{0.02})_2$ | 20 | 20 |
| Comparative Example 16 | $Mg_{0.35}Mm_{0.65}(Ni_{0.7}Cr_{0.1}Co_{0.2})_{3.65}$ | 200 | 180 |
| Example 29 | $Mg_{0.4}La_{0.45}Ce_{0.15}(Ni_{0.9}Cr_{0.1})_{3.54}$ | 320 | 280 |
| Example 30 | $Mg_{0.3}Lm_{0.7}(Ni_{0.9}Cr_{0.05}Cu_{0.05})_{3.02}$ | 390 | 245 |
| Example 31 | $Mg_{0.27}Lm_{0.73}(Ni_{0.85}Cr_{0.1}Fe_{0.05})_{3.22}$ | 385 | 280 |
| Example 32 | $Mg_{0.35}Mm_{0.65}(Ni_{0.7}Cr_{0.1}Co_{0.2})_{3.65}$ | 400 | 250 |
| Example 33 | $Mg_{0.5}Lm_{0.5}(Ni_{0.85}Cr_{0.05}Zn_{0.1})_{3.15}$ | 270 | 300 |
| Example 34 | $Mg_{0.25}La_{0.55}Pr_{0.2}(Ni_{0.7}Co_{0.01}Cu_{0.1})_{3.6}$ | 380 | 320 |
| Example 35 | $Mg_{0.25}La_{0.55}Pr_{0.2}(Ni_{0.7}Co_{0.2}Cu_{0.1})_{3.8}$ | 320 | 280 |

TABLE 6

| | Hydrogen absorbing alloy | Maximum discharge capacity (mAh/g) | Cycle life |
|---|---|---|---|
| Comparative Example 10 | $Mg_{0.5}La_{0.5}Ni_2$ | 45 | 10 |
| Comparative Example 11 | $Mg_{0.67}La_{0.33}Ni_3$ | 100 | 15 |
| Comparative Example 12 | $Mg_{0.5}La_{0.5}Ni_{3.5}$ | 150 | 20 |
| Comparative Example 17 | $Mg_{0.02}La_{0.01}In_{0.97}Ni_{2.6}Cu_{0.4}$ | 20 | 10 |
| Comparative Example 18 | $Mg_{0.7}La_{0.25}C_{0.05}Ni_{0.1}Fe_{2.9}$ | 50 | 15 |
| Comparative Example 19 | $Mg_{0.4}Ce_{0.3}In_{0.2}P_{0.1}Ni_{1.9}Cu_{1.1}Zn_{0.03}$ | 100 | 75 |
| Example 36 | $Mg_{0.67}La_{0.23}Al_{0.1}Ni_{2.5}Co_{0.5}$ | 180 | 210 |
| Example 37 | $Mg_{0.57}Lm_{0.33}Ag_{0.01}Ni_{2.2}Mn_{0.8}$ (Lm; La: 84 at %, Ce: 10 at %, Pr: 1 at %, Nd: 5 at %) | 195 | 200 |
| Example 38 | $Mg_{0.5}Sm_{0.3}Pb_{0.15}Co_{0.05}Ni_{2.5}Cr_{0.8}$ | 250 | 150 |
| Example 39 | $Mg_{0.4}Nd_{0.4}Ta_{0.1}Ge_{0.07}B_{0.03}Ni_{2.3}Fe_{1.1}$ | 320 | 160 |
| Example 40 | $Mg_{0.4}Ce_{0.3}In_{0.2}P_{0.1}Ni_{1.9}Cu_{1.1}Zn_{0.03}$ | 330 | 170 |
| Example 41 | $Mg_{0.67}La_{0.23}Al_{0.1}Ni_{2.5}Cu_{1.2}$ | 175 | 110 |
| Example 42 | $Mg_{0.4}Gd_{0.3}Si_{0.25}B_{0.05}Ni_{1.9}Cr_{1.5}Fe_{0.03}$ | 295 | 120 |
| Example 43 | $Mg_{0.24}La_{0.74}Al_{0.02}Ni_{3.2}Co_{0.3}Cu_{0.1}$ | 365 | 320 |
| Example 44 | $Mg_{0.24}La_{0.74}Al_{0.02}Ni_{3.4}Co_{0.3}Cu_{0.1}$ | 320 | 250 |

As apparent from Table 4, the nickel-hydrogen secondary batteries according to Examples 23 to 28 which were manufactured using a sintering method and a composition represented by the general formula (1) indicated more excellent properties in both maximum discharge capacity and charge/discharge cycle life as compared with the secondary batteries according to Comparative Examples 10 to 14. The reasons for poor performances in both discharge capacity and charge/discharge cycle life which were indicated by the secondary batteries according to Comparative Examples 10 to 12 can be attributed to the fact that the hydrogen-absorbing alloy constituting the negative electrode according to Comparative Examples 10 to 12 was either $La_{1-x}Mg_xNi_2$ type alloy or $La_{1-x}Mg_xNi_3$ type alloy. On the other hand, although the composition of the hydrogen-absorbing alloy contained in the negative electrode according to the secondary battery of Comparative Example 14 was similar to that of Example 25, both discharge capacity and charge/discharge cycle life were poor as compared with those of Example 25, because the hydrogen-absorbing alloy according to Comparative Example 14 was manufactured by means of a melt-quenching method.

As apparent from Table 5, the nickel-hydrogen secondary batteries according to Examples 29 to 35 which were manufactured using a sintering method and a composition represented by the general formula (2) indicated more excellent properties in both maximum discharge capacity and charge/discharge cycle life as compared with the secondary batteries according to Comparative Examples 15 and 16. Although the composition of the hydrogen-absorbing alloy contained in the negative electrode according to the secondary battery of Comparative Example 16 was similar to those of Example 32, both discharge capacity and charge/discharge cycle life were poor as compared with that of Example 32, because the hydrogen-absorbing alloy according to Comparative Example 16 was manufactured by means of a melt-quenching method.

As apparent from Table 6, the nickel-hydrogen secondary batteries according to Examples 36 to 44 which were manufactured using a sintering method and a composition represented by the general formula (3) indicated more excellent properties in both maximum discharge capacity and charge/discharge cycle life as compared with the secondary batteries according to Comparative Examples 10–12 and 17 to 19. Although the composition of the hydrogen-absorbing alloy contained in the negative electrode according to the secondary battery of Comparative Example 19 was similar to those of Example 40, both discharge capacity and charge/discharge cycle life were poor as compared with that of Example 40, because the hydrogen-absorbing alloy according to Comparative Example 19 was manufactured by means of a melt-quenching method.

Examples 45–55 and Comparative Examples 20–21

Each element was weighed so as to obtain the compositions shown in the following Table 7, and the resultant compositions were melted in an induction furnace filled with an argon gas atmosphere, thereby obtaining 13 kinds of alloy ingot. Then, these ingots were subjected to a heat treatment in an argon atmosphere for 3 hours at a temperature of 950° C. Subsequently, the alloy ingots were pulverized to prepare hydrogen absorbing alloy powder having a particle diameter of 150 μm or less.

By the way, the misch metal (Lm) shown in Table 7 was composed of 84 at. % of La, 10 at. % of Ce, 1 at. % of Pr, 5 at. % of Nd and 0.2 at. % of Sm; while the misch metal (Mm) was composed of 27.5 at. % of La, 50.3 at. % of Ce, 5.5 at. % of Pr, 16.5 at. % of Nd and 0.2 at. % of Sm.

Each hydrogen absorbing alloy powder was then mixed with electrolytic copper powder at a ratio of 1:2 (weight ratio), and 1 g of the resultant mixture was pressed for 5 minutes with a pressure of 10 tons/cm$^2$, thus obtaining 13 kinds of pellet each having a diameter of 12 mm. These pellets were sandwiched between Ni wire nettings, and the peripheral portion thereof was spot-welded and pressed. Subsequently, to this pressed body was connected Ni lead wires by means of spot-welding thereby preparing 13 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells (Examples 45–55, and Comparative Examples 20 to 21).

Comparative Example 22

A test cell was fabricated in the same manner as explained in Examples 45 to 55 except that the following hydrogen-absorbing alloy powder was employed in this example.

Namely, each element was weighed so as to obtain the composition shown in the following Table 7, and the resultant composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 150 $\mu$m or less.

Then, the test cells according to Examples 45–55 and Comparative Examples 20–22 were subjected to a charge/discharge cycle test at a temperature of 25° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 50 mA per 1 g of the hydrogen-absorbing alloy until the battery voltage (with respect to a mercury oxide electrode) was decreased down to –0.6V. This charge/discharge cycle was repeated so as to measure the maximum discharge capacity and the cycle life (the number of cycle when the discharge capacity was lowered to 80% of the maximum discharge capacity). The results of this test are shown in the following Table 7.

Furthermore, the hydrogen absorbing alloys of Examples 45–55 and Comparative Examples 20 to 22 were tested to measure, as a hydrogen absorption characteristic, a rechargeable hydrogen storage capacity (JIS H7003: Term for Hydrogen Absorbing Alloy) from the iso-thermal line of pressure-composition which was measured under a hydrogen pressure of less than 10 atm. at a temperature of 60° C. by making use of Sieverts's method (JIS H7201). The results are shown in the following Table 7.

TABLE 7

| | Compositions |
|---|---|
| Example 45 | $Mg_{0.31}La_{0.69}(Ni_{0.8}Co_{0.1}Al_{0.1})_{3.2}$ |
| Example 46 | $Mg_{0.3}La_{0.5}Pr_{0.2}(Ni_{0.8}Mn_{0.15}Si_{0.05})_{3.4}$ |
| Example 47 | $Mg_{0.27}La_{0.53}Nd_{0.2}(Ni_{0.8}Mn_{0.1}Co_{0.1})_{3.05}$ |
| Example 48 | $Mg_{0.25}Lm_{0.75}(Ni_{0.85}Co_{0.1}Fe_{0.05})_{3.7}$ |
| Example 49 | $Mg_{0.24}Lm_{0.76}(Ni_{0.8}Mn_{0.15}Ga_{0.05})_{3.65}$ |
| Example 50 | $Mg_{0.34}Lm_{0.66}(Ni_{0.75}Co_{0.1}Mn_{0.1}Al_{0.05})_{3.33}$ |
| Example 51 | $Mg_{0.25}Lm_{0.45}Pr_{0.3}(Ni_{0.68}Co_{0.2}Cu_{0.1}Zn_{0.02})_{3.5}$ |
| Example 52 | $Mg_{0.28}Lm_{0.62}Nd_{0.1}(Ni_{0.84}Cu_{0.1}Sn_{0.05}B_{0.01})_{3.3}$ |

| | Discharge capacity (mAh/g) | Cycle life | Rechargeable hydrogen storage capacity (H/M) |
|---|---|---|---|
| Example 45 | 405 | 295 | 1.15 |
| Example 46 | 380 | 320 | 1.08 |
| Example 47 | 395 | 335 | 1.13 |
| Example 48 | 360 | 295 | 1.06 |
| Example 49 | 385 | 305 | 1.11 |
| Example 50 | 375 | 290 | 1.05 |
| Example 51 | 390 | 300 | 1.09 |
| Example 52 | 380 | 305 | 1.07 |

| | Compositions |
|---|---|
| Example 53 | $Mg_{0.22}La_{0.78}(Ni_{0.74}Co_{0.1}Cu_{0.1}Mn_{0.05}Al_{0.01})_{3.6}$ |
| Example 54 | $Mg_{0.22}La_{0.78}(Ni_{0.74}Co_{0.1}Cu_{0.1}Mn_{0.05}Al_{0.01})_{3.8}$ |
| Example 55 | $Mg_{0.35}Mm_{0.65}(Ni_{0.75}Mn_{0.2}Al_{0.05})_{3.01}$ |
| Comparative Example 20 | $Mg_{0.6}La_{0.4}Ni_{4.8}Al_{0.3}$ |
| Comparative Example 21 | $Mg_{0.1}La_{0.8}Ce_{0.1}Ni_{1.1}Sn_{0.9}$ |

TABLE 7-continued

| Comparative Example 22 | $Mg_{0.35}Mm_{0.65}(Ni_{0.75}Mn_{0.2}Al_{0.05})_{3.01}$ |
|---|---|

| | Discharge capacity (mAh/g) | Cycle life | Rechargeable hydrogen storage capacity (H/M) |
|---|---|---|---|
| Example 53 | 365 | 300 | 1.02 |
| Example 54 | 330 | 260 | 0.95 |
| Example 55 | 300 | 250 | 0.81 |
| Comparative Example 20 | 50 | 150 | 0.15 |
| Comparative Example 21 | 60 | 100 | 0.20 |
| Comparative Example 22 | 180 | 120 | 0.43 |

As apparent from Table 7, the hydrogen-absorbing alloys according to Examples 45 to 55 which were manufactured by means of a casting method and represented by the general formula (4) indicated a higher rechargeable hydrogen storage capacity as compared with the hydrogen-absorbing alloys according to Comparative Examples 20 to 22.

Further, the secondary batteries comprising a negative electrode containing any one of the hydrogen-absorbing alloys of Examples 45 to 55 indicated more excellent properties in both maximum discharge capacity and charge/discharge cycle life as compared with the secondary batteries comprising a negative electrode containing any one of the hydrogen-absorbing alloys of Comparative Examples 20 to 22.

Examples 56–65 and Comparative Examples 23–24

Each element was weighed so as to obtain the compositions shown in the Table 8, and the resultant compositions were melted in an induction furnace filled with an argon gas atmosphere and then cast into a water-cooled copper mold, each melt cast in this manner being allowed to solidify to obtain various kinds of alloy ingot. Then, these ingots were subjected to a heat treatment in an argon atmosphere for 3 hours at a temperature of 950° C. Subsequently, the alloy ingots were pulverized to prepare hydrogen absorbing alloy powder having a particle diameter of 150 $\mu$m or less.

By the way, the misch metal (Lm) shown in Table 8 was composed of 90 at. % of La, 1 at. % of Ce, 6 at. % of Pr, 3 at. % of Nd; while the misch metal (Mm) was composed of 34 at. % of La, 50.8 at. % of Ce, 8 at. % of Pr, 7 at. % of Nd and 0.2 at. % of Sm.

Each hydrogen absorbing alloy powder was then mixed with electrolytic copper powder at a ratio of 1:3 (weight ratio), and 1 g of the resultant mixture was pressed for 8 minutes with a pressure of 8 tons/cm$^2$, thus obtaining 12 kinds of pellet each having a diameter of 10 mm. These pellets were sandwiched between Ni wire nettings, and the peripheral portion thereof was spot-welded and pressed. Subsequently, to this pressed body was connected Ni lead wires by means of spot-welding thereby preparing 12 kinds of hydrogen absorbing alloy electrode (a negative electrode).

Each of the negative electrodes thus obtained was dipped together with a counter electrode (sintered nickel electrode) into an aqueous solution of 6N-KOH (electrolyte) in a case, whereby assembling test cells (Examples 56–65, and Comparative Examples 23–24).

Comparative Example 25

A test cell was fabricated in the same manner as explained in Examples 56 to 65 except that the following hydrogen-absorbing alloy powder was employed in this example.

Namely, each element was weighed so as to obtain the composition shown in the following Table 8, and the resultant composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 150 μm or less.

Then, the test cells according to Examples 56–65 and Comparative Examples 23–25 were subjected to a charge/discharge cycle test at a temperature of 25° C. The charge/discharge conditions in this test were as follows. Namely, the secondary battery was subjected at first to a charging for 3 hours with a current of 200 mA per 1 g of the hydrogen-absorbing alloy, and, after 10 minute cessation, discharged with a current of 100 mA per 1 g of the hydrogen-absorbing alloy until the battery voltage (with respect to a mercury oxide electrode) was decreased down to −0.55V. This charge/discharge cycle was repeated so as to measure the maximum discharge capacity and the cycle life (the number of cycle when the discharge capacity was lowered to 80% of the maximum discharge capacity). The results of this test are shown in the following Table 8.

Furthermore, the hydrogen absorbing alloys of Examples 56–65 and Comparative Examples 23 to 25 were tested to measure, as a hydrogen absorption characteristic, a rechargeable hydrogen storage capacity (JIS H7003: Term for Hydrogen Absorbing Alloy) from the isothermal line of pressure-composition which was measured under a hydrogen pressure of less than 10 atm. at a temperature of 45° C. by making use of Sieverts's method (JIS H7201). The results are shown in the following Table 8.

TABLE 8

| | Compositions |
|---|---|
| Example 56 | $La_{0.71}Mg_{0.28}Zr_{0.01}(Ni_{0.8}Co_{0.1}Mn_{0.08}Al_{0.02})_{3.33}$ |
| Example 57 | $La_{0.57}Pr_{0.17}Mg_{0.25}Ti_{0.01}(Ni_{0.92}Co_{0.05}Mn_{0.02}Al_{0.01})_{3.54}$ |
| Example 58 | $Lm_{0.75}Mg_{0.24}Hf_{0.01}(Ni_{0.72}Cu_{0.15}Mn_{0.05}Al_{0.01}Si_{0.01})_{3.52}$ |
| Example 59 | $Lm_{0.69}Mg_{0.3}Ca_{0.01}(Ni_{0.84}Co_{0.1}Fe_{0.05}Al_{0.01})_{3.12}$ |
| Example 60 | $Lm_{0.5}Mm_{0.24}Mg_{0.24}Zr_{0.02}(Ni_{0.84}Cu_{0.1}Mn_{0.05}Ga_{0.01})_{3.6}$ |
| Example 61 | $Lm_{0.5}Mm_{0.24}Mg_{0.24}Zr_{0.02}(Ni_{0.84}Cu_{0.1}Mn_{0.05}Ga_{0.01})_{3.8}$ |
| Example 62 | $Lm_{0.5}Mm_{0.25}Mg_{0.24}Ca_{0.01}(Ni_{0.65}Co_{0.25}Mn_{0.05}Zn_{0.05})_{3.47}$ |
| Example 63 | $Lm_{0.58}Mg_{0.32}Zr_{0.1}(Ni_{0.68}Co_{0.1}Cu_{0.1}Mn_{0.1}Sn_{0.02})_{3.23}$ |
| Example 64 | $Lm_{0.68}Mg_{0.27}Ca_{0.05}(Ni_{0.8}Cu_{0.1}Mn_{0.08}B_{0.01})_{3.39}$ |
| Example 65 | $Mg_{0.6}Mg_{0.35}Zr_{0.05}(Ni_{0.89}Co_{0.01}Mn_{0.05}Cu_{0.05})_{3.08}$ |
| Comparative Example 23 | $La_{0.3}Mg_{0.7}(Ni_{0.1}Co_{0.6}Al_{0.3})_{3.25}$ |
| Comparative Example 24 | $La_{0.05}Mg_{0.3}Ca_{0.65}(Ni_{0.5}Mn_{0.5})_{3.58}$ |
| Comparative Example 25 | $Mm_{0.6}Mg_{0.35}Zr_{0.05}(Ni_{0.89}Co_{0.01}Mn_{0.05}Cu_{0.05})_{3.08}$ |

| | Discharge capacity (mAh/g) | Cycle life | Rechargeable hydrogen storage capacity (H/M) |
|---|---|---|---|
| Example 56 | 365 | 350 | 0.98 |
| Example 57 | 370 | 330 | 1.00 |
| Example 58 | 360 | 345 | 0.97 |
| Example 59 | 355 | 340 | 0.97 |
| Example 60 | 345 | 360 | 0.95 |
| Example 61 | 315 | 290 | 0.85 |
| Example 62 | 350 | 360 | 0.96 |

TABLE 8-continued

| Example 63 | 340 | 375 | 0.94 |
| Example 64 | 370 | 350 | 1.01 |
| Example 65 | 305 | 300 | 0.83 |
| Comparative Example 23 | 40 | 25 | 0.14 |
| Comparative Example 24 | 160 | 12 | 0.75 |
| Comparative Example 25 | 220 | 120 | 0.78 |

As apparent from Table 8, the hydrogen-absorbing alloys according to Examples 56 to 65 which were manufactured by means of a casting method and represented by the general formula (5) indicated a higher rechargeable hydrogen storage capacity as compared with the hydrogen-absorbing alloys according to Comparative Examples 23 to 25.

Further, the secondary batteries comprising a negative electrode containing any one of the hydrogen-absorbing alloys of Examples 56 to 65 indicated more excellent properties in both maximum discharge capacity and charge/discharge cycle life as compared with the secondary batteries comprising a negative electrode containing any one of the hydrogen-absorbing alloys of Comparative Examples 23 to 25.

Examples 66–68 and Comparative Example 26

Each element was weighed so as to obtain the compositions shown in the Table 9, and the resultant compositions were melted in an induction furnace filled with an argon gas atmosphere and then cast into a water-cooled copper mold, each melt cast in this manner being allowed to solidify to obtain four kinds of alloy ingot. Then, these ingots were subjected to a heat treatment in an argon atmosphere for 3 hours at a temperature of 950° C. Subsequently, the alloy ingots were pulverized to prepare hydrogen absorbing alloy powder having a particle diameter of 150 μm or less.

By the way, the misch metal (Lm) shown in Table 9 was the same as explained with reference to Table 8.

Each hydrogen absorbing alloy powder was then treated in the same manner as in the cases of Examples 56–65, thereby preparing a hydrogen absorbing alloy electrode (a negative electrode).

Each of the negative electrodes thus obtained was dipped together with a counter electrode (sintered nickel electrode) into an aqueous solution of 6N-KOH (electrolyte) in a case, whereby assembling test cells (Examples 66–68, and Comparative Example 26).

Then, the test cells according to Examples 66–68 and Comparative Example 26 were subjected to a charge/discharge cycle test at a temperature of 25° C. to measure the maximum discharge capacity and the cycle life (the number of cycle when the discharge capacity was lowered to 80% of the maximum discharge capacity). The results of this test are shown in the following Table 9. By the way, the conditions for this charge/discharge cycle test was the same as in the cases of Examples 56–65.

Furthermore, the hydrogen absorbing alloys of Examples 66–68 and Comparative Example 26 were tested to measure, as a hydrogen absorption characteristic, a rechargeable hydrogen storage capacity (JIS H7003: Term for Hydrogen Absorbing Alloy) from the iso-thermal line of pressure-composition which was measured under a hydrogen pressure of less than 10 atm. at a temperature of 45° C. by making use of Sieverts's method (JIS H7201). The results are shown in the following Table 9.

TABLE 9

|  | Compositions | Discharge capacity (mAh/g) | Cycle life | Rechargeable hydrogen storage capacity (H/M) |
|---|---|---|---|---|
| Example 66 | $Mg_{0.3}Lm_{0.65}Ca_{0.05}$ $(Ni_{0.9}Fe_{0.05}Al_{0.05})_{3.12}$ | 360 | 350 | 1.00 |
| Example 67 | $Mg_{0.3}Lm_{0.6}Ca_{0.1}$ $(Ni_{0.9}Fe_{0.05}Al_{0.05})_{3.12}$ | 355 | 335 | 0.99 |
| Example 68 | $Mg_{0.3}Lm_{0.5}Ca_{0.2}$ $(Ni_{0.9}Fe_{0.05}Al_{0.05})_{3.12}$ | 345 | 290 | 0.98 |
| Comparative Example 26 | $Mg_{0.3}Lm_{0.35}Ca_{0.35}$ $(Ni_{0.9}Fe_{0.05}Al_{0.05})_{3.12}$ | 300 | 50 | 0.92 |

As apparent from Table 9, the hydrogen-absorbing alloys according to Examples 66–68 where the Ca content is 0.3 or less indicated a higher rechargeable hydrogen storage capacity as compared with the hydrogen-absorbing alloy according to Comparative Example 26 where the Ca content is more than 0.3.

Further, the secondary batteries according to Examples 66–68 indicated more excellent properties in both maximum discharge capacity and charge/discharge cycle life as compared with the secondary battery according to Comparative Example 26.

Examples 69–78

Each element was weighed so as to obtain the compositions shown in the following Table 10, and the resultant compositions were melted in an induction furnace filled with an argon gas atmosphere, thereby obtaining 10 kinds of alloy ingot. Then, these ingots were subjected to a heat treatment in an argon atmosphere for 5 hours at a temperature ranging from 950° C. to 1,000° C. By the way, the misch metal (Lm) shown in Table 10 was composed of 92 at. % of La, 4 at. % of Ce, 1 at. % of Pr and 3 at. % of Nd.

Subsequently, the alloy ingots were pulverized to prepare hydrogen absorbing alloy powder having a particle diameter of 100 μm or less.

Each hydrogen absorbing alloy powder was then mixed with electrolytic copper powder at a ratio of 1:2 (weight ratio), and 1 g of the resultant mixture was pressed for 5 minutes with a pressure of 10 tons/cm², thus obtaining 10 kinds of pellet each having a diameter of 12 mm. These pellets were sandwiched between Ni wire nettings, and the peripheral portion thereof was spot-welded and pressed. Subsequently, to this pressed body was connected Ni lead wires by means of spot-welding thereby preparing 10 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells.

Then, the test cells according to Examples 69–78 were subjected to a charge/discharge cycle test at a temperature of 20° C. The charge/discharge conditions in this test were as follows. Namely, the secondary battery was subjected at first to a charging for 2.5 hours with a current of 200 mA per 1 g of the hydrogen-absorbing alloy, and, after 10 minute cessation, discharged with a current of 100 mA per 1 g of the hydrogen-absorbing alloy until the battery voltage (with respect to a mercury oxide electrode) was decreased down to −0.7V. This charge/discharge cycle was repeated so as to measure the maximum discharge capacity and the cycle life (the number of cycle when the discharge capacity was lowered to 80% of the maximum discharge capacity). The results of this test are shown in the following Table 11.

Furthermore, the hydrogen absorbing alloys of Examples 69–78 were tested to measure hydrogen absorption characteristics. That is, the isothermal line of pressure-composition was measured under a hydrogen pressure of less than 10 atm. at a temperature of 50° C. by making use of Sieverts's method (JIS H7201). Then, a plateau slope at the moment of hydrogen desorption (JIS H7003: Term for Hydrogen Absorbing Alloy) was calculated from the iso-thermal line of pressure-composition. In this case, the hydrogen pressures, which can be determined by extending the straight lines of the plateau region to a portion of hydrogen absorption quantity exhibiting (H/M)=0 and to another portion of hydrogen absorption quantity exhibiting (H/M)=1, were defined as $P_0$ and $P_1$, respectively, and the plateau slope was determined from the ratio between $P_0$ and $P_1$. Further, a ratio between the hydrogen absorption pressure (PA) and the hydrogen desorption pressure (PD) at the center of the plateau region was calculated from the isothermal line of pressure-composition. Hysteresis (JIS H7003: Term for Hydrogen Absorbing Alloy) was determined from the ratio between PA and PD. The results of these tests are shown in the following Table 11.

TABLE 10

|  | Compositions |
|---|---|
| Example 69 | $La_{0.7}Mg_{0.3}$ $(Ni_{0.85}Co_{0.15})_{3.2}$ |
| Example 70 | $La_{0.71}Mg_{0.29}$ $(Ni_{0.77}Co_{0.2}Mn_{0.03})_{3.45}$ |
| Example 71 | $Lm_{0.75}Mg_{0.25}$ $(Ni_{0.82}Co_{0.13}Cu_{0.05})_{3.28}$ |
| Example 72 | $La_{0.63}Zr_{0.1}Mg_{0.27}$ $(Ni_{0.85}Co_{0.1}Cr_{0.03}Al_{0.02})_{3.67}$ |
| Example 73 | $La_{0.71}Mg_{0.29}$ $(Ni_{0.97}Mn_{0.03})_{3.45}$ |
| Example 74 | $La_{0.71}Mg_{0.29}$ $(Ni_{0.77}Mn_{0.23})_{3.45}$ |
| Example 75 | $La_{0.70}Mg_{0.30}$ $(Ni_{0.50}Co_{0.50})_{3.2}$ |
| Example 76 | $La_{0.70}Mg_{0.30}$ $(Ni_{0.40}Co_{0.60})_{3.2}$ |
| Example 77 | $La_{0.70}Mg_{0.30}$ $(Ni_{0.65}Co_{0.15}Mn_{0.20})_{3.2}$ |
| Example 78 | $La_{0.70}Mg_{0.30}$ $(Ni_{0.55}Co_{0.15}Mn_{0.30})_{3.2}$ |

TABLE 11

|  | Plateau Slope ($P_1/P_0$) | Hysteresis ($P_a/P_d$) | Discharge capacity (mAh/g) | Cycle life |
|---|---|---|---|---|
| Example 69 | 3.45 | 2.6 | 405 | 354 |
| Example 70 | 3.65 | 3.4 | 390 | 376 |
| Example 71 | 2.95 | 2.9 | 386 | 380 |
| Example 72 | 3.25 | 2.8 | 380 | 400 |
| Example 73 | 5.93 | 3.6 | 350 | 330 |
| Example 74 | 7.20 | 3.7 | 355 | 325 |
| Example 75 | 3.10 | 3.2 | 400 | 360 |

TABLE 11-continued

|  | Plateau Slope ($P_1/P_0$) | Hysteresis ($P_a/P_d$) | Discharge capacity (mAh/g) | Cycle life |
| --- | --- | --- | --- | --- |
| Example 76 | 3.90 | 3.6 | 360 | 320 |
| Example 77 | 3.50 | 3.3 | 410 | 355 |
| Example 78 | 3.95 | 3.7 | 360 | 320 |

As apparent from Tables 10 and 11, the hydrogen-absorbing alloys according to Examples 69 to 78 indicated a lower plateau slope and a lower hysteresis, thus suggesting an excellent property of these alloy.

Further, the secondary batteries comprising a negative electrode containing any one of these hydrogen-absorbing alloys according to Examples 69 to 78 indicated more excellent properties in both discharge capacity and charge/discharge cycle life. In particular, the secondary batteries comprising a hydrogen-absorbing alloy containing Co according to Example 69 indicated a longer cycle life, a smaller plateau slope and a smaller hysteresis as compared with the secondary batteries of Examples 73 and 74 where a negative electrode containing Co-free alloy was employed. Further, the secondary batteries according to Example 75 where the negative electrode contained the alloy having a Co content of 0.5 indicated a longer cycle life, and a smaller plateau slope and a smaller hysteresis of the alloy as compared with the secondary batteries of Example 76 where the negative electrode contained the alloy having a Co content of more than 0.5. Furthermore, the secondary batteries according to Example 77 where the negative electrode contained the alloy having a Mn content of 0.2 indicated a longer cycle life, and a smaller plateau slope and a smaller hysteresis of the alloy as compared with the secondary batteries of Example 78 where the negative electrode contained the alloy having a Mn content of more than 0.2.

Subsequently, the alloy ingots were pulverized to prepare hydrogen absorbing alloy powder having a particle diameter of 100 μm or less. Each hydrogen absorbing alloy powder was then mixed with electrolytic copper powder at a ratio of 1:2 (weight ratio), and 1g of the resultant mixture was pressed for 5 minutes with a pressure of 10 tons/cm$^2$, thus obtaining 15 kinds of pellet each having a diameter of 12 mm. These pellets were sandwiched between Ni wire nettings, and the peripheral portion thereof was spot-welded and pressed. Subsequently, to this pressed body was connected Ni lead wires by means of spot-welding thereby preparing 15 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells.

Then, the test cells according to Examples 79–93 were subjected to a charge/discharge cycle test at a temperature of 20° C. The charge/discharge conditions in this test were as follows. Namely, the secondary battery was subjected at first to a charging for 2.5 hours with a current of 200 mA per 1 g of the hydrogen-absorbing alloy, and, after 10 minute cessation, discharged with a current of 100 mA per 1 g of the hydrogen-absorbing alloy until the battery voltage (with respect to a mercury oxide electrode) was decreased down to −0.7V. This charge/discharge cycle was repeated so as to measure the maximum discharge capacity and the cycle life (the number of cycle when the discharge capacity was lowered to 80% of the maximum discharge capacity). The results of this test are shown in the following Table 12.

TABLE 12

|  | Compositions | Discharge capacity (mAh/g) | Cycle life |
| --- | --- | --- | --- |
| Example 79 | $La_{0.47}Lm_{0.23}Mg_{0.3}(Ni_{0.82}Co_{0.13}Al_{0.03}Si_{0.02})_{3.15}$ | 410 | 380 |
| Example 80 | $La_{0.73}Mg_{0.27}(Ni_{0.77}Co_{0.2}Mn_{0.03})_{3.5}$ | 380 | 340 |
| Exmaple 81 | $Lm_{0.75}Mg_{0.25}(Ni_{0.85}Co_{0.1}Cu_{0.05})_{3.2}$ | 378 | 320 |
| Example 82 | $La_{0.63}Nd_{0.1}Mg_{0.27}(Ni_{0.85}Co_{0.1}Cr_{0.03}Fe_{0.02})_{3.7}$ |  |  |
| Example 83 | $La_{0.64}Ce_{0.05}Mg_{0.31}(Ni_{0.67}CO_{0.25}Nb_{0.05}B_{0.03})_{3.4}$ | 385 | 355 |
| Example 84 | $La_{0.68}Pr_{0.1}Mg_{0.22}(Ni_{0.85}Co_{0.1}Sn_{0.05})_{3.6}$ | 380 | 330 |
| Example 85 | $Lm_{0.7}Mg_{0.3}(Ni_{0.75}Co_{0.2}Ga_{0.03}P_{0.02})_{3.65}$ | 390 | 370 |
| Example 86 | $Lm_{0.73}Mg_{0.27}(Ni_{0.85}Co_{0.1}Mn_{0.04}B_{0.01})_{3.42}$ | 395 | 325 |
| Example 87 | $Lm_{0.6}Mm_{0.16}Mg_{0.24}(Ni_{0.8}Co_{0.15}Si_{0.05})_{3.65}$ | 380 | 305 |
| Example 88 | $Lm_{0.76}Mg_{0.24}(Ni_{0.75}Co_{0.1}V_{0.1}Mn_{0.05})_{3.33}$ | 375 | 290 |
| Example 89 | $(La_{0.1}Nd_{0.9})_{0.73}Mg_{0.27}(Ni_{0.77}Co_{0.2}Mn_{0.03})_{3.5}$ | 360 | 280 |
| Example 90 | $Pr_{0.73}Mg_{0.27}(Ni_{0.77}Co_{0.2}Mn_{0.03})_{3.5}$ | 355 | 275 |
| Example 91 | $(La_{0.9}Nd_{0.1})_{0.73}Mg_{0.27}(Ni_{0.77}Co_{0.2}Mn_{0.03})_{3.5}$ | 405 | 375 |
| Example 92 | $Lm_{0.67}mg_{0.3}Ca_{0.03}(Ni_{0.7}Co_{0.2}Fe_{0.05}Al_{0.05})_{3.12}$ | 380 | 300 |
| Example 93 | $La_{0.68}Pr_{0.1}Mg_{0.22}(Ni_{0.85}Co_{0.1}Sn_{0.05})_{3.8}$ | 330 | 250 |

Examples 79–93

Each element was weighed so as to obtain the compositions shown in the following Table 12, and the resultant compositions were melted in an induction furnace filled with an argon gas atmosphere, thereby obtaining 15 kinds of alloy ingot. Then, these ingots were subjected to a heat treatment in an argon atmosphere for 5 hours at a temperature ranging from 950° C. to 1,000° C. By the way, the misch metal (Lm) shown in Table 12 was composed of 92 at. % of La, 4 at. % of Ce, 1 at. % of Pr and 3 at. % of Nd; while the misch metal (Mm) shown in Table 12 was composed of 37.5 at. % of La, 45.3 at. % of Ce, 5.5 at. % of Pr, 11.5 at. % of Nd and 0.2 at. % of Sm.

As apparent from Table 12, the hydrogen-absorbing alloys according to Examples 79 to 93 indicated a high discharge capacity and a long cycle life.

Further, the secondary battery according to Example 91 where the negative electrode contained the alloy containing La in the rare earth component and also containing a rare earth component other than La at a ratio of less than 0.9 was found more excellent in both discharge capacity and cycle life as compared with any of the secondary batteries according to Examples 89, 90 and 80; i.e. the secondary battery of Example 89 where the negative electrode contained the alloy containing La at a ratio 0.1 in the rare earth component; the secondary battery of Example 90 where the negative electrode contained the alloy not containing La at all in the rare earth component; and the secondary battery of Example 80 where the negative electrode contained the alloy wherein the rare earth was entirely occupied by La.

−0.7V. This charge/discharge cycle was repeated so as to measure the maximum discharge capacity and the cycle life (the number of cycle when the discharge capacity was lowered to 80% of the maximum discharge capacity). The results of this test are shown in the following Table 13.

TABLE 13

| | Compositions | Discharge capacity (mAh/g) | Cycle life |
|---|---|---|---|
| Example 94 | $Lm_{0.71}Mg_{0.28}Zr_{0.01}(Ni_{0.8}Co_{0.11}Mn_{0.08}Al_{0.01})_{3.3}$ | 360 | 385 |
| Example 95 | $Lm_{0.54}Pr_{0.17}Mg_{0.28}Ti_{0.01}(Ni_{0.92}Co_{0.05}Cu_{0.02}Al_{0.01})_{3.42}$ | 365 | 370 |
| Example 96 | $Lm_{0.71}Mg_{0.28}Hf_{0.01}(Ni_{0.72}Co_{0.15}Mn_{0.05}Al_{0.01}Si_{0.01})_{3.38}$ | 360 | 365 |
| Example 97 | $Lm_{0.7}Mg_{0.3}Ca_{0.01}(Ni_{0.79}Co_{0.15}Fe_{0.05}Al_{0.01})_{3.12}$ | 355 | 350 |
| Example 98 | $Lm_{0.5}Mm_{0.24}Mg_{0.24}Zr_{0.02}(Ni_{0.74}Co_{0.2}Mn_{0.05}Ga_{0.01})_{3.6}$ | 345 | 370 |
| Example 99 | $Lm_{0.5}Mm_{0.24}Mg_{0.24}Zr_{0.02}(Ni_{0.74}Co_{0.2}Mn_{0.05}Ga_{0.01})_{3.8}$ | 315 | 300 |
| Example 100 | $Lm_{0.5}Mm_{0.25}Mg_{0.24}Ca_{0.01}(Ni_{0.75}Co_{0.15}Mn_{0.05}Zn_{0.05})_{3.52}$ | 350 | 360 |
| Example 101 | $Lm_{0.67}Mg_{0.32}Zr_{0.01}(Ni_{0.78}Co_{0.1}Cu_{0.1}Sn_{0.02})_{3.23}$ | 340 | 375 |
| Example 102 | $Lm_{0.54}Nd_{0.17}Mg_{0.27}Ca_{0.02}(Ni_{0.81}Co_{0.1}Cu_{0.08}B_{0.01})_{3.39}$ | 370 | 350 |
| Example 103 | $Lm_{0.63}Mg_{0.32}Zr_{0.05}(Ni_{0.89}Co_{0.01}Cu_{0.05}Mn_{0.05})_{3.08}$ | 360 | 360 |
| Example 104 | $La_{0.63}Y_{0.05}Mg_{0.3}Zr_{0.02}(Ni_{0.77}Co_{0.1}Cu_{0.1}Al_{0.03})_{3.05}$ | 365 | 365 |
| Example 105 | $La_{0.63}Ce_{0.05}Mg_{0.3}Zr_{0.02}(Ni_{0.79}Co_{0.1}Cu_{0.1}Si_{0.01})_{3.05}$ | 360 | 370 |
| Example 106 | $Lm_{0.63}Y_{0.05}Mg_{0.3}Zr_{0.02}(Ni_{0.77}Co_{0.1}Cu_{0.1}Al_{0.03})_{3.05}$ | 360 | 375 |
| Example 107 | $La_{0.38}Mm_{0.25}Y_{0.05}Mg_{0.3}Zr_{0.02}(Ni_{0.77}Co_{0.1}Cu_{0.1}Al_{0.03})_{3.05}$ | 355 | 380 |
| Example 108 | $Mm_{0.6}Mg_{0.35}Zr_{0.05}(Ni_{0.89}Co_{0.01}Mn_{0.07}Cu_{0.03})_{3.08}$ | 305 | 290 |

Examples 94–108

Each element was weighed so as to obtain the compositions shown in the following Table 13, and the resultant compositions were melted in an induction furnace filled with an argon gas atmosphere and then subjected to a heat treatment in an argon gas atmosphere for 5 hours at a temperature of 950° C., thereby obtaining 15 kinds of alloy ingot. By the way, the misch metal (Lm) shown in Table 13 was composed of 92 at. % of La, 1 at. % of Ce, 5 at. % of Pr, 2 at. % of Nd; while the misch metal (Mm) was composed of 34 at. % of La, 50.4 at. % of Ce, 9 at. % of Pr, 6 at. % of Nd and 0.6 at. % of Sm.

Subsequently, the alloy ingots were pulverized to prepare hydrogen absorbing alloy powder having a particle diameter of 80 μm or less. Each hydrogen absorbing alloy powder was then mixed with electrolytic copper powder at a ratio of 1:3 (weight ratio), and 1 g of the resultant mixture was pressed for 8 minutes with a pressure of 8 tons/cm², thus obtaining 15 kinds of pellet each having a diameter of 10 mm. These pellets were sandwiched between Ni wire nettings, and the peripheral portion thereof was spot-welded and pressed. Subsequently, to this pressed body was connected Ni lead wires by means of spot-welding thereby preparing 15 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells.

Then, the test cells according to Examples 94–108 were subjected to a charge/discharge cycle test at a temperature of 25° C. The charge/discharge conditions in this test were as follows. Namely, the secondary battery was subjected at first to a charging for 4.5 hours with a current of 100 mA per 1 g of the hydrogen-absorbing alloy, and, after 10 minute cessation, discharged with a current of 100 mA per 1 g of the hydrogen-absorbing alloy until the battery voltage (with respect to a mercury oxide electrode) was decreased down to As apparent from Table 13, the hydrogen-absorbing alloys according to Examples 94 to 108 indicated a high discharge capacity and a long cycle life.

Examples 109–117
(Evaluation of electrode)

Each element was weighed so as to obtain the compositions shown in the following Table 14, and the resultant compositions were melted in an induction furnace filled with an argon gas atmosphere, thereby obtaining 9 kinds of alloy ingot. Then, all of the alloy ingots excluding the ingot of Example 117 were heat-treated in an argon atmosphere at a temperature of 1,000° C. for 5 hours.

Subsequently, the alloy ingots thus obtained were pulverized to prepare hydrogen absorbing alloy powder having a particle diameter of 75 μm or less. Each hydrogen absorbing alloy powder was then mixed with electrolytic copper powder at a ratio of 1:3 (weight ratio), and 1 g of the resultant mixture was pressed for 5 minutes with a pressure of 10 tons/cm², thus obtaining 9 kinds of pellet each having a diameter of 10 mm. These pellets were sandwiched between Ni wire nettings, and the peripheral portion thereof was spot-welded and pressed. Subsequently, to this pressed body was connected Ni lead wires by means of spot-welding thereby preparing 9 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells.

Comparative Example 27

A test cell was assembled in the same manner as in the cases of Examples 109 to 117 except that a hydrogen-absorbing alloy powder to be explained below was employed.

Each element was weighed so as to obtain the composition shown in the following Table 14, and the resultant composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 75 μm or less.

Then, the test cells according to Examples 109–117 and Comparative Example 27 were subjected to a charge/discharge cycle test at a temperature of 25° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 50 mA per 1 g of the hydrogen-absorbing alloy until the battery voltage (with respect to a mercury oxide electrode) was decreased down to −0.6V. This charge/discharge cycle was repeated so as to measure the maximum discharge capacity and the cycle life (the number of cycle when the discharge capacity was lowered to 80% of the maximum discharge capacity). The results of this test are shown in the following Table 14.

(Vickers hardness)

The hydrogen-absorbing alloys obtained in Examples 109–117 and Comparative Example 27 were respectively sliced to a strip having a thickness of 8 mm by making use of a micro-cutter, and then mirror-finished by making use of a diamond paste having a particle diameter of 0.25 μm, whereby preparing an evaluation sample. Then, the Vickers hardness of each sample was measured using a micro-Vickers hardness meter (AKASHI Co., Ltd.) under the conditions wherein a load of 25 gf was applied for 15 seconds. The results of the measurement are shown in the following Table 14.

Examples 118–126

(Evaluation of electrode)

Each element was weighed so as to obtain the compositions shown in the following Table 15, and the resultant compositions were melted in an induction furnace filled with an argon gas atmosphere, thereby obtaining 9 kinds of alloy ingot. Then, all of the alloy ingots excluding the ingot of Example 126 were heat-treated in an argon atmosphere at a temperature of 1,000° C. for 5 hours.

Subsequently, the alloy ingots thus obtained were pulverized to prepare hydrogen absorbing alloy powder having a particle diameter of 75 μm or less. Each hydrogen absorbing alloy powder was then mixed with electrolytic copper powder at a ratio of 1:3 (weight ratio), and 1 g of the resultant mixture was pressed for 5 minutes with a pressure of 10 tons/cm$^2$, thus obtaining 9 kinds of pellet each having a diameter of 10 mm. These pellets were sandwiched between Ni wire nettings, and the peripheral portion thereof was spot-welded and pressed. Subsequently, to this pressed body was connected Ni lead wires by means of spot-welding thereby preparing 9 kinds of hydrogen absorbing alloy electrode (a negative electrode).

Each of the negative electrodes thus obtained was dipped together with a counter electrode (sintered nickel electrode) into an aqueous solution of 8N-KOH (electrolyte) in a case, whereby assembling test cells.

Comparative Example 28

A test cell was assembled in the same manner as in the cases of Examples 118 to 126 except that a hydrogen-absorbing alloy powder to be explained below was employed.

Each element was weighed so as to obtain the composition shown in the following Table 15, and the resultant

TABLE 14

| | Compositions | Vickers hardness | Discharge capacity (mAh/g) | Cycle life |
|---|---|---|---|---|
| Example 109 | $Mg_{0.32}(La_{0.7}Pr_{0.3})_{0.68}Ni_{3.04}$ | 520 | 370 | 315 |
| Example 110 | $Mg_{0.23}(La_{0.9}Sm_{0.1})_{0.77}Ni_{3.58}$ | 473 | 365 | 305 |
| Example 111 | $Mg_{0.24}(La_{0.9}Gd_{0.1})_{0.76}Ni_{3.52}$ | 452 | 362 | 320 |
| Example 112 | $Mg_{0.28}(La_{0.78}Y_{0.01}Pr_{0.21})_{0.72}Ni_{3.32}$ | 503 | 365 | 325 |
| Example 113 | $Mg_{0.24}(La_{0.88}Ce_{0.12})_{0.76}Ni_{3.6}$ | 605 | 345 | 310 |
| Example 114 | $Mg_{0.2}(La_{0.64}Pr_{0.36})_{0.8}Ni_{3.8}$ | 545 | 375 | 320 |
| Example 115 | $Mg_{0.25}(La_{0.7}Ce_{0.1}Pr_{0.2})_{0.75}Ni_{3.52}$ | 570 | 360 | 325 |
| Example 116 | $Mg_{0.33}(La_{0.5}Ce_{0.5})_{0.67}Ni_{3.02}$ | 655 | 295 | 275 |
| Example 117 | $Mg_{0.35}(La_{0.54}Ce_{0.2}Nd_{0.26})_{0.65}Ni_{3.01}$ | 715 | 285 | 205 |
| Comparative Example 27 | $Mg_{0.33}(La_{0.5}Ce_{0.5})_{0.67}Ni_{3.23}$ | 755 | 200 | 120 |

As apparent from Table 14, the secondary batteries according to Examples 109 to 117 comprising alloys which were manufactured by means of a casting method and represented by the general formula (8) indicated a larger discharge capacity and a longer cycle life as compared with the secondary battery according to Comparative Example 27. It is also apparent that the secondary battery of Examples 109 to 116 which comprised a negative electrode containing a hydrogen-absorbing alloy having a Vickers hardness of less than 700 Hv was more excellent in the discharge capacity and the cycle life as compared with the secondary battery of Example 117 which comprised a negative electrode containing a hydrogen-absorbing alloy having a Vickers hardness of 700 Hv or more.

composition was melted in an induction furnace filled with an argon gas atmosphere, thereby preparing an alloy ingot.

Then, the alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 75 μm or less.

Then, the test cells according to Examples 118 to 126 and Comparative Example 28 were subjected to a charge/discharge cycle test at a temperature of 25° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 50 mA per 1 g of the hydrogen-absorbing alloy until the battery voltage (with respect to a mercury oxide electrode) was decreased down to −0.6V. This charge/discharge cycle was repeated so as to measure the maximum discharge capacity and the cycle life (the number of cycle when the discharge capacity was lowered to 80% of the maximum discharge capacity). The results of this test are shown in the following Table 15.
(Vickers hardness)

The hydrogen-absorbing alloys obtained in Examples 118 to 126 and Comparative Example 28 were tested to measure the Vickers hardness thereof in the same manner as explained with reference to Examples 109 to 117. The results of the measurement are shown in the following Table 15.

TABLE 15

Compositions

Example 118  $Mg_{0.32}(La_{0.7}Pr_{0.3})_{0.68}(Ni_{0.9}Co_{0.1})_{3.04}$
Example 119  $Mg_{0.23}(La_{0.9}Sm_{0.1})_{0.77}(Ni_{0.7}Co_{0.2}Fe_{0.05}Al_{0.05})_{3.12}$
Example 120  $Mg_{0.21}(La_{0.9}Gd_{0.1})_{0.79}(Ni_{0.48}Co_{0.5}B_{0.02})_{3.55}$
Example 121  $Mg_{0.28}(La_{0.88}Y_{0.01}Pr_{0.11})_{0.72}(Ni_{0.79}Co_{0.15}Fe_{0.05}Al_{0.01})_{3.32}$
Example 122  $Mg_{0.24}(La_{0.9}Ce_{0.1})_{0.76}(Ni_{0.74}Cu_{0.2}Mn_{0.05}Ga_{0.01})_{3.6}$
Example 123  $Mg_{0.21}(La_{0.64}Pr_{0.36})_{0.79}(Ni_{0.68}Co_{0.1}Cu_{0.1}Mn_{0.1}Sn_{0.02})_{3.8}$
Example 124  $Mg_{0.25}(La_{0.64}Ce_{0.1}Pr_{0.26})_{0.75}(Ni_{0.75}Co_{0.15}Mn_{0.02}Zn_{0.05})_{3.52}$
Example 125  $Mg_{0.33}(La_{0.5}Ce_{0.5})_{0.67}(Ni_{0.78}Co_{0.1}Cu_{0.1}Si_{0.02})_{3.02}$
Example 126  $Mg_{0.35}(La_{0.54}Ce_{0.2}Nd_{0.26})_{0.65}(Ni_{0.51}Co_{0.1}Fe_{0.3}B_{0.01})_{3.01}$
Comparative Example 28  $Mg_{0.33}(La_{0.5}Ce_{0.5})_{0.67}(Ni_{0.78}Co_{0.1}Cu_{0.1}Si_{0.02})_{3.23}$

| | Vickers hardness | Discharge capacity (mAh/g) | Cycle life |
|---|---|---|---|
| Example 118 | 480 | 390 | 305 |
| Example 119 | 483 | 380 | 307 |
| Example 120 | 412 | 402 | 299 |
| Example 121 | 553 | 385 | 325 |
| Example 122 | 545 | 375 | 310 |
| Example 123 | 645 | 335 | 300 |
| Example 124 | 570 | 380 | 330 |
| Example 125 | 605 | 305 | 285 |
| Example 126 | 720 | 285 | 200 |
| Comparative Example 28 | 750 | 220 | 130 |

As apparent from Table 15, the secondary batteries according to Examples 118 to 126 comprising alloys which were manufactured by means of a casting method and represented by the general formula (9) indicated a larger discharge capacity and a longer cycle life as compared with the secondary battery according to Comparative Example 28. It is also apparent that the secondary battery of Examples 118 to 125 which comprised a negative electrode containing a hydrogen-absorbing alloy having a Vickers hardness of less than 700 Hv was more excellent in the discharge capacity and the cycle life as compared with the secondary battery of Example 126 which comprised a negative electrode containing a hydrogen-absorbing alloy having a Vickers hardness of 700 Hv or more.

Examples 127–140 and Comparative Examples 29–31

Each element was weighed, taking the yield into consideration, so as to ultimately obtain the compositions shown in the Table 16, and the resultant compositions were melted in an induction furnace filled with an argon gas atmosphere thereby manufacturing alloy ingots. Each alloy ingot was then heat-treated in an argon atmosphere at a temperature of 1,000° C. for 5 hours, thereby preparing the hydrogen-absorbing alloy ingots each having a composition shown in the following Table 16.

Then, these hydrogen absorbing alloy ingots were pulverized and sieved to prepare the alloy powders having a particle diameter of 75 μm or less.

Then, a hydrogen-absorbing alloy electrode was manufactured through the procedures as illustrated below.

150 μL (5% by weight) of aqueous solution of PVA (polyvinyl alcohol)was added to 600 mg of each alloy powder and sufficiently kneaded to obtain a paste. The paste was then stuffed into a foamed metal substrate having a size of 2 cm×2 cm and provided with a terminal and then sufficiently dried in air atmosphere and in vacuum. The resultant composite body was pressed with a pressure of 2 tons/cm$^2$, thus obtaining the hydrogen absorbing alloy electrode (a negative electrode).

Each of the negative electrodes thus obtained was dipped together with a counter electrode (sintered nickel electrode) into an aqueous solution of 8N-KOH (electrolyte), and a charge/discharge test was performed at temperatures of 25° C. and 50° C.

The charge/discharge conditions in this test were as follows. Namely, in each temperature (25° C. and 50° C.), the secondary battery was subjected at first to a charging for 5 hours with a current of 100 mA per 1 g of the hydrogen-absorbing alloy, and, after 10 minute cessation, discharged with a current of 50 mA per 1 g of the hydrogen-absorbing alloy until the battery voltage (with respect to a mercury oxide reference electrode) was decreased down to −0.6V, which was followed by a 10 minute cessation.

Then, a discharge capacity maintenance rate (%) at a temperature of 50° C. was calculated from the discharge capacities at temperatures of 25° C. and 50° C. according to the following formula (i), the results being shown in the following Table 17.

Maintenance rate (%)={C(50° C.)/C(25° C.)}×100  (i)

wherein C(50° C.) is a discharge capacity at the 50th cycle in the charge/discharge test at a temperature of 50° C.; and C(25° C.) is a discharge capacity at the 50th cycle in the charge/discharge test at a temperature of 25° C.

TABLE 16

Compositions of hydrogen absorbing alloy

Example 127  $MgO_{0.34}(La_{0.72}Ce_{0.15}Pr_{0.03}Nd_{0.10})_{0.65}Ca_{0.01}(Ni_{0.79}Fe_{0.01}Al_{0.02})_{3.32}$
Example 128  $MgO_{0.23}(La_{0.92}Ce_{0.02}Pr_{0.03}Nd_{0.03})_{0.74}Ti_{0.02}Zr_{0.01}(Ni_{0.77}Sn_{0.2}Cu_{0.02}Si_{0.01})_{3.55}$
Example 129  $MgO_{0.29}(La_{0.89}Ce_{0.07}Nd_{0.04})_{0.69}Zr_{0.02}(Ni_{0.74}Mn_{0.24}B_{0.01}Zn_{0.01})_{3.03}$
Example 130  $MgO_{0.32}(La_{0.86}Ce_{0.05}Pr_{0.01}Nd_{0.07})_{0.63}Hf_{0.05}(Ni_{0.9}Co_{0.1})_{3.19}$
Example 131  $MgO_{0.33}(La_{0.86}Ce_{0.10}Pr_{0.02}Nd_{0.01}Sm_{0.01})_{0.66}Hf_{0.01}(Ni_{0.64}Co_{0.21}Mn_{0.1}Al_{0.05})_{3.32}$
Example 132  $MgO_{0.25}(La_{0.82}Ce_{0.14}Pr_{0.02}Nd_{0.01}Sm_{0.01})_{0.72}Ca_{0.02}Zr_{0.01}(Ni_{0.84}Mn_{0.1}Cu_{0.03}Si_{0.02}B_{0.01})_{3.53}$ TABLE 16-continued

| | Compositions of hydrogen absorbing alloy |
|---|---|
| Example 133 | $MgO_{0.34}(La_{0.792}Ce_{0.168}Pr_{0.02}Nd_{0.02})_{0.63}Hf_{0.02}(Ni_{0.93}Fe_{0.02}Ga_{0.04}Cu_{0.01})_{3.3}$ |
| Example 134 | $MgO_{0.17}(La_{0.738}Ce_{0.162}Pr_{0.05}Nd_{0.05})_{0.78}Zr_{0.01}Ca_{0.04}(Ni_{0.75}Mn_{0.18}Al_{0.05}Fe_{0.01}Sn_{0.01})_{3.56}$ |
| Example 135 | $MgO_{0.38}(La_{0.75}Ce_{0.14}Pr_{0.05}Nd_{0.02}Sm_{0.04})_{0.55}Ti_{0.04}Zr_{0.03}(Ni_{0.83}Al_{0.13}Zn_{0.01}B_{0.01}Fe_{0.02})_{3.66}$ |
| Example 136 | $MgO_{0.22}(La_{0.83}Ce_{0.10}Pr_{0.01}Nd_{0.04}Sm_{0.02})_{0.67}Hf_{0.07}Ca_{0.04}(Ni_{0.74}Sn_{0.22}Cu_{0.02}Si_{0.01}B_{0.01})_{3.75}$ |
| Example 137 | $MgO_{0.16}(La_{0.74}Ce_{0.13}Pr_{0.08}Nd_{0.03}Sm_{0.02})_{0.80}Ca_{0.01}Ti_{0.03}(Ni_{0.49}Mn_{0.39}Al_{0.06}Sn_{0.06})_{3.69}$ |
| Example 138 | $MgO_{0.34}(La_{0.72}Ce_{0.15}Pr_{0.03}Nd_{0.10})_{0.65}Ca_{0.01}(Ni_{0.79}Fe_{0.01}Al_{0.2})_{3.32}$ |
| Example 139 | $MgO_{0.47}(La_{0.84}Ce_{0.04}Pr_{0.08}Nd_{0.02}Sm_{0.02})_{0.52}Hf_{0.01}(Ni_{0.78}Mn_{0.19}Al_{0.03})_{3.87}$ |
| Example 140 | $MgO_{0.28}(La_{0.74}Ce_{0.19}Pr_{0.03}Nd_{0.03}Sm_{0.01})_{0.68}Ca_{0.03}Zr_{0.01}(Ni_{0.88}Sn_{0.08}Cu_{0.01}Si_{0.02}B_{0.01})_{3.92}$ |
| Comparative Example 29 | $MgO_{0.65}(La_{0.36}Ce_{0.52}Pr_{0.03}Nd_{0.08}Sm_{0.01})_{0.27}Ca_{0.08}(Ni_{0.68}Mn_{0.2}Al_{0.08}Fe_{0.02}Ga_{0.02})_{4.6}$ |
| Comparative Example 30 | $MgO_{0.53}(La_{0.22}Ce_{0.67}Pr_{0.02}Nd_{0.09})_{0.27}Ti_{0.01}(Ni_{0.57}Ga_{0.34}Zn_{0.02}Si_{0.07})_{4.2}$ |
| Comparative Example 31 | $MgO_{0.2}(La_{0.08}Ce_{0.77}Pr_{0.04}Nd_{0.08}Sm_{0.03})_{0.2}Zr_{0.2}Ti_{0.4}(Ni_{0.65}Fe_{0.2}Ga_{0.15}Cu_{0.1})_{2.8}$ |

TABLE 17

| | Discharge capacity maintenance rate (%) at 50° C. |
|---|---|
| Example 127 | 83 |
| Example 128 | 86 |
| Example 129 | 87 |
| Example 130 | 86 |
| Example 131 | 87 |
| Example 132 | 85 |
| Example 133 | 85 |
| Example 134 | 83 |
| Example 135 | 82 |
| Example 136 | 82 |
| Example 137 | 84 |
| Example 138 | 83 |
| Example 139 | 80 |
| Example 140 | 82 |
| Comparative Example 29 | 77 |
| Comparative Example 30 | 74 |
| Comparative Example 31 | 67 |

As apparent from Tables 16 and 17, the secondary batteries of Examples 127 to 140 each comprising a negative electrode containing a hydrogen-absorbing alloy where Ce content in the R2 was less than 20% by weight were capable of more effectively suppressing the deterioration of discharge capacity at high temperatures as compared with the secondary batteries of Comparative Examples 29 to 31 comprising a negative electrode containing a hydrogen-absorbing alloy where Ce content in the R2 was more than 20% by weight.

Examples 141–150 and Comparative Examples 32–35

Each element was weighed, taking the yield into consideration, so as to ultimately obtain the compositions shown in the Table 18, and the resultant compositions were melted in an induction furnace filled with an argon gas atmosphere thereby manufacturing alloy ingots. Then, each alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 89° C. for 12 hours in an argon atmosphere.

Then, these hydrogen absorbing alloy flakes were pulverized and sieved to prepare the alloy powders having a particle diameter of 75 μm or less. Then, a hydrogen-absorbing alloy electrode (a negative electrode) was manufactured in the same manner as illustrated with reference to the aforementioned Examples 127 to 140.

Each of the negative electrodes thus obtained was dipped together with a counter electrode (sintered nickel electrode) into an aqueous solution of 8N-KOH (electrolyte), and a charge/discharge test was performed at temperatures of 25° C. and 50° C. The charge/discharge conditions in this test were the same as illustrated with reference to the aforementioned Examples 127 to 140.

Then, a discharge capacity maintenance rate (%) at a temperature of 50° C. was calculated from the discharge capacities at temperatures of 25° C. and 50° C. according to the aforementioned formula (i), the results being shown in the following Table 19.

TABLE 18

| | Compositions of hydrogen absorbing alloy |
|---|---|
| Example 141 | $Mg_{0.30}(Y_{0.01}La_{0.91}Ce_{0.05}Pr_{0.02}Sm_{0.01})_{0.69}Ca_{0.01}(Ni_{0.77}Mn_{0.02}Co_{0.15}Al_{0.05}B_{0.01})_{3.05}$ |
| Example 142 | $Mg_{0.19}(La_{0.83}Ce_{0.11}Pr_{0.04}Nd_{0.01}Sm_{0.01})_{0.79}Ti_{0.01}Hf_{0.01}(Ni_{0.84}Fe_{0.01}Sn_{0.05}Cu_{0.10})_{3.53}$ |
| Example 143 | $Mg_{0.30}(La_{0.89}Ce_{0.08}Pr_{0.02}Eu_{0.01})_{0.69}Zr_{0.01}(Ni_{0.88}Co_{0.10}Ga_{0.01}Si_{0.01})_{3.30}$ |
| Example 144 | $Mg_{0.15}(La_{0.92}Ce_{0.03}Pr_{0.04}Gd_{0.01})_{0.60}Ca_{0.07}Ti_{0.05}Zr_{0.08}Hf_{0.05}(Ni_{0.82}Fe_{0.01}Zn_{0.01}Cu_{0.15}B_{0.01})_{3.10}$ |
| Example 145 | $Mg_{0.12}(La_{0.76}Ce_{0.17}Pr_{0.05}Tb_{0.01}Lu_{0.01})_{0.87}Zr_{0.01}(Ni_{0.82}Co_{0.15}Mn_{0.01}Al_{0.01}B_{0.01})_{3.57}$ |
| Example 146 | $Mg_{0.38}(La_{0.72}Ce_{0.19}Pr_{0.08}Dy_{0.01})_{0.60}Ca_{0.01}Hf_{0.01}(Ni_{0.65}Fe_{0.10}Co_{0.10}Al_{0.05}Cu_{0.1})_{3.01}$ |
| Example 147 | $Mg_{0.36}(La_{0.78}Ce_{0.15}Pr_{0.07})_{0.62}Ti_{0.01}Hf_{0.01}(Ni_{0.78}Mn_{0.05}Fe_{0.10}Al_{0.05}Zn_{0.01}Si_{0.01})_{3.65}$ |
| Example 148 | $Mg_{0.12}(La_{0.74}Ce_{0.15}Pr_{0.07}Nd_{0.03}Ho_{0.01})_{0.73}Zr_{0.05}Ca_{0.05}Hf_{0.05}(Ni_{0.45}Mn_{0.15}Co_{0.20}Al_{0.10}Cu_{0.10})_{3.78}$ |
| Example 149 | $Mg_{0.46}(La_{0.87}Ce_{0.02}Pr_{0.08}Nd_{0.02}Er_{0.01})_{0.53}Zr_{0.01}(Ni_{0.82}Fe_{0.01}Co_{0.10}Ga_{0.01}Sn_{0.05}B_{0.01})_{3.12}$ |
| Example 150 | $Mg_{0.05}(Ld_{0.88}Ce_{0.02}Pr_{0.08}Tm_{0.01}Yb_{0.01})_{0.94}Ti_{0.01}(Ni_{0.60}Mn_{0.05}Co_{0.10}Al_{0.05}Zn_{0.10}Cu_{0.10})_{3.90}$ |

TABLE 18-continued

Compositions of hydrogen absorbing alloy

| | |
|---|---|
| Comparative Example 32 | $Mg_{0.05}(Y_{0.01}La_{0.50}Ce_{0.45}Pr_{0.02}Nd_{0.02})_{0.55}Ca_{0.40}(Ni_{0.20}Mn_{0.20}Al_{0.30}Zn_{0.20}Si_{0.10})_{2.80}$ |
| Comparative Example 33 | $Mg_{0.25}(La_{0.66}Ce_{0.27}Pr_{0.02}Sm_{0.01}Dy_{0.01}Ho_{0.01}Yb_{0.01})_{0.65}Ti_{0.10}(Ni_{0.79}M_{0.21})_{4.05}$ (M; $Mn_{0.05}Al_{0.05}Sn_{0.10}B_{0.01}$) |
| Comparative Example 34 | $Mg_{0.29}(La_{0.15}Ce_{0.75}Pr_{0.04}Nd_{0.03}Sm_{0.01}Gd_{0.01}Er_{0.01})_{0.70}Hf_{0.01}(Ni_{0.54}Fe_{0.10}Co_{0.15}Cu_{0.20}B_{0.01})_{3.21}$ |
| Comparative Example 35 | $Mg_{0.60}(La_{0.50}Ce_{0.35}Pr_{0.07}Nd_{0.03}Sm_{0.02}Eu_{0.01}Tb_{0.01}Tm_{0.01})_{0.39}Hf_{0.01}(Ni_{0.69}M_{0.21}Co_{0.10})_{3.50}$ (M; $Fe_{0.10}Ga_{0.01}Cu_{0.10}$) |

TABLE 19

| | Discharge capacity maintenance rate (%) at 50° C. |
|---|---|
| Example 141 | 87 |
| Example 142 | 84 |
| Example 143 | 86 |
| Example 144 | 81 |
| Example 145 | 85 |
| Example 146 | 82 |
| Example 147 | 83 |
| Example 148 | 84 |
| Example 149 | 82 |
| Example 150 | 79 |
| Comparative Example 32 | 42 |
| Comparative Example 33 | 38 |
| Comparative Example 34 | 43 |
| Comparative Example 35 | 34 |

As apparent from Tables 18 and 19, the secondary batteries of Examples 141 to 150 each comprising a negative electrode containing a hydrogen-absorbing alloy where Ce content in the R2 was less than 20% by weight were capable of more effectively suppressing the deterioration of discharge capacity at high temperatures as compared with the secondary batteries of Comparative Examples 32 to 35 comprising a negative electrode containing a hydrogen-absorbing alloy where Ce content in the R2 was more than 20% by weight.

The hydrogen-absorbing alloys included in the negative electrode of the second batteries according to Examples 141 to 150 were manufactured by means of a melt-quenching method. While the hydrogen-absorbing alloys included in the negative electrode of the second batteries according to previous Examples 127 to 140 were manufactured by means of a casting method, so that the cooling rate of the alloy was relatively slow as compared with that in Examples 141 to 150.

As apparent from Tables 16 to 19, the secondary batteries of Examples 141 to 150 exhibited respectively a discharge capacity which was comparable to the secondary batteries of Examples 127 to 140. The reason for enabling the secondary batteries according to Examples 141 to 150 to exhibit a high discharge capacity maintenance rate at a temperature of 50° C. even if the hydrogen-absorbing alloy was manufactured through a quench solidification such as a melt-quenching method using a roll may be attributed to the fact that since the compositions thereof contained less than 20% by weight of Ce in its R2 component, it was possible to obtain a hydrogen-absorbing alloy which was minimal in plane defect even though the alloy was manufactured by means of a melt-quenching method.

Examples 151–163 and Comparative Examples 36–40

Each element was weighed, taking the yield into consideration, so as to ultimately obtain the compositions shown in the Table 20, and the resultant compositions were melted in an induction furnace filled with an argon gas atmosphere thereby manufacturing alloy ingots. Each alloy ingot was then heat-treated in an argon atmosphere at a temperature of 1,000° C. for 5 hours, thereby preparing the hydrogen-absorbing alloy ingots each having a composition shown in the following Table 20.

Then, these hydrogen absorbing alloy ingots were pulverized and sieved to prepare the alloy powders having a particle diameter of 75 μm or less.

Then, a hydrogen-absorbing alloy electrode was manufactured through the same procedures as illustrated with reference to the aforementioned Examples 127 to 140.

Each of the negative electrodes thus obtained was dipped together with a counter electrode (sintered nickel electrode) into an aqueous solution of 8N-KOH (electrolyte), and a charge/discharge test was performed at temperatures of 25° C. and 50° C. The charge/discharge conditions in this test were the same as illustrated with reference to the aforementioned Examples 127 to 140.

Then, a discharge capacity maintenance rate (%) at a temperature of 50° C. was calculated from the discharge capacities at temperatures of 25° C. and 50° C. according to the aforementioned formula (i), the results being shown in the following Table 21. By the way, Table 21 also shows the acceptable Ce content "m" (weight %) which was calculated from the aforementioned formula (I): m=125y+20, as well as the Ce content (weight %) which was actually included in the R3 of the hydrogen-absorbing alloy.

TABLE 20

Compositions of hydrogen absorbing alloy

| | |
|---|---|
| Example 151 | $Mg_{0.31}(La_{0.87}Ce_{0.09}Pr_{0.02}Nd_{0.01}Sm_{0.01})_{0.67}Ti_{0.02}(Ni_{0.78}Co_{0.1}Mn_{0.1}Sn_{0.02})_{3.12}$ |
| Example 152 | $Mg_{0.31}(La_{0.81}Ce_{0.15}Pr_{0.02}Nd_{0.01}Sm_{0.01})_{0.67}Ti_{0.02}(Ni_{0.78}Co_{0.1}Mn_{0.1}Sn_{0.02})_{3.12}$ |
| Example 153 | $Mg_{0.31}(La_{0.69}Ce_{0.27}Pr_{0.02}Nd_{0.01}Sm_{0.01})_{0.67}Ti_{0.02}(Ni_{0.78}Co_{0.1}Mn_{0.1}Sn_{0.02})_{3.12}$ |
| Comparative | $Mg_{0.31}(La_{0.61}Ce_{0.35}Pr_{0.02}Nd_{0.10}Sm_{0.01})_{0.67}Ti_{0.02}(Ni_{0.78}Co_{0.1}Mn_{0.1}Sn_{0.02})_{3.12}$ |

TABLE 20-continued

Compositions of hydrogen absorbing alloy

Example 36
Example 154  $Mg_{0.31}(La_{0.87}Ce_{0.09}Pr_{0.02}Nd_{0.01}Sm_{0.01})_{0.67}Ti_{0.02}(Ni_{0.65}Co_{0.2}Mn_{0.1}Al_{0.05})_{3.05}$
Example 155  $Mg_{0.31}(La_{0.74}Ce_{0.22}Pr_{0.02}Nd_{0.01}Sm_{0.01})_{0.67}Ti_{0.02}(Ni_{0.65}Co_{0.2}Mn_{0.1}Al_{0.05})_{3.05}$
Example 156  $Mg_{0.31}(La_{0.56}Ce_{0.40}Pr_{0.02}Nd_{0.01}Sm_{0.01})_{0.67}Ti_{0.02}(Ni_{0.65}Co_{0.2}Mn_{0.1}Al_{0.05})_{3.05}$
Comparative  $Mg_{0.31}(La_{0.49}Ce_{0.47}Pr_{0.02}Nd_{0.01}Sm_{0.01})_{0.67}Ti_{0.02}(Ni_{0.65}Co_{0.2}Mn_{0.1}Al_{0.05})_{3.05}$
Example 37
Example 157  $Mg_{0.31}(La_{0.81}Ce_{0.15}Pr_{0.02}Nd_{0.01}Sm_{0.01})_{0.67}Ti_{0.02}(Ni_{0.51}Co_{0.37}Al_{0.05}Cu_{0.07})_{3.08}$
Example 158  $Mg_{0.31}(La_{0.57}Ce_{0.39}Pr_{0.02}Nd_{0.01}Sm_{0.01})_{0.67}Ti_{0.02}(Ni_{0.51}Co_{0.37}Al_{0.05}Cu_{0.07})_{3.08}$
Example 159  $Mg_{0.31}(La_{0.33}Ce_{0.63}Pr_{0.02}Nd_{0.01}Sm_{0.01})_{0.67}Ti_{0.02}(Ni_{0.51}Co_{0.37}Al_{0.05}Cu_{0.07})_{3.08}$
Comparative  $Mg_{0.31}(La_{0.24}Ce_{0.72}Pr_{0.02}Nd_{0.01}Sm_{0.01})_{0.67}Ti_{0.02}(Ni_{0.51}Co_{0.37}Al_{0.05}Cu_{0.07})_{3.08}$
Example 38
Example 160  $Mg_{0.31}(La_{0.61}Ce_{0.35}Pr_{0.02}Nd_{0.01}Sm_{0.01})_{0.67}Ti_{0.02}(Ni_{0.65}Co_{0.2}Mn_{0.1}Al_{0.05})_{3.05}$
Example 161  $Mg_{0.28}(La_{0.45}Ce_{0.5}Pr_{0.02}Nd_{0.03})_{0.69}Zr_{0.03}(Ni_{0.63}Co_{0.3}Ga_{0.03}Zn_{0.04})_{3.42}$
Example 162  $Mg_{0.33}(La_{0.76}Ce_{0.19}Pr_{0.02}Sm_{0.03})_{0.62}Hf_{0.05}(Ni_{0.81}Co_{0.12}Al_{0.02}Cu_{0.01}Si_{0.04})_{3.22}$
Example 163  $Mg_{0.27}(La_{0.66}Ce_{0.30}Pr_{0.02}Nd_{0.01}Sm_{0.01})_{0.62}Ce_{0.01}(Ni_{0.79}Co_{0.16}Al_{0.02}Fe_{0.02}B_{0.01})_{3.35}$
Comparative  $Mg_{0.5}(La_{0.3}Ce_{0.65}Pr_{0.02}Nd_{0.03})_{0.43}Ca_{0.05}Ti_{0.02}(Ni_{0.74}Co_{0.23}Mn_{0.02}Al_{0.01})_{3.35}$
Example 39
Comparative  $Mg_{0.34}(La_{0.5}Ce_{0.41}Pr_{0.03}Nd_{0.03}Sm_{0.03})_{0.63}Ca_{0.03}(Ni_{0.83}Co_{0.11}Fe_{0.03}Si_{0.02}B_{0.01})_{3.21}$
Example 40

TABLE 21

| | Acceptable Ce content "m" (wt %) | Ce content (wt %) in the R3 of the alloy | Discharge capacity maintenance rate (%) at 50° C. |
|---|---|---|---|
| Example 151 | 32.5 | 9 | 87 |
| Example 152 | 32.5 | 15 | 87 |
| Example 153 | 32.5 | 27 | 86 |
| Comparative Example 36 | 32.5 | 35 | 68 |
| Example 154 | 45 | 9 | 86 |
| Example 155 | 45 | 22 | 87 |
| Example 156 | 45 | 40 | 85 |
| Comparative Example 37 | 45 | 47 | 65 |
| Example 157 | 66.25 | 15 | 85 |
| Example 158 | 66.25 | 39 | 83 |
| Example 159 | 66.25 | 63 | 84 |
| Comparative Example 38 | 66.25 | 72 | 69 |
| Example 160 | 45 | 35 | 88 |
| Example 161 | 57.5 | 50 | 83 |
| Example 162 | 35 | 19 | 84 |
| Example 163 | 40 | 30 | 84 |
| Comparative Example 39 | 48.75 | 65 | 68 |
| Comparative Example 40 | 33.75 | 41 | 75 |

As apparent from Tables 20 and 21, the secondary batteries of Examples 151 to 153 each comprising a negative electrode containing a hydrogen-absorbing alloy where Ce content in the R3 was less than the value (m % by weight) calculated from the formula (I) were capable of more effectively suppressing the deterioration of discharge capacity at a high temperature environment as compared with the secondary battery of Comparative Example 36 comprising a negative electrode containing a hydrogen-absorbing alloy where Ce content in the R3 was more than m % by weight.

Further, from the comparison in property between the secondary batteries of Examples 154 to 156 and the secondary battery of Comparative Example 37, as well as from the comparison in property between the second batteries of Examples 157 to 159 and the secondary battery of Comparative Example 38, it is apparent that when Co content is altered likewise, the similar tendency as illustrated above would be recognized. Moreover, as seen from Examples 160 to 163, even when the atomic ratio of each element or the kind of the element is changed, it is possible to suppress the deterioration of discharge capacity at high temperatures as far as the Ce content in the R3 is less than m % by weight.

Examples 164–175 and Comparative
Examples 41–47

Each element was weighed, taking the yield into consideration, so as to ultimately obtain the compositions shown in the Table 22, and the resultant compositions were melted in an induction furnace filled with an argon gas atmosphere thereby manufacturing alloy ingots. Then, each alloy ingot was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere.

Then, these hydrogen absorbing alloy flakes were pulverized and sieved to prepare the alloy powders having a particle diameter of 75 µm or less.

Then, a hydrogen-absorbing alloy electrode was manufactured through the same procedures as illustrated with reference to the aforementioned Examples 127 to 140.

Each of the negative electrodes thus obtained was dipped together with a counter electrode (sintered nickel electrode) into an aqueous solution of 8N-KOH (electrolyte), and a charge/discharge test was performed at temperatures of 25° C. and 50° C. The charge/discharge conditions in this test were the same as illustrated with reference to the aforementioned Examples 127 to 140.

Then, a discharge capacity maintenance rate (%) at a temperature of 50° C. was calculated from the discharge capacities at temperatures of 25° C. and 50° C. according to the aforementioned formula (i), the results being shown in the following Table 23.

TABLE 22

Compositions of hydrogen absorbing alloy

| | |
|---|---|
| Example 164 | $Mg_{0.29}(La_{0.89}Ce_{0.05}Pr_{0.03}Nd_{0.02}Sm_{0.01})_{0.70}Hf_{0.01}(Ni_{0.86}Co_{0.08}Al_{0.05}Cu_{0.01})_{3.28}$ |
| Example 165 | $Mg_{0.29}(La_{0.84}Ce_{0.10}Pr_{0.03}Nd_{0.02}Sm_{0.01})_{0.70}Hf_{0.01}(Bi_{0.86}Co_{0.08}Al_{0.05}Cu_{0.01})_{3.28}$ |
| Example 166 | $Mg_{0.29}(La_{0.67}Ce_{0.27}Pr_{0.03}Nd_{0.02}Sm_{0.01})_{0.70}Hf_{0.01}(Ni_{0.86}Co_{0.08}Al_{0.05}Cu_{0.01})_{3.28}$ |
| Comparative Example 41 | $Mg_{0.29}(La_{0.59}Ce_{0.235}Pr_{0.03}Nd_{0.02}Sm_{0.01})_{0.70}Hf_{0.01}(Ni_{0.86}Co_{0.08}Al_{0.05}Cu_{0.01})_{3.28}$ |
| Example 167 | $Mg_{0.29}(La_{0.87}Ce_{0.07}Pr_{0.03}Nd_{0.02}Sm_{0.01})_{0.70}Hf_{0.01}(Ni_{0.73}Fe_{0.01}Co_{0.25}B_{0.01})_{3.32}$ |
| Example 168 | $Mg_{0.29}(La_{0.73}Ce_{0.21}Pr_{0.03}Nd_{0.02}Sm_{0.01})_{0.07}Hf_{0.01}(Ni_{0.73}Fe_{0.01}Co_{0.25}B_{0.01})_{3.32}$ |
| Example 169 | $Mg_{0.29}(La_{0.49}Ce_{0.45}Pr_{0.03}Nd_{0.02}Sm_{0.01})_{0.07}Hf_{0.01}(Ni_{0.73}Fe_{0.01}Co_{0.25}B_{0.01})_{3.32}$ |
| Comparative Example 42 | $Mg_{0.29}(La_{0.39}Ce_{0.55}Pr_{0.03}Nd_{0.02}Sm_{0.01})_{0.07}Hf_{0.01}(Ni_{0.73}Fe_{0.01}Co_{0.25}B_{0.01})_{3.32}$ |
| Example 170 | $Mg_{0.29}(La_{0.76}Ce_{0.18}Pr_{0.03}Nd_{0.02}Sm_{0.01})_{0.70}Hf_{0.01}(Ni_{0.59}Co_{0.38}Sn_{0.01}Cu_{0.01}Si_{0.01})_{3.31}$ |
| Example 171 | $Mg_{0.29}(La_{0.54}Ce_{0.40}Pr_{0.03}Nd_{0.02}Sm_{0.01})_{0.70}Hf_{0.01}(Ni_{0.59}Co_{0.38}Sn_{0.01}Cu_{0.01}Si_{0.10})_{3.31}$ |
| Example 172 | $Mg_{0.29}(La_{0.33}Ce_{0.61}Pr_{0.02}Nd_{0.02}Sm_{0.01})_{0.70}Hf_{0.01}(Ni_{0.59}Co_{0.38}Sn_{0.01}Cu_{0.01}Si_{0.01})_{3.31}$ |
| Comparative Example 43 | $Mg_{0.29}(La_{0.23}Ce_{0.71}Pr_{0.03}Nd_{0.02}Sm_{0.01})_{0.70}Hf_{0.01}(Ni_{0.59}Co_{0.38}Sn_{0.01}Cu_{0.01}Si_{0.01})_{3.31}$ |
| Example 173 | $Mg_{0.32}(Y_{0.01}La_{0.65}Ce_{0.30}Pr_{0.02}Sm_{0.01}Er_{0.01})_{0.67}Zr_{0.01}(Ni_{0.79}Mn_{0.01}Fe_{0.01}Co_{0.18}Zn_{0.01})_{3.05}$ |
| Example 174 | $Mg_{0.23}(La_{0.88}Ce_{0.05}Pr_{0.02}Eu_{0.01}Dy_{0.01}Ho_{0.01}Yb_{0.01}Lu_{0.01})_{0.76}Ti_{0.01}(Ni_{0.84}Co_{0.10}Al_{0.05}Ga_{0.01})_{3.43}$ |
| Example 175 | $Mg_{0.28}(La_{0.82}Ce_{0.12}Pr_{0.03}Gd_{0.01}Tb_{0.01}Tm_{0.01})_{0.70}Ca_{0.01}Hf_{0.01}(Ni_{0.87}Co_{0.09}Al_{0.02}Cu_{0.01}B_{0.01})_{3.10}$ |
| Comparative Example 44 | $Mg_{0.60}(La_{0.33}Ce_{0.62}Pr_{0.02}Tb_{0.01}Dy_{0.01}Er_{0.01})_{0.39}Ti_{0.01}(Ni_{0.67}Mn_{0.01}Co_{0.30}Zn_{0.01}Si_{0.01})_{3.50}$ |
| Comparative Example 45 | $Mg_{0.05}(La_{0.52}Ce_{0.41}Pr_{0.04}Nd_{0.01}Sm_{0.01}Lu_{0.01})_{0.93}Ca_{0.01}Zr_{0.01}(Ni_{0.60}Co_{0.13}Al_{0.07}Sn_{0.10}B_{0.10})_{2.83}$ |
| Comparative Example 46 | $Mg_{0.25}(La_{0.54}Ce_{0.39}Pr_{0.03}Eu_{0.01}Tb_{0.01}Ho_{0.01}Tm_{0.01})_{0.73}Tu_{0.01}(Ni_{0.37}M_{0.53}Co_{0.10})_{3.30}$ (M; $Mn_{0.15}Fe_{0.12}Al_{0.05}Ga_{0.10}Cu_{.11}$) |
| Comparative Example 47 | $Mg_{0.31}(La_{0.55}Ce_{0.38}Pr_{0.03}Nd_{0.01}Gd_{0.01}Ho_{0.01}Yb_{0.01})_{0.29}Ca_{0.20}Zr_{0.10}Hf_{0.10}(Ni_{0.82}M_{0.07}Co_{0.11})_{3.32}$ (M; $Al_{0.05}Si_{0.01}B_{0.01}$) |

TABLE 23

| | Acceptable Ce content "m" (wt %) | Ce content (wt %) in the R3 of the alloy | Discharge capacity maintenance rate (%) at 50° C. |
|---|---|---|---|
| Example 164 | 30 | 5 | 87 |
| Example 165 | 30 | 10 | 88 |
| Example 166 | 30 | 27 | 86 |
| Comparative Example 41 | 30 | 35 | 45 |
| Example 167 | 51.25 | 7 | 88 |
| Example 168 | 51.25 | 21 | 85 |
| Example 169 | 51.25 | 45 | 83 |
| Comparative Example 42 | 51.25 | 55 | 39 |
| Example 170 | 67.5 | 18 | 83 |
| Example 171 | 67.5 | 40 | 84 |
| Example 172 | 67.5 | 81 | 80 |
| Comparative Example 43 | 67.5 | 71 | 47 |
| Example 173 | 42.5 | 30 | 85 |
| Example 174 | 32.5 | 5 | 86 |
| Example 175 | 31.3 | 12 | 83 |
| Comparative Example 44 | 57.5 | 62 | 43 |
| Comparative Example 45 | 36.25 | 41 | 32 |
| Comparative Example 46 | 32.5 | 39 | 38 |
| Comparative Example 47 | 33.75 | 38 | 46 |

As apparent from Tables 22 and 23, the secondary batteries of Examples 164 to 166 each comprising a negative electrode containing a hydrogen-absorbing alloy where Ce content in the R3 was less than the value (m % by weight) calculated from the formula (I) were capable of more effectively suppressing the deterioration of discharge capacity at a high temperature environment as compared with the secondary battery of Comparative Example 41 comprising a negative electrode containing a hydrogen-absorbing alloy where Ce content in the R3 was more than m % by weight.

Further, from the comparison in property between the second batteries of Examples 167 to 169 and the secondary battery of Comparative Example 42, as well as from the comparison in property between the second batteries of Examples 170 to 172 and the secondary battery of Comparative Example 43, it is apparent that when Co content is altered likewise, the similar tendency as illustrated above would be recognized. Moreover, as seen from Examples 173 to 175, even when the atomic ratio of each element or the kind of the element is changed, it is possible to suppress the deterioration of discharge capacity at high temperatures as far as the Ce content in the R3 is less than m % by weight.

The hydrogen-absorbing alloys included in the negative electrode of the secondary batteries according to Examples 164 to 175 were manufactured by means of a melt-quenching method. While the hydrogen-absorbing alloys included in the negative electrode of the secondary batteries according to previous Examples 151 to 163 were manufactured by means of a casting method, so that the cooling rate of the alloy was relatively slow as compared with that in Examples 164 to 175.

As apparent from Tables 20 to 23, the secondary batteries of Examples 164 to 175 exhibited respectively a discharge capacity which was comparable to the secondary batteries of Examples 151 to 163. The reason for enabling the secondary batteries according to Examples 164 to 175 to exhibit a high discharge capacity maintenance rate at a temperature of 50° C. even if the hydrogen-absorbing alloy was manufactured through a quench solidification such as a melt-quenching method using a roll may be attributed to the fact that since the Ce content in the R3 component was confined to the range defined by the aforementioned formula (I), it was possible to obtain a hydrogen-absorbing alloy which was minimal in plane defect even though the alloy was manufactured by means of a melt-quenching method.

Examples 176–195 and Comparative Examples 48–49

Each element was weighed so as to obtain the compositions shown in the following Table 24, and the resultant compositions were melted in an induction furnace filled with an argon gas atmosphere and then cast into a water-cooled copper mold, each melt cast in this manner being allowed to solidify to obtain various kinds of alloy ingot. Then, these ingots were subjected to a heat treatment in an argon atmosphere for 8 hours at a temperature of 900° C. Subsequently, the alloy ingots were pulverized to prepare hydrogen absorbing alloy powder having a particle diameter of 150 μm or less.

By the way, the misch metal (Lm) shown in Table 24 was composed of 90 wt. % of La, 2 wt. % of Ce, 5 wt. % of Pr and 3 wt. % of Nd; while the misch metal (Mm) was composed of 35 wt. % of La, 50.3 wt. % of Ce, 5.5 wt. % of Pr, 9 wt. % of Nd and 0.2 wt. % of Sm.

Comparative Examples 50 to 52

Each element was weighed so as to obtain the composition shown in the following Table 24, and the resultant compositions were melted in an induction furnace filled with an argon gas atmosphere, thereby preparing alloy ingots.

Then, each alloy ingots was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 900° C. for 8 hours in an argon atmosphere and then pulverized to prepare hydrogen absorbing alloy powder having a particle diameter of 150 μm or less.

The hydrogen-absorbing alloys obtained in Examples 176–195 and Comparative Examples 48–52 were measured with respect to the following properties (1) and (2).

(1) Each principal phase of the hydrogen-absorbing alloy was subjected to a component analysis using an EDX analyzer (Energy Dispersive X-ray Spectrometer) of transmission electron microscope and setting the diameter of the beam to 4 nm, the values of "a" and "z" in each resultant composition of the principal phase being shown in the following Table 25.

(2) In each hydrogen-absorbing alloy, the (100) plane of the principal phase having a composition represented by the aforementioned general formula (12) where the values of "a" and "z" therein are indicated in Table 25 was photographed (magnification: ×20,000) in ten visual fields, each visual field being dislocated from others, by using a transmission electron microscope. Then, the number of plane defect per 100 nm was counted in optional ten regions in each visual field, the resultants being shown in the following Table 24.

(3) A rechargeable hydrogen storage capacity (JIS H7003: Term for Hydrogen Absorbing Alloy), i.e. one of the hydrogen-absorption properties, was determined on each hydrogen-absorbing alloy powder by making use of the iso-thermal line of pressure-composition which was measured under a hydrogen pressure of less than 10 atm. at a temperature of 60° C. by means of Sieverts's method (JIS H7201), the results being shown in the following Table 25.

Figure 4:
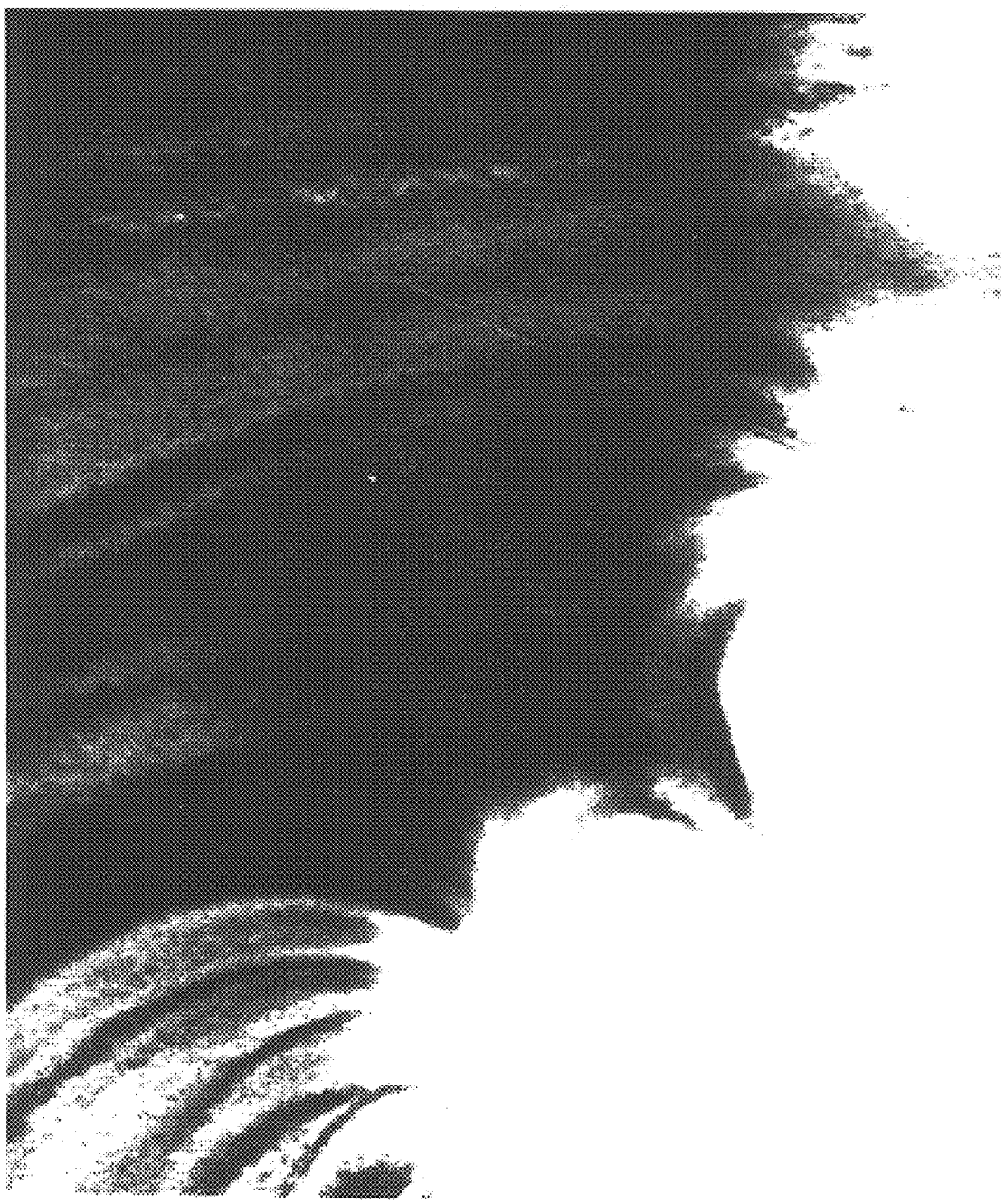
FIG. 4 is a microphotograph illustrating a transmission electron microscopic image of the principal phase of a hydrogen-absorbing alloy according one example of this invention.

Further, a magnified picture (20,000 times) of the (100) plane of crystal grain constituting the principal phase of the hydrogen-absorbing alloy according to Example 177 was taken by making use of a transmission electron microscope, the microscopic picture thus obtained is shown in FIG. 4.

Furthermore, various kinds of hydrogen absorbing alloy electrode (a negative electrode) were manufactured from the hydrogen-absorbing alloy powders obtained in Examples 176–195 and Comparative Examples 48–52 by making use of the following method. Namely, each hydrogen absorbing alloy powder was mixed with electrolytic copper powder at a ratio of 1:3 (weight ratio), and 1 g of the resultant mixture was pressed for 5 minutes with a pressure of 10 tons/cm$^2$, thus obtaining various kinds of pellet each having a diameter of 10 mm. These pellets were respectively sandwiched between Ni wire nets, and the peripheral portion thereof was spot-welded and pressed. Subsequently, to this pressed body was connected Ni lead wires by means of spot-welding thereby preparing the hydrogen absorbing alloy electrodes (a negative electrode).

Each of the negative electrodes thus obtained was dipped together with a counter electrode (sintered nickel electrode) into an aqueous solution of 8N-KOH (electrolyte) in a case thereby to perform a charge/discharge cycle test at a temperature of 20° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 100 mA per 1 g of the hydrogen-absorbing alloy until the battery voltage (with respect to a mercury oxide electrode) was decreased down to −0.7V. This charge/discharge cycle was repeated so as to measure the maximum discharge capacity and the cycle life (the number of cycle when the discharge capacity was lowered to 70% of the maximum discharge capacity). The results of this test are shown in the following Table 25.

TABLE 24

| | Compositions | Number of plane defect per 100 nm |
|---|---|---|
| Example 176 | $La_{0.75}Mg_{0.25}(Ni_{0.86}Cu_{0.08}Co_{0.05}Al_{0.01})_{3.5}$ | 0 to 3 |
| Example 177 | $La_{0.5}Pr_{0.22}Mg_{0.28}(Ni_{0.85}Cr_{0.05}Fe_{0.03}Si_{0.01})_{3.2}$ | 0 to 4 |
| Example 178 | $La_{0.48}Nd_{0.22}Mg_{0.3}(Ni_{0.85}Cu_{0.1}Mn_{0.03}V_{0.02})_{3.1}$ | 0 to 6 |
| Example 179 | $Lm_{0.67}Mg_{0.33}(Ni_{0.8}Cu_{0.1}Cr_{0.05}Al_{0.03}Nb_{0.02})_{3.02}$ | 0 to 10 |
| Example 180 | $Lm_{0.78}Mg_{0.22}(Ni_{0.84}Co_{0.1}Fe_{0.05}S_{0.01})_{3.65}$ | 0 to 3 |
| Example 181 | $La_{0.7}Ce_{0.1}Mg_{0.2}(Ni_{0.78}Mn_{0.05}Co_{0.15}Zn_{0.02})_{3.8}$ | 0 to 7 |
| Example 182 | $La_{0.7}Y_{0.05}Mg_{0.25}(Ni_{0.8}Co_{0.1}Cu_{0.08}Sn_{0.02})_{3.52}$ | 0 to 3 |
| Example 183 | $Lm_{0.66}Mg_{0.34}(Ni_{0.75}Co_{0.13}Mn_{0.1}Mo_{0.01}P_{0.01})_{3.21}$ | 1 to 20 |
| Example 184 | $Lm_{0.74}Mg_{0.26}(Ni_{0.85}Co_{0.13}W_{0.01}B_{0.01})_{3.45}$ | 0 to 5 |
| Example 185 | $Lm_{0.6}Mm_{0.16}Mg_{0.24}(Ni_{0.8}Co_{0.1}Mn_{0.05}Ga_{0.05})_{3.55}$ | 0 to 2 |
| Example 186 | $Lm_{0.5}Mm_{0.2}Mg_{0.3}(Ni_{0.75}Co_{0.14}Mn_{0.1}Ta_{0.01})_{3.33}$ | 0 to 8 |
| Example 187 | $Lm_{0.65}Mg_{0.3}Ca_{0.05}(Ni_{0.89}Co_{0.05}Cr_{0.05}S_{0.01})_{3.12}$ | 1 to 18 |
| Example 188 | $Lm_{0.73}Mg_{0.25}Zr_{0.02}(Ni_{0.8}Co_{0.1}Cu_{0.05}Cr_{0.05})_{3.53}$ | 0 to 3 |
| Example 189 | $Lm_{0.71}Mg_{0.28}Hf_{0.01}(Ni_{0.8}Cu_{0.1}Mn_{0.05}Al_{0.05})_{3.28}$ | 0 to 4 |

TABLE 24-continued

|  | Compositions | Number of plane defect per 100 nm |
|---|---|---|
| Example 190 | $Lm_{0.67}Mg_{0.25}Zr_{0.08}(Ni_{0.08}(Ni_{0.8}Cr_{0.14}Fe_{0.05}Mo_{0.01})_{3.53}$ | 0 to 2 |
| Example 191 | $Lm_{0.72}Mg_{0.24}Ti_{0.04}(Ni_{0.83}Co_{0.13}Si_{0.02}Nb_{0.02})_{3.6}$ | 0 to 5 |
| Example 192 | $Lm_{0.76}Mg_{0.23}Zr_{0.01}(Ni_{0.84}Co_{0.13}V_{0.02}P_{0.01})_{3.65}$ | 0 to 3 |
| Example 193 | $Lm_{0.6}Mm_{0.14}Mg_{0.24}Zr_{0.02}(Ni_{0.39}Cu_{0.1}B_{0.01})_{3.58}$ | 0 to 4 |
| Example 194 | $Lm_{0.6}Mm_{0.14}Mg_{0.25}Ti_{0.01}(Ni_{0.85}Cu_{0.1}Zn_{0.05})_{3.53}$ | 0 to 4 |
| Example 195 | $Lm_{0.7}Mg_{0.31}Zr_{0.01}(Ni_{0.87}Co_{0.10}Ga_{0.02}Ta_{0.01})_{3.13}$ | 0 to 7 |
| Comparative Example 48 | $La_{0.3}Mg_{0.7}Ni_{3.12}$ | 30 to 50 |
| Comparative Example 49 | $La_{0.5}Mg_{0.5}(Ni_{0.8}Cu_{0.15}Zn_{0.05})_{2.12}$ | 30 to 85 |
| Comparative Example 50 | $La_{0.7}Y_{0.3}(Ni_{0.76}Cu_{0.2}Al_{0.04})_{3.5}$ | 25 to 65 |
| Comparative Example 51 | $Mm_{0.68}Mg_{0.32}(Ni_{0.74}Co_{0.1}Mn_{0.1}Al_{0.05}Fe_{0.01})_{3.05}$ | 40 to 70 |
| Comparative Example 52 | $Mm_{0.72}Mg_{0.28}(Ni_{0.77}Co_{0.01}Mn_{0.1}Al_{0.03})_{3.6}$ | 30 to 60 |

TABLE 25

|  | Rechargeable hydrogen storage capacity (H/M) | Discharge capacity (mAh/g) | Cycle life | "a" in the principal phase | "Z" in the principal phase |
|---|---|---|---|---|---|
| Example 176 | 1.05 | 400 | 380 | 0.25 | 3.51 |
| Example 177 | 0.98 | 380 | 350 | 0.29 | 3.21 |
| Example 178 | 0.97 | 365 | 250 | 0.31 | 3.19 |
| Example 179 | 0.93 | 350 | 210 | 0.32 | 3.13 |
| Example 180 | 0.99 | 385 | 370 | 0.24 | 3.52 |
| Example 181 | 0.95 | 350 | 290 | 0.21 | 3.71 |
| Example 182 | 0.98 | 370 | 355 | 0.24 | 3.53 |
| Example 183 | 0.90 | 345 | 200 | 0.28 | 3.25 |
| Example 184 | 0.94 | 365 | 365 | 0.26 | 3.42 |
| Example 185 | 1.02 | 385 | 335 | 0.24 | 3.55 |
| Example 186 | 0.93 | 355 | 280 | 0.27 | 3.26 |
| Example 187 | 0.95 | 365 | 220 | 0.29 | 3.25 |
| Example 188 | 0.94 | 375 | 360 | 0.25 | 3.50 |
| Example 189 | 1.03 | 380 | 330 | 0.29 | 3.19 |
| Example 190 | 0.96 | 365 | 340 | 0.26 | 3.46 |
| Example 191 | 0.95 | 360 | 320 | 0.23 | 3.55 |
| Example 192 | 0.98 | 370 | 350 | 0.22 | 3.65 |
| Example 193 | 0.96 | 355 | 330 | 0.25 | 3.52 |
| Example 194 | 0.95 | 365 | 340 | 0.24 | 3.51 |
| Example 195 | 0.91 | 350 | 285 | 0.29 | 3.21 |
| Comparative Example 48 | 0.14 | 50 | 220 | 0.55 | 3.01 |
| Comparative Example 49 | 0.56 | 240 | 20 | 0.45 | 2.01 |
| Comparative Example 50 | 0.45 | 200 | 40 | — | — |
| Comparative Example 51 | 0.42 | 150 | 290 | 0.37 | 3.6 |
| Comparative Example 52 | 0.40 | 140 | 270 | 0.35 | 3.9 |

As apparent from Tables 24 and 25, the hydrogen-absorbing alloys of Examples 176 to 195 comprising, as a principal phase, a crystal phase represented by the aforementioned general formula (12) where the values of "a" and "z" therein meet the formula (II), a plane defect in the principal phase being not more than 20 in number per 100 nm, were found more excellent in rechargeable hydrogen storage capacity (H/M) as compared with the hydrogen-absorbing alloys of Comparative Examples 48 to 52. Furthermore, the secondary batteries of Examples 176 to 195 which comprised a negative electrode containing a hydrogen-absorbing alloy where a crystal phase having such a specific composition was contained as a principal phase, and the plane defect in the principal phase thereof was limited within the aforementioned range were found more excellent in both discharge capacity and cycle life as compared with the secondary batteries of Comparative Examples 48 to 52.

Examples 196–215 and Comparative Examples 53–54

Each element was weighed so as to obtain the compositions shown in the following Table 26, and the resultant compositions were melted in an induction furnace filled with an argon gas atmosphere and then cast into a water-cooled copper mold, each melt cast in this manner being allowed to solidify to obtain various kinds of alloy ingot. Then, these ingots were subjected to a heat treatment in an argon atmosphere for 12 hours at a temperature of 890° C.

Subsequently, the alloy ingots were pulverized to prepare hydrogen absorbing alloy powder having a particle diameter of 125 μm or less.

By the way, the misch metal (Lm) shown in Table 26 was composed of 94 wt. % of La, 2 wt. % of Ce, 2 wt. % of Pr and 2 wt. % of Nd; while the misch metal (Mm) was composed of 35 wt. % of La, 50.3 wt. % of Ce, 5.5 wt. % of Pr, 9 wt. % of Nd and 0.2 wt. % of Sm.

Comparative Examples 55 to 57

Each element was weighed so as to obtain the composition shown in the following Table 26, and the resultant compositions were melted in an induction furnace filled with an argon gas atmosphere, thereby preparing alloy ingots.

Then, each alloy ingots was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 125 μm or less.

The hydrogen-absorbing alloys obtained in Examples 196–215 and Comparative Examples 53–57 were measured with respect to the following properties (1) to (3).

(1) Each principal phase of the hydrogen-absorbing alloy was subjected to a component analysis using an EDX analyzer (Energy Dispersive X-ray Spectrometer) of transmission electron microscope and setting the diameter of the beam to 4 nm, the values of "a" and "z" in each resultant composition of the principal phase being shown in the following Table 26.

(2) Each of the hydrogen-absorbing alloy was photographed (magnification: ×30,000) at different ten crystal grains through a transmission electron microscope. Then, the number of plane defect per 100 nm was counted in optional ten regions in each crystal grain, and an average number of plane defect per 100 nm determined from the ten crystal grains was calculated. Further, the area ratio of crystal grains where the average number of plane defect was 20 or less per 100 nm was calculated, the results were shown in the following Table 27.

(3) A rechargeable hydrogen storage capacity (JIS H7003: Term for Hydrogen Absorbing Alloy), i.e. one of the hydrogen-absorption properties, was determined on each hydrogen-absorbing alloy powder by making use of the iso-thermal line of pressure-composition which was measured under a hydrogen pressure of less than 10 atm. at a temperature of 60° C. by means of Sieverts's method (JIS H7201), the result being shown in the following Table 27.

Furthermore, various kinds of hydrogen absorbing alloy electrode (a negative electrode) were manufactured from the hydrogen-absorbing alloy powders obtained in Examples 196–215 and Comparative Examples 53–57 by following the same procedures as explained with reference to Examples 176–195.

Each of the negative electrodes thus obtained was dipped together with a counter electrode (sintered nickel electrode) into an aqueous solution of 8N-KOH (electrolyte) in a case thereby to perform a charge/discharge cycle test at a temperature of 20° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 150 mA per 1 g of the hydrogen-absorbing alloy until the battery voltage (with respect to a mercury oxide electrode) was decreased down to −0.7V. This charge/discharge cycle was repeated so as to measure the maximum discharge capacity and the cycle life (the number of cycle when the discharge capacity was lowered to 70% of the maximum discharge capacity). The results of this test are shown in the following Table 27.

TABLE 26

| | Composition |
|---|---|
| Example 196 | $La_{0.74}Mh_{0.26}(Ni_{0.86}Cu_{0.08}Cr_{0.05}Al_{0.01})_{3.4}$ |
| Example 197 | $La_{0.5}Pr_{0.22}Mg_{0.28}(Ni_{0.85}Co_{0.05}Fe_{0.03}Si_{0.01})3.25$ |
| Example 198 | $La_{0.58}Nd_{0.12}Mg_{0.3}(Ni_{0.85}Cu_{0.1}Mn_{0.03}Nb_{0.02})_{3.1}$ |
| Example 199 | $Lm_{0.67}Mg_{0.33}(Ni_{0.8}Co_{0.1}Cr_{0.05}Al_{0.03}V_{0.02})_{3.02}$ |
| Example 200 | $Lm_{0.77}Mg_{0.23}(Ni_{0.84}Cr_{0.1}Fe_{0.05}S_{0.01})_{3.6}$ |
| Example 201 | $La_{0.7}Ce_{0.1}Mg_{0.2}(Ni_{0.78}Mn_{0.05}Co_{0.09}Cu_{0.06}Zn_{0.2})_{3.78}$ |
| Example 202 | $La_{0.7}Y_{0.05}Mg_{0.25}(Ni_{0.8}Co_{0.1}Cu_{0.08}Mo_{0.01}P_{0.01})_{3.52}$ |
| Example 203 | $Lm_{0.66}Mg_{0.34}(Ni_{0.75}Co_{0.13}Mn_{0.1}Sn_{0.02})_{3.21}$ |
| Example 204 | $Lm_{0.74}Mg_{0.26}(Ni_{0.8}Co_{0.1}Mn_{0.05}Ga_{0.05})_{3.4}$ |
| Example 205 | $Lm_{0.6}Mm_{0.16}Mg_{0.24}(Ni_{0.85}Co_{0.13}W_{0.01}B_{0.01})_{3.6}$ |
| Example 206 | $Lm_{0.56}Mm_{0.14}Mg_{0.3}(Ni_{0.75}Co_{0.14}Mn_{0.1}Ta_{0.01})_{3.13}$ |
| Example 207 | $Lm_{0.67}Mg_{0.30}Ca_{0.03}(Ni_{0.89}Co_{0.05}Cu_{0.05}S_{0.01})_{3.25}$ |
| Example 208 | $Lm_{0.73}Mg_{0.25}Hf_{0.02}(Ni_{0.8}Co_{0.1}Cu_{0.05}Al_{0.05})_{3.53}$ |
| Example 209 | $Lm_{0.71}Mg_{0.28}Zr_{0.01}(Ni_{0.8}Cu_{0.1}Mn_{0.05}Cr_{0.05})_{3.28}$ |
| Example 210 | $Lm_{0.7}Mg_{0.25}Zr_{0.05}(Ni_{0.8}Co_{0.1}Cr_{0.04}Fe_{0.05}Mo_{0.01})_{3.53}$ |
| Example 211 | $Lm_{0.72}Mg_{0.24}Ti_{0.04}(Ni_{0.84}Co_{0.13}V_{0.02}P_{0.01})_{3.6}$ |
| Example 212 | $Lm_{0.72}Mg_{0.27}Zr_{0.01}(Ni_{0.83}Co_{0.13}Si_{0.02}Nb_{0.02})_{3.4}$ |
| Example 213 | $Lm_{0.6}Mm_{0.14}Mg_{0.24}Zr_{0.02}(Ni_{0.89}Cu_{0.1}B_{0.01})_{3.62}$ |
| Example 214 | $Lm_{0.6}Mm_{0.14}Mg_{0.25}Ti_{0.1}(Ni_{0.87}Co_{0.1}Ga_{0.02}Ta_{0.01})_{3.53}$ |
| Example 215 | $Lm_{0.68}Mg_{0.31}Zr_{0.01}(Ni_{0.85}Cu_{0.1}Zn_{0.05})_{3.13}$ |
| Comparative Example 53 | $La_{0.5}Mg_{0.5}Ni_{3.12}$ |
| Comparative Example 54 | $La_{0.7}Er_{0.3}(Ni_{0.8}Co_{0.15}Al_{0.05})_{3.13}$ |
| Comparative Example 55 | $La_{0.4}Mg_{0.6}(Ni_{0.8}Cu_{0.15}Mn_{0.05})_{2.35}$ |
| Comparative Example 56 | $Mm_{0.67}Mg_{0.33}(Ni_{0.74}Co_{0.1}Mn_{0.1}Al_{0.06})_{3.03}$ |
| Comparative Example 57 | $Mm_{0.73}Mg_{0.27}(Ni_{0.73}Co_{0.1}Mn_{0.1}Al_{0.06}Fe_{0.01})3.55$ |

| | "a" in the principal phase | "Z" in the principal phase |
|---|---|---|
| Example 196 | 0.26 | 3.43 |
| Example 197 | 0.28 | 3.28 |
| Example 198 | 0.31 | 3.10 |
| Example 199 | 0.32 | 3.06 |
| Example 200 | 0.24 | 3.55 |
| Example 201 | 0.21 | 3.75 |
| Example 202 | 0.25 | 3.50 |
| Example 203 | 0.29 | 3.25 |
| Example 204 | 0.26 | 3.55 |
| Example 205 | 0.25 | 3.51 |
| Example 206 | 0.30 | 3.12 |
| Example 207 | 0.29 | 3.18 |
| Example 208 | 0.25 | 3.51 |
| Example 209 | 0.28 | 3.30 |
| Example 210 | 0.25 | 3.48 |
| Example 211 | 0.24 | 3.53 |
| Example 212 | 0.26 | 3.47 |
| Example 213 | 0.23 | 3.60 |
| Example 214 | 0.25 | 3.51 |
| Example 215 | 0.30 | 3.18 |
| Comparative Example 53 | 0.58 | 3.10 |
| Comparative Example 54 | — | — |
| Comparative Example 55 | 0.46 | 2.02 |
| Comparative Example 56 | 0.39 | 3.60 |
| Comparative Example 57 | 0.37 | 3.90 |

TABLE 27

|  | Number of plane defect (f) (number/100 nm) | Rate of crystal grain meeting f ≦ 20 (vol %) | Rechargeable hydrogen storage capacity (H/M) | Discharge capacity (mAh/g) | Cycle life |
|---|---|---|---|---|---|
| Example 196 | 0 to 3 | 97 | 1.03 | 390 | 360 |
| Example 197 | 0 to 4 | 95 | 1.00 | 380 | 340 |
| Example 198 | 0 to 6 | 90 | 0.98 | 380 | 280 |
| Example 199 | 0 to 20 | 83 | 0.98 | 360 | 220 |
| Example 200 | 0 to 3 | 95 | 1.00 | 370 | 350 |
| Example 201 | 0 to 7 | 90 | 0.95 | 350 | 285 |
| Example 202 | 0 to 3 | 96 | 1.00 | 375 | 345 |
| Example 203 | 1 to 19 | 82 | 0.95 | 365 | 220 |
| Example 204 | 0 to 3 | 96 | 0.98 | 370 | 350 |
| Example 205 | 0 to 4 | 94 | 0.92 | 355 | 330 |
| Example 206 | 0 to 8 | 88 | 0.91 | 350 | 280 |
| Example 207 | 0 to 6 | 90 | 0.94 | 360 | 285 |
| Example 208 | 0 to 2 | 95 | 0.96 | 365 | 350 |
| Example 209 | 0 to 4 | 92 | 0.99 | 370 | 335 |
| Example 210 | 0 to 3 | 94 | 0.95 | 365 | 340 |
| Example 211 | 0 to 5 | 91 | 0.93 | 355 | 320 |
| Example 212 | 0 to 4 | 93 | 0.96 | 365 | 330 |
| Example 213 | 0 to 3 | 94 | 0.98 | 370 | 345 |
| Example 214 | 0 to 4 | 93 | 1.00 | 370 | 335 |
| Example 215 | 0 to 7 | 85 | 0.97 | 360 | 285 |
| Comparative Example 53 | 30 to 60 | 40 | 0.25 | 100 | 180 |
| Comparative Example 54 | 25 to 70 | 30 | 0.48 | 220 | 35 |
| Comparative Example 55 | 30 to 85 | 50 | 0.61 | 260 | 20 |
| Comparative Example 56 | 25 to 70 | 35 | 0.41 | 140 | 240 |
| Comparative Example 57 | 30 to 60 | 40 | 0.42 | 150 | 250 |

As apparent from Tables 26 and 27, the hydrogen-absorbing alloys of Examples 196 to 215 comprising, as a principal phase, a crystal phase represented by the aforementioned general formula (13) where the values of "a" and "z" therein meet the formula (II), and having more than 70% by volume of the crystal phase where the plane defect in crystal grain is not more than 20 in number per 100 nm were found more excellent in rechargeable hydrogen storage capacity (H/M) as compared with the hydrogen-absorbing alloys of Comparative Examples 53 to 57. Furthermore, the secondary batteries of Examples 196 to 215 which comprised a negative electrode containing a hydrogen-absorbing alloy where a crystal phase having such a specific composition was contained as a principal phase and the ratio of crystal phase where the plane defect in the crystal grain thereof was within the aforementioned range were found more excellent in both discharge capacity and cycle life as compared with the secondary batteries of Comparative Examples 53 to 57.

Examples 216–235 and Comparative Examples 58–59

Each element was weighed so as to obtain the compositions shown in the following Table 28, and the resultant compositions were melted in an induction furnace filled with an argon gas atmosphere and then cast into a water-cooled copper mold, each melt cast in this manner being allowed to solidify to obtain various kinds of alloy ingot. Then, these ingots were subjected to a heat treatment in an argon atmosphere for 12 hours at a temperature of 890° C. Subsequently, the alloy ingots were pulverized to prepare hydrogen absorbing alloy powder having a particle diameter of 100 μm or less.

By the way, the misch metal (Lm) shown in Table 28 was composed of 85 wt. % of La, 3 wt. % of Ce, 10 wt. % of Pr and 2 wt. % of Nd; while the misch metal (Mm) was composed of 38 wt. % of La, 50.3 wt. % of Ce, 5.5 wt. % of Pr, 6 wt. % of Nd and 0.2 wt. % of Sm.

Comparative Examples 60 to 63

Each element was weighed so as to obtain the composition shown in the following Table 28, and the resultant compositions were melted in an induction furnace filled with an argon gas atmosphere, thereby preparing alloy ingots.

Then, each alloy ingots was melted and the resultant melt was dropped in an argon gas atmosphere on the surface of a copper roll rotating at a peripheral velocity of 5 m/sec to quench the melt, thereby obtaining a thin hydrogen-absorbing alloy flake. Subsequently, the thin alloy flake was heat-treated at a temperature of 890° C. for 12 hours in an argon atmosphere and then pulverized to prepare hydrogen absorbing alloy powder having a particle diameter of 100 μm or less.

The hydrogen-absorbing alloys obtained in Examples 216–235 and Comparative Examples 58–63 were measured with respect to the following properties (1) and (2).

(1) The analysis of each hydrogen-absorbing alloy was performed by taking the pictures of the secondary electronic image and the back scattered electronic image thereof by making use of a scanning electron microscope (SEM), and then by performing the component analysis of each phase by making use of an EDX analyzer (Energy Dispersive X-ray Spectrometer) of scanning electron microscope, thus determining the values of "a" and "z" in composition of the principal phase, the area ratios of a crystal phase having a CaCu$_5$ type crystal structure, and of a crystal phase having a MgCu$_2$ type crystal structure. The results thus measured are shown in the following Table 29.

(2) A rechargeable hydrogen storage capacity (JIS H7003: Term for Hydrogen Absorbing Alloy), i.e. one of the hydrogen-absorption properties, was determined on each hydrogen-absorbing alloy powder by making use of the isothermal line of pressure-composition which was measured under a hydrogen pressure of less than 10 atm. at a temperature of 60° C. by means of Sieverts's method (JIS H7201), the results being shown in the following Table 30.

Furthermore, various kinds of hydrogen absorbing alloy electrode (a negative electrode) were manufactured from the hydrogen-absorbing alloy powders obtained in Examples 216–235 and Comparative Examples 58–63 by following the same procedures as explained with reference to Examples 176–195.

Each of the negative electrodes thus obtained was dipped together with a counter electrode (sintered nickel electrode) into an aqueous solution of 8N-KOH (electrolyte) in a case thereby to perform a charge/discharge cycle test at a temperature of 20° C. The charge/discharge conditions in this test were as follows. Namely, the secondary battery was subjected at first to a charging for 5 hours with a current of 100 mA per 1 g of the hydrogen-absorbing alloy, and, after 10 minute cessation, discharged with a current of 200 mA per 1 g of the hydrogen-absorbing alloy until the battery voltage (with respect to a mercury oxide electrode) was decreased down to −0.7V. This charge/discharge cycle was repeated so as to measure the maximum discharge capacity and the cycle life (the number of cycle when the discharge capacity was lowered to 70% of the maximum discharge capacity). The results of this test are shown in the following Table 30.

TABLE 28

| | Compositions |
|---|---|
| Example 216 | $La_{0.75}Mg_{0.25}(Ni_{0.86}Cu_{0.08}Co_{0.05}Cr_{0.01})_{3.52}$ |
| Example 217 | $La_{0.60}Pr_{0.12}Mg_{0.28}(Ni_{0.85}Cr_{0.05}Fe_{0.03}Si_{0.01})_{3.22}$ |
| Example 218 | $La_{0.58}Nd_{0.12}Mg_{0.3}(Ni_{0.85}Cu_{0.1}Mn_{0.03}V_{0.20})_{3.08}$ |
| Example 219 | $Lm_{0.68}Mg_{0.32}(Ni_{0.8}Cu_{0.1}Cr_{0.06}Al_{0.02}Nb_{0.02})_{3.05}$ |
| Example 220 | $Lm_{0.76}Mg_{0.24}(Ni_{0.84}Co_{0.10}Fe_{0.05}S_{0.01})_{3.55}$ |
| Example 221 | $La_{0.7}Ce_{0.1}Mg_{0.2}(Ni_{0.78}Cr_{0.05}Co_{0.15}Zn_{0.02})_{3.8}$ |
| Example 222 | $Lm_{0.7}Y_{0.05}Mg_{0.25}(Ni_{0.8}Co_{0.1}Cu_{0.08}Sn_{0.20})_{3.5}$ |
| Example 223 | $Lm_{0.66}Mg_{0.34}(Ni_{0.85}Co_{0.13}W_{0.01}B_{0.01})_{3.21}$ |
| Example 224 | $Lm_{0.73}Mg_{0.27}(Ni_{0.75}Co_{0.13}Mn_{0.1}Mo_{0.01}P_{0.01})_{3.4}$ |
| Example 225 | $Lm_{0.7}Mm_{0.06}Mg_{0.24}(Ni_{0.8}Co_{0.1}Mn_{0.05}Ga_{0.05})_{3.6}$ |
| Example 226 | $Lm_{0.6}Mm_{0.16}Mg_{0.3}(Ni_{0.75}Co_{0.14}Mn_{0.1}Ta_{0.01})_{3.4}$ |
| Example 227 | $Lm_{0.66}Mg_{0.3}Ca_{0.04}(Ni_{0.89}Co_{0.05}Cr_{0.04}Si_{0.02})_{3.12}$ |
| Example 228 | $Lm_{0.72}Mg_{0.25}Zr_{0.03}(Ni_{0.8}Co_{0.1}Cu_{0.05}Cr_{0.05})_{3.5}$ |
| Example 229 | $Lm_{0.7}Mg_{0.28}Hf_{0.02}(Ni_{0.8}Cu_{0.15}Mn_{0.05}Al_{0.20})_{3.32}$ |
| Example 230 | $Lm_{0.67}Mg_{0.25}Zr_{0.08}(Ni_{0.84}Co_{0.13}V_{0.02}P_{0.01})_{3.53}$ |
| Example 231 | $Lm_{0.74}Mg_{0.24}Ti_{0.02}(Ni_{0.83}Co_{0.14}S_{0.01}Nb_{0.02})_{3.6}$ |
| Example 232 | $Lm_{0.76}Mg_{0.23}Zr_{0.01}(Ni_{0.8}Cr_{0.14}Fe_{0.05}Mo_{0.01})_{3.65}$ |
| Example 233 | $Lm_{0.06}Mm_{0.14}Mg_{0.24}Zr_{0.02}(Ni_{0.89}Cu_{0.06}Cr_{0.04}B_{0.01})_{3.58}$ |
| Example 234 | $Lm_{0.6}Mm_{0.14}Mg_{0.25}Ti_{0.01}(Ni_{0.8}Co_{0.1}Cr_{0.06}Zn_{0.04})_{3.53}$ |
| Example 235 | $Lm_{0.68}Mg_{0.31}Zr_{0.01}(Ni_{0.87}Cu_{0.1}Ga_{0.02}Ta_{0.10})_{3.33}$ |
| Comparative Example 58 | $La_{0.4}Mg_{0.6}Ni_{3.5}$ |
| Comparative Example 59 | $La_{0.7}Dy_{0.3}(Ni_{0.74}Co_{0.25}Mn_{0.01})_{3.2}$ |
| Comparative Example 60 | $Lm_{0.5}Mg_{0.5}(Ni_{0.8}Cu_{0.1}Co_{0.15})_{2.12}$ |
| Comparative Example 61 | $Mm_{0.67}Mg_{0.33}(Ni_{0.74}Co_{0.1}Mn_{0.1}Al_{0.04}Fe_{0.02})_{3.23}$ |
| Comparative Example 62 | $Mm_{0.72}Mg_{0.28}(Ni_{0.74}Co_{0.01}Mn_{0.1}Al_{0.06})_{3.55}$ |
| Comparative Example 63 | $Lm_{0.6}(Mg_{0.4}Ti_{0.1})(Ni_{0.85}Fe_{0.1}Al_{0.05})_3$ |

TABLE 29

| | "a" in the principal phase | "Z" in the principal phase | Ratio of $CaCu_5$ type phase (vol %) | Ratio of $MgCu_2$ type phase (vol %) |
|---|---|---|---|---|
| Example 216 | 0.25 | 3.50 | 3 | 1 |
| Example 217 | 0.28 | 3.30 | 4 | 2 |
| Example 218 | 0.30 | 3.21 | 3 | 4 |
| Example 219 | 0.26 | 3.55 | 2 | 5 |
| Example 220 | 0.25 | 3.51 | 4 | 1 |
| Example 221 | 0.21 | 3.75 | 8 | 0 |
| Example 222 | 0.24 | 3.55 | 2 | 0.5 |
| Example 223 | 0.28 | 3.27 | 3 | 5 |
| Example 224 | 0.27 | 3.31 | 4 | 1 |
| Example 225 | 0.24 | 3.57 | 6 | 0.5 |
| Example 226 | 0.29 | 3.25 | 5 | 3 |
| Example 227 | 0.30 | 3.13 | 2 | 4 |
| Example 228 | 0.24 | 3.60 | 3 | 1 |
| Example 229 | 0.28 | 3.26 | 3 | 2 |
| Example 230 | 0.24 | 3.53 | 2 | 3 |
| Example 231 | 0.23 | 3.62 | 3 | 2 |
| Example 232 | 0.23 | 3.64 | 5 | 0.5 |
| Example 233 | 0.25 | 3.52 | 4 | 0.5 |
| Example 234 | 0.26 | 3.48 | 3 | 0.5 |
| Example 235 | 0.28 | 3.29 | 3 | 4 |
| Comparative Example 58 | 0.42 | 3.51 | 25 | 25 |
| Comparative Example 59 | — | — | 5 | 3 |
| Comparative Example 60 | 0.51 | 2.01 | 3 | 65 |
| Comparative Example 61 | 0.39 | 3.52 | 25 | 30 |
| Comparative Example 62 | 0.35 | 3.72 | 35 | 10 |
| Comparative Example 63 | 0.33 | 3.25 | 15 | 18 |

TABLE 30

| | Rechargeable hydrogen storage capacity (H/M) | Discharge capacity (mAh/g) | Cycle life |
|---|---|---|---|
| Example 216 | 1.02 | 385 | 350 |
| Example 217 | 1.01 | 380 | 330 |
| Example 218 | 0.98 | 360 | 300 |
| Example 219 | 0.95 | 355 | 280 |
| Example 220 | 1.00 | 370 | 320 |
| Example 221 | 0.90 | 345 | 250 |
| Example 222 | 0.96 | 365 | 340 |
| Example 223 | 0.92 | 350 | 290 |
| Example 224 | 0.95 | 360 | 330 |
| Example 225 | 0.97 | 365 | 335 |
| Example 226 | 0.96 | 360 | 340 |
| Example 227 | 0.98 | 365 | 310 |
| Example 228 | 1.00 | 370 | 330 |
| Example 229 | 1.02 | 375 | 320 |
| Example 230 | 1.00 | 370 | 310 |
| Example 231 | 0.98 | 365 | 320 |
| Example 232 | 0.96 | 360 | 315 |
| Example 233 | 0.97 | 365 | 320 |
| Example 234 | 0.99 | 370 | 330 |
| Example 235 | 0.95 | 355 | 300 |
| Comparative Example 58 | 0.12 | 40 | 250 |
| Comparative Example 59 | 0.5 | 240 | 25 |
| Comparative Example 60 | 0.69 | 280 | 15 |
| Comparative Example 61 | 0.41 | 160 | 200 |
| Conparative Example 62 | 0.39 | 130 | 220 |
| Comparative Example 63 | 0.52 | 220 | 180 |

As apparent from Tables 28 and 30, the hydrogen-absorbing alloys of Examples 216 to 235 comprising, as a principal phase, a crystal phase represented by the aforementioned general formula (14) where the values of "a" and "z" therein meet the formula (II), and further comprising not more than 20% by volume of a crystal phase having a $CaCu_5$ type crystal structure and not more than 10% by volume of a crystal phase having a $MgCu_2$ type crystal were found more excellent in rechargeable hydrogen storage capacity (H/M) as compared with the hydrogen-absorbing alloys of Comparative Examples 58 to 63. Furthermore, the secondary batteries of Examples 216 to 235 which comprised a negative electrode containing a hydrogen-absorbing alloy having such specific crystal phases in such a specific ratio were found more excellent in both discharge capacity and cycle life as compared with the secondary batteries of Comparative Examples 58 to 63.

As explained above, it is possible according to this invention to provide a hydrogen-absorbing alloy which is capable of further improving the hydrogen desorption property as compared with the conventional Mg-based hydrogen-absorbing alloy, while ensuring a high hydrogen absorption capacity. Therefore, it is possible according to the hydrogen-absorbing alloy of this invention to further expand the field of application to which other kinds of hydrogen-absorbing alloys have been applied. For example, the hydrogen-absorbing alloys according to this invention can be applied to the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, a temperature sensor, etc. Furthermore, it is also possible according to the hydrogen-absorbing alloy of this invention to further develop a new field of application utilizing a hydrogen-absorbing alloy.

Additionally, it possible according to the secondary battery of this invention to realize a high capacity and a long charge/discharge cycle life, thus exhibiting prominent effects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen-absorbing alloy made of either an alloy ingot which has been prepared by means of a casting or sintering method, or a pulverized product of said alloy ingot, and said alloy ingot being represented by the following general formula (1);

$$(M_{1-a-b}R1_aM1_b)Ni_z \qquad (1)$$

wherein R1 is at least one element selected from rare earth elements (including Y); M1 is at least one element selected from elements having a larger electronegativity than that of Mg (excluding the elements of R1, Cr, Mn, Fe, Co, Cu, Zn and Ni); and a, b and z are respectively a number satisfying conditions: $0.1 \leq a \leq 0.8$, $0 < b \leq 0.9$, $1-a-b>0$, and $3 \leq z \leq 3.8$.

2. The hydrogen-absorbing alloy according to claim 1, wherein said M1 is at least one kind of element selected from the group consisting of Al, Ta, V, Nb, Ga, In, Ge, Pb, Mo, Sn, Si, Re, Ag, B, C, P, Ir, Rh, Ru, Os, Pt, Au, Se and S.

3. A hydrogen-absorbing alloy made of either an alloy ingot which has been prepared by means of a casting or sintering method, or a pulverized product of said alloy ingot, and said alloy ingot being represented by the following general formula (2);

$$Mg_{1-a}R1_a(Ni_{1-x}M2_x)_z \qquad (2)$$

wherein R1 is at least one element selected from rare earth elements (including Y); M2 is at least one element selected from the group consisting of Cr, Mn, Fe, Co, Cu and Zn; and a, x and z are respectively a number satisfying conditions: $0.1 \leq a \leq 0.8$, $0 < x \leq 0.9$, and $3 \leq z \leq 3.8$.

4. A hydrogen-absorbing alloy made of either an alloy ingot which has been prepared by means of a casting or sintering method, or a pulverized product of said alloy ingot, and said alloy ingot being represented by the following general formula (3);

$$M_{1-a-b}R1_aM1_b(Ni_{1-x}M2_x)_z \qquad (3)$$

wherein R1 is at least one element selected from rare earth elements (including Y); M2 is at least one element selected from the group consisting of Cr, Mn, Fe, Co, Cu and Zn; M1 is at least one element selected from elements having a larger electronegativity than that of Mg (excluding the elements of R1, the elements of M1 and Ni); and a, b, x and z are respectively a number satisfying conditions: $0.1 \leq a \leq 0.8$, $0 < b \leq 0.9$, $1-a-b>0$, $0 < x \leq 0.9$ and $3 \leq z \leq 3.8$.

5. The hydrogen-absorbing alloy according to claim 4, wherein said M1 is at least one kind of element selected from the group consisting of Al, Ta, V, Nb, Ga, In, Ge, Pb, Mo, Sn, Si, Re, Ag, B, C, P, Ir, Rh, Ru, Os, Pt, Au, Se and S.

6. A hydrogen-absorbing alloy made of either an alloy ingot which has been prepared by means of a casting or sintering method, or a pulverized product of said alloy ingot, and said alloy ingot being represented by the following general formula (4);

$$Mg_{1-a}R1_a(Ni_{1-x}M3_x)_z \qquad (4)$$

wherein R1 is at least one element selected from rare earth elements (including Y); M3 is at least one element selected from the group consisting of Co, Mn, Fe, Al, Ga, Zn, Sn, Cu, Si and B; and a, x and z are respectively a number satisfying conditions: $0.65 \leq a \leq 0.8$, $0 < x \leq 0.6$, and $3 \leq z \leq 3.8$.

7. A hydrogen-absorbing alloy made of either an alloy ingot which has been prepared by means of a casting or sintering method, or a pulverized product of said alloy ingot, and said alloy ingot being represented by the following general formula (5);

$$Mg_{1-a-b}R1_aT1_b(Ni_{1-x}M3_x)_z \qquad (5)$$

wherein R1 is at least one element selected from rare earth elements (including Y); T1 is at least one element selected from the group consisting of Ca, Ti, Zr and Hf; M3 is at least one element selected from the group consisting of Co, Mn, Fe, Al, Ga, Zn, Sn, Cu, Si and B; and a, b, x and z are respectively a number satisfying conditions: $0.65 \leq a < 0.8$, $0 < b \leq 0.3$, $0.65 < (a+b) \leq 0.8$, $0 < x \leq 0.6$, and $3 \leq z \leq 3.8$.

8. A hydrogen-absorbing alloy made of either an alloy ingot which has been prepared by means of a casting or sintering method, or a pulverized product of said alloy ingot, and said alloy ingot being represented by the following general formula (6);

$$Mg_aR1_{1-a}(Ni_{1-x-y}Co_xM4_y)_z \qquad (6)$$

wherein R1 is at least one element selected from rare earth elements (including Y); M4 is at least one element selected from the group consisting of Mn, Fe, V, Cr, Nb, Al, Ga, Zn, Sn, Cu, Si, P and B; and a, x, y and z are respectively a number satisfying conditions: $0.2 \leq a \leq 0.35$, $0 < x \leq 0.5$, $0 \leq y \leq 0.2$, and $3 \leq z \leq 3.8$.

9. A hydrogen-absorbing alloy made of either an alloy ingot which has been prepared by means of a casting or sintering method, or a pulverized product of said alloy ingot, and said alloy ingot being represented by the following general formula (7);

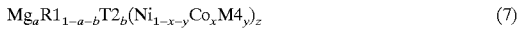

$$Mg_aR1_{1-a-b}T2_b(Ni_{1-x-y}Co_xM4_y)_z \qquad (7)$$

wherein R1 is at least one element selected from rare earth elements (including Y); T2 is at least one element selected from the group consisting of Ca, Ti and Zr; M4 is at least one element selected from the group consisting of Mn, Fe, V, Cr, Nb, Al, Ga, Zn, Sn, Cu, Si, P and B; and a, b, x, y and z are respectively a number satisfying conditions: $0.2 \leq a \leq 0.35$, $0 < b \leq 0.3$, $0 < x \leq 0.5$, $0 \leq y \leq 0.2$, and $3 \leq z \leq 3.8$.

10. A hydrogen-absorbing alloy made of either an alloy ingot which has been prepared by means of a casting or sintering method, or a pulverized product of said alloy ingot, and said alloy ingot being represented by the following general formula (8);

$$Mg_a(La_{1-b}R1_b)_{1-a}Ni_z \qquad (8)$$

wherein R1 is at least one element selected from rare earth elements (including Y) but is not La; and a, b and z are respectively a number satisfying conditions: $0.2 \leq a \leq 0.35$, $0.01 \leq b < 0.5$, and $3 \leq z \leq 3.8$.

11. The hydrogen-absorbing alloy according to claim 10, wherein said alloy ingot has a Vickers hardness of less than 700 Hv (kgf/mm²).

12. A hydrogen-absorbing alloy made of either an alloy ingot which has been prepared by means of a casting or sintering method, or a pulverized product of said alloy ingot, and said alloy ingot being represented by the following general formula (9);

$$Mg_a(La_{1-b}R1_b)_{1-a}(Ni_{1-x}M3_x)_z \qquad (9)$$

wherein R1 is at least one element selected from rare earth elements (including Y) but is not La; M3 is at least one element selected from the group consisting of Co, Mn, Fe, Al, Ga, Zn, Sn, Cu, Si and B; and a, b, x and z are respectively a number satisfying conditions: $0.2 \leq a \leq 0.35$, $0.01 \leq b < 0.5$, $0.1 \leq x \leq 0.6$, and $3 \leq z \leq 3.8$.

13. The hydrogen-absorbing alloy according to claim 12, wherein said alloy ingot has a Vickers hardness of less than 700 Hv (kgf/mm²).

14. A hydrogen-absorbing alloy represented by the following general formula (10);

$$Mg_aR2_{1-a-b}T1_b(Ni_{1-x}M3_x)_z \qquad (10)$$

wherein R2 is two or more kinds of element selected from rare earth elements (including Y), the content of Ce constituting said R2 being less than 20% by weight; the content of La constituting said R2 is more than 70% by weight; T1 is at least one element selected from the group consisting of Ca, Ti, Zr and Hf; M3 is at least one element selected from the group consisting of Mn, Fe, Co, Al, Ga, Zn, Sn, Cu, Si and B; and a, b, x and z are respectively a number satisfying conditions: $0 < a \leq 0.5$, $0 \leq b \leq 0.3$, $0 \leq x \leq 0.9$, and $3 \leq z < 4$.

15. A hydrogen-absorbing alloy represented by the following general formula (11);

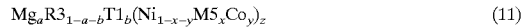

$$Mg_aR3_{1-a-b}T1_b(Ni_{1-x-y}M5_xCo_y)_z \qquad (11)$$

wherein R3 is two or more kinds of element selected from rare earth elements (including Y); T1 is at least one element selected from the group consisting of Ca, Ti, Zr and Hf; M5 is at least one element selected from the group consisting of Mn, Fe, Al, Ga, Zn, Sn, Cu, Si and B; a, b, x, y and z are respectively a number satisfying conditions: $0 < a \leq 0.5$, $0 \leq b \leq 0.3$, $0 \leq x \leq 0.9$, $0 < y \leq 0.4$, $x+y \leq 0.9$, and $3 \leq z < 4$, the content of Ce constituting said R3 being less than m % by weight where m is represented by the following formula (I);

$$m = 125y + 20 \qquad (I)$$

wherein y is a quantity of Co in the aforementioned general formula (11).

16. A hydrogen-absorbing alloy represented by the following general formula (12), said alloy containing a principal phase having a composition where the a and z in said general formula (12) meet the following formula (II), and said alloy having a plane defect in said principal phase which is not more than 20 in number per 100 nm;

$$Mg_aR1_{1-a-b}T1_b(Ni_{1-x}M6_x)_z \qquad (12)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \qquad (II)$$
$$3 \leq z \leq 3.8;$$
$$z = -6xa + \delta$$

wherein $\delta$ is: $[5-0.2]\underline{4.8} \leq \delta \leq [5+0.2]\underline{5.2}$.

17. The hydrogen-absorbing alloy according to claim 16, wherein said plane defect in said principal phase is not more than 10 in number per 100 nm.

18. A hydrogen-absorbing alloy represented by the following general formula (13), said alloy containing more than 70% by volume of crystal grain having a plane defect of not more than 20 in number per 100 nm and a principal phase having a composition where the a and z in said general formula (13) meet the following formula (II);

$$Mg_aR1_{1-a-b}T1_b(Ni_{1-x}M6_x)_z \qquad (13)$$

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \quad \text{(II)}$$
$$3 \leq z \leq 3.8;$$
$$z = -6xa + \delta$$

wherein δ is: [5 − 0.2]4.8 ≤ δ ≤ [5 + 0.2]5.2.

19. The hydrogen-absorbing alloy according to claim 18, wherein said plane defect in said crystal grain is not more than 10 in number per 100 nm.

20. A hydrogen-absorbing alloy represented by the following general formula (14), said alloy containing a principal phase having a composition where the a and z in said general formula (14) meet the following formula (II), not more than 20% by volume of a phase having a CaCu$_5$ type crystal structure and not more than 10% (including 0%) by volume of a phase having a MgCu$_2$ type crystal structure;

$$Mg_a R1_{1-a-b} T1_b (Ni_{1-x} M6_x)_z \quad (14)$$

wherein R1 is at least one element selected from rare earth elements (including Y); T1 is at least one element selected from the group consisting of Ca, Ti, Zr and Hf, M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \quad \text{(II)}$$
$$3 \leq z \leq 3.8;$$
$$z = -6xa + \delta$$

wherein δ is: [5 − 0.2]4.8 ≤ δ ≤ [5 + 0.2]5.2.

21. The hydrogen-absorbing alloy according to claim 10, wherein said b satisfies conditions 0.01≦b≦0.36.

22. The hydrogen-absorbing alloy according to claim 12, wherein said b satisfies conditions 0.01≦b≦0.36.

23. A secondary battery comprising a negative electrode containing hydrogen-absorbing alloy particles comprising a pulverized product of an alloy ingot which has been manufactured by means of a casting or sintering method and said alloy ingot being represented by the following general formula (1);

$$(Mg_{1-a-b} R1_a (M1_b)) Ni_z \quad (1)$$

wherein R1 is at least one element selected from rare earth elements (including Y); M1 is at least one element selected from elements having a larger electronegativity than that of Mg (excluding the elements of R1, Cr, Mn, Fe, Co, Cu, Zn and Ni), and a, b and z are respectively a number satisfying conditions: 0.1≦a≦0.8, 0<b≦0.9, 1−a−b>0, and 3≦z≦3.8.

24. A secondary battery comprising a negative electrode containing hydrogen-absorbing alloy particles comprising a pulverized product of an alloy ingot which has been manufactured by means of a casting or sintering method and said alloy ingot being represented by the following general formula (2);

$$Mg_{1-a} R1_a (Ni_{1-x} M2_x)_z \quad (2)$$

wherein R1 is at least one element selected from rare earth elements (including Y); M2 is at least one element selected from the group consisting of Cr, Mn, Fe, Co, Cu and Zn; and a, x and z are respectively a number satisfying conditions: 0.1≦a≦0.8, 0<x≦0.9, and 3≦z≦3.8.

25. A secondary battery comprising a negative electrode containing hydrogen-absorbing alloy particles comprising a pulverized product of an alloy ingot which has been manufactured by means of a casting or sintering method and said alloy ingot being represented by the following general formula (3);

$$Mg_{1-a-b} R1_{M1_b} Ni_{1-x} M2_x)_z \quad (3)$$

wherein R1 is at least one element selected from rare earth elements (including Y); M2 is at least one element selected from the group consisting of Cr, Mn, Fe, Co, Cu and Zn; M1 is at least one element selected from elements having a larger electronegativity than that of Mg (excluding the elements of R1, the elements of M1 and Ni); and a, b, x and z are respectively a number satisfying conditions: 0.1≦a≦0.8, 0<b≦0.9, 1−a−b>0, 0<x≦0.9, and 3≦z≦3.8.

26. A secondary battery comprising a negative electrode containing hydrogen-absorbing alloy particles comprising a pulverized product of an alloy ingot which has been manufactured by means of a casting or sintering method and said alloy ingot being represented by the following general formula (4);

$$Mg_{1-a} R1_a (Ni_{1-x} M3_x)_z \quad (4)$$

wherein R1 is at least one element selected from rare earth elements (including Y); M3 is at least one element selected from the group consisting of Co, Mn, Fe, Al, Ga, Zn, Sn, Cu, Si and B; and a, x and z are respectively a number satisfying conditions: 0.65≦a≦0.8, 0<x≦0.6, and 3≦z≦3.8.

27. A secondary battery comprising a negative electrode containing hydrogen-absorbing alloy particles comprising a pulverized product of an alloy ingot which has been manufactured by means of a casting or sintering method and said alloy ingot being represented by the following general formula (5);

$$Mg_{1-a-b} R1_a T1_b (Ni_{1-x} M3_x)_z \quad (5)$$

wherein R1 is at least one element selected from rare earth elements (including Y); T1 is at least one element selected from the group consisting of Ca, Ti, Zr and Hf; M3 is at least one element selected from the group consisting of Co, Mn, Fe, Al, Ga, Zn, Sn, Cu, Si and B; and a, b, x and z are respectively a number satisfying conditions: 0.65≦a<0.8, 0<b≦0.3, 0.65<(a+b)≦0.8, 0<x≦0.6, and 3≦z≦3.8.

28. A secondary battery comprising a negative electrode containing hydrogen-absorbing alloy particles comprising a pulverized product of an alloy ingot which has been manufactured by means of a casting or sintering method and said alloy ingot being represented by the following general formula (6);

$$Mg_a R1_{1-a} (Ni_{1-x-y} Co_x M4_y)_z \quad (6)$$

wherein R1 is at least one element selected from rare earth elements (including Y); M4 is at least one element selected from the group consisting of Mn, Fe, V, Cr, Nb, Al, Ga, Zn, Sn, Cu, Si, P and B; and a, x, y and z are respectively a number satisfying conditions: $0.2 \leq a \leq 0.35$, $0 < x \leq 0.5$, $0 \leq y \leq 02$, and $3 \leq z \leq 3.8$.

29. A secondary battery comprising a negative electrode containing hydrogen-absorbing alloy particles comprising a pulverized product of an alloy ingot which has been manufactured by means of a casting or sintering method and said alloy ingot being represented by the following general formula (7);

  (7)

wherein R1 is at least one element selected from rare earth elements (including Y); T2 is at least one element selected from the group consisting of Ca, Ti and Zr; M4 is at least one element selected from the group consisting of Mn, Fe, V, Cr, Nb, Al, Ga, Zn, Sn, Cu, Si, P and B; and a, b, x, y and z are respectively a number satisfying conditions: $0.2 \leq a \leq 0.35$, $0 < b \leq 0.3$, $0 < x \leq 0.5$, $0 \leq y \leq 0.2$, and $3 \leq z \leq 3.8$.

30. A secondary battery comprising a negative electrode containing hydrogen-absorbing alloy particles comprising a pulverized product of an alloy ingot which has been manufactured by means of a casting or sintering method and said alloy ingot being represented by the following general formula (8);

  (8)

wherein R1 is at least one element selected from rare earth elements (including Y) but is not La; and a, b and z are respectively a number satisfying conditions: $0.2 \leq a \leq 0.35$, $0.01 \leq b < 0.5$, and $3 \leq z \leq 3.8$.

31. A secondary battery comprising a negative electrode containing hydrogen-absorbing alloy particles comprising a pulverized product of an alloy ingot which has been manufactured by means of a casting or sintering method and said alloy ingot being represented by the following general formula (9);

  (9)

wherein R1 is at least one element selected from rare earth elements (including Y) but is not La; M3 is at least one element selected from the group consisting of Co, Mn, Fe, Al, Ga, Zn, Sn, Cu, Si and B; and a, b, x and z are respectively a number satisfying conditions: $0.2 \leq a \leq 0.35$, $0.01 \leq b < 0.5$, $0.1 \leq x \leq 0.6$, and $3 \leq z \leq 3.8$.

32. A secondary battery comprising a negative electrode containing a hydrogen-absorbing alloy comprising an alloy represented by the following general formula (10);

  (10)

wherein R2 is two or more kinds of element selected from rare earth elements (including Y), the content of Ce constituting said R2 being less than 20% by weight, the content of La constituting said R2 is more than 70% by weight; T1 is at least one element selected from the group consisting of Ca, Ti, Zr and Hf; M3 is at least one element selected from the group consisting of Mn, Fe, Co, Al, Ga, Zn, Sn, Cu, Si and B; and a, b, x and z are respectively a number satisfying conditions: $0 < a \leq 0.5$, $0 \leq b \leq 0.3$, $0 \leq x \leq 0.9$, and $3 \leq z < 4$.

33. A secondary battery comprising a negative electrode containing a hydrogen-absorbing alloy comprising an alloy represented by the following general formula (11);

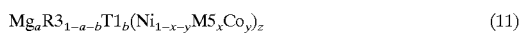  (11)

wherein R3 is two or more kinds of element selected from rare earth elements (including Y); T1 is at least one element selected from the group consisting of Ca, Ti, Zr and Hf; M5 is at least one element selected from the group consisting of Mn, Fe, Al, Ga, Zn, Sn, Cu, Si and B; a, b, x, y and z are respectively a number satisfying conditions: $0 < a \leq 0.5$, $0 \leq b \leq 0.3$, $0 \leq x \leq 0.9$, $0 < y \leq 0.4$, $x+y \leq 0.9$, and $3 \leq z < 4$, the consent of Ce constituting said R3 being less than m % by weight where m is represented by the following formula (I);

$$m = 125y + 20 \quad \text{(I)}$$

wherein y is a quantity of Co in the aforementioned general formula (11).

34. A secondary battery comprising a negative electrode containing a hydrogen-absorbing alloy comprising an alloy represented by the following general formula (12), said alloy containing a principal phase having a composition where the a and z in said general formula (12) meet the following formula (II), and said alloy having a plane defect in said principal phase which is not more than 20 in number per 100 nm;

  (12)

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \quad \text{(II)}$$

$$3 \leq z \leq 3.8;$$

$$z = -6xa + \delta$$

wherein $\delta$ is: $[5 - 0.2]\underline{4.8} \leq \delta \leq [5 + 0.2]\underline{5.2}$.

35. A secondary battery comprising a negative electrode containing a hydrogen-absorbing alloy comprising an alloy represented by the following general formula (13), said alloy containing more than 70% by volume of crystal grain having a plane defect of not more than 20 in number per 100 nm and a principal phase having a composition where the a and z in said general formula (13) meet the following formula (II);

  (13)

wherein R1 is at least one element selected from rare earth elements (including Y); T1 is at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \quad \text{(II)}$$

$$3 \leq z \leq 3.8;$$

$$z = -6xa + \delta$$

wherein $\delta$ is: $[5 - 0.2]\underline{4.8} \leq \delta \leq [5 + 0.2]\underline{5.2}$.

36. A secondary battery comprising a negative electrode containing a hydrogen-absorbing alloy comprising an alloy represented by the following general formula (14), said alloy containing a principal phase having a composition where the a and z in said general formula (14) meet the following formula (II), not more than 20% by volume of a phase having a CaCu$_5$ type crystal structure and not more than 10% (including 0%) by volume of a phase having a MgCu$_2$ type crystal structure;

$$Mg_aR1_{1-a-b}T1_b(Ni_{1-x}M6_x)_z \qquad (14)$$

wherein R1 is at least one element selected from rare earth elements (including Y); T1 as at least one element selected from the group consisting of Ca, Ti, Zr and Hf; M6 is at least one element selected from the group consisting of Co, Mn, Fe, Al, Ga, Zn, Sn, Cu, Si, B, Nb, W, Mo, V, Cr, Ta, P and S; and a, b, x and z are respectively a number satisfying conditions:

$$0.2 \leq a \leq 0.35, 0 \leq b \leq 0.3, 0 < x \leq 0.6, \text{ and} \qquad (II)$$
$$3 \leq z \leq 3.8;$$
$$z = -6xa + \delta$$

wherein $\delta$ is: $[5 - 0.2]\underline{4.8} \leq \delta \leq [5 + 0.2]\underline{5.2}$.

37. A method of making a hydrogen-absorbing alloy, the method comprising
    casting or sintering an alloy ingot; and
    preparing the hydrogen-absorbing alloy of claim 1.
38. A method of making a hydrogen-absorbing alloy, the method comprising
    casting or sintering an alloy ingot; and
    preparing the hydrogen-absorbing alloy of claim 3.
39. A method of making a hydrogen-absorbing alloy, the method comprising
    casting or sintering an alloy ingot; and
    preparing the hydrogen-absorbing alloy of claim 4.
40. A method of making a hydrogen-absorbing alloy, the method comprising
    casting or sintering an alloy ingot; and
    preparing the hydrogen-absorbing alloy of claim 6.
41. A method of making a hydrogen-absorbing alloy, the method comprising
    casting or sintering an alloy ingot; and
    preparing the hydrogen-absorbing alloy of claim 7.
42. A method of making a hydrogen-absorbing alloy, the method comprising
    casting or sintering an alloy ingot; and
    preparing the hydrogen-absorbing alloy of claim 8.
43. A method of making a hydrogen-absorbing alloy, the method comprising
    casting or sintering an alloy ingot; and
    preparing the hydrogen-absorbing alloy of claim 9.
44. A method of making a hydrogen-absorbing alloy, the method comprising
    casting or sintering an alloy ingot; and
    preparing the hydrogen-absorbing alloy of claim 10.
45. A method of making a hydrogen-absorbing alloy, the method comprising
    casting or sintering an alloy ingot; and
    preparing the hydrogen-absorbing alloy of claim 12.
46. A method of making a hydrogen-absorbing alloy, the method comprising
    casting or sintering an alloy ingot; and
    preparing the hydrogen-absorbing alloy of claim 14.
47. A method of making a hydrogen-absorbing alloy, the method comprising
    casting or sintering an alloy ingot; and
    preparing the hydrogen-absorbing alloy of claim 15.
48. A method of making a hydrogen-absorbing alloy, the method comprising
    casting or sintering an alloy ingot; and
    preparing the hydrogen-absorbing alloy of claim 16.
49. A method of making a hydrogen-absorbing alloy, the method comprising
    casting or sintering an alloy ingot; and
    preparing the hydrogen-absorbing alloy of claim 18.
50. A method of making a hydrogen-absorbing alloy, the method comprising
    casting or sintering an alloy ingot; and
    preparing the hydrogen-absorbing alloy of claim 20.
51. A method of making a secondary battery containing a hydrogen-absorbing alloy, the method comprising
    casting or sintering an alloy ingot;
    preparing the hydrogen-absorbing alloy; and
    forming the secondary battery of claim 23.
52. A method of making a secondary battery containing a hydrogen-absorbing alloy, the method comprising
    casting or sintering an alloy ingot;
    preparing the hydrogen-absorbing alloy; and
    forming the secondary battery of claim 24.
53. A method of making a secondary battery containing a hydrogen-absorbing alloy, the method comprising
    casting or sintering an alloy ingot;
    preparing the hydrogen-absorbing alloy; and
    forming the secondary battery of claim 25.
54. A method of making a secondary battery containing a hydrogen-absorbing alloy, the method comprising
    casting or sintering an alloy ingot;
    preparing the hydrogen-absorbing alloy; and
    forming the secondary battery of claim 26.
55. A method of making a secondary battery containing a hydrogen-absorbing alloy, the method comprising
    casting or sintering an alloy ingot;
    preparing the hydrogen-absorbing alloy; and
    forming the secondary battery of claim 27.
56. A method of making a secondary battery containing a hydrogen-absorbing alloy, the method comprising
    casting or sintering an alloy ingot;
    preparing the hydrogen-absorbing alloy; and
    forming the secondary battery of claim 28.
57. A method of making a secondary battery containing a hydrogen-absorbing alloy, the method comprising
    casting or sintering an alloy ingot;
    preparing the hydrogen-absorbing alloy; and
    forming the secondary battery of claim 29.
58. A method of making a secondary battery containing a hydrogen-absorbing alloy, the method comprising
    casting or sintering an alloy ingot;
    preparing the hydrogen-absorbing alloy; and
    forming the secondary battery of claim 30.
59. A method of making a secondary battery containing a hydrogen-absorbing alloy, the method comprising
    casting or sintering an alloy ingot;
    preparing the hydrogen-absorbing alloy; and forming the secondary battery of claim 31.

60. A method of making a secondary battery containing a hydrogen-absorbing alloy, the method comprising casting or sintering an alloy ingot;

preparing the hydrogen-absorbing alloy; and forming the secondary battery of claim 32.

61. A method of making a secondary battery containing a hydrogen-absorbing alloy, the method comprising casting or sintering an alloy ingot;

preparing the hydrogen-absorbing alloy; and forming the secondary battery of claim 33.

62. A method of making a secondary battery containing a hydrogen-absorbing alloy, the method comprising casting or sintering an alloy ingot;

preparing the hydrogen-absorbing alloy; and forming the secondary battery of claim 34.

63. A method of making a secondary battery containing a hydrogen-absorbing alloy, the method comprising casting or sintering an alloy ingot;

preparing the hydrogen-absorbing alloy; and forming the secondary battery of claim 35.

64. A method of making a secondary battery containing a hydrogen-absorbing alloy, the method comprising casting or sintering an alloy ingot;

preparing the hydrogen-absorbing alloy; and forming the secondary battery of claim 36.

* * * * *